United States Patent [19]
Takao et al.

[11] Patent Number: 5,920,220
[45] Date of Patent: Jul. 6, 1999

[54] CLOCK TIMING RECOVERY METHODS AND CIRCUITS

[75] Inventors: Toshiaki Takao, Yokohama; Yoshifumi Suzuki, Yokosuka; Tadashi Shirato, Kiyose, all of Japan

[73] Assignee: Nippon Telegraph and Telephone Corporation, Tokyo, Japan

[21] Appl. No.: 08/897,452

[22] Filed: Jul. 22, 1997

[30] Foreign Application Priority Data

Jul. 22, 1996 [JP] Japan ................................. 8-192293
Feb. 7, 1997 [JP] Japan ................................. 9-025429
Apr. 23, 1997 [JP] Japan ................................. 9-106261

[51] Int. Cl.⁶ .................................................. H03H 3/00
[52] U.S. Cl. ..................... 327/233; 327/231; 327/237; 327/241; 327/141
[58] Field of Search ....................... 327/141, 160, 327/162, 163, 231, 233, 237, 241

[56] References Cited

U.S. PATENT DOCUMENTS 5,245,637  9/1993  Gersbach et al. ........................ 375/374

Primary Examiner—Kenneth B. Wells
Assistant Examiner—Minh Nguyen
Attorney, Agent, or Firm—Pillsbury Madison & Sutro LLP

[57] ABSTRACT

A clock timing recovery circuit for recovering the clock timing from a baseband signal obtained by detection of a received signal. The clock timing is rapidly established using a clock signal which has been phase-shifted from the desired clock timing to sample the baseband signal, and by obtaining the optimum phase from the sampled signal obtained as a result. A clock-timing recovery circuit according to this invention does not require oversampling and provides easy optimization of circuit constants.

28 Claims, 41 Drawing Sheets

Clock Recovery Circuit using Binary Quantized Digital Phase-Locked Loop

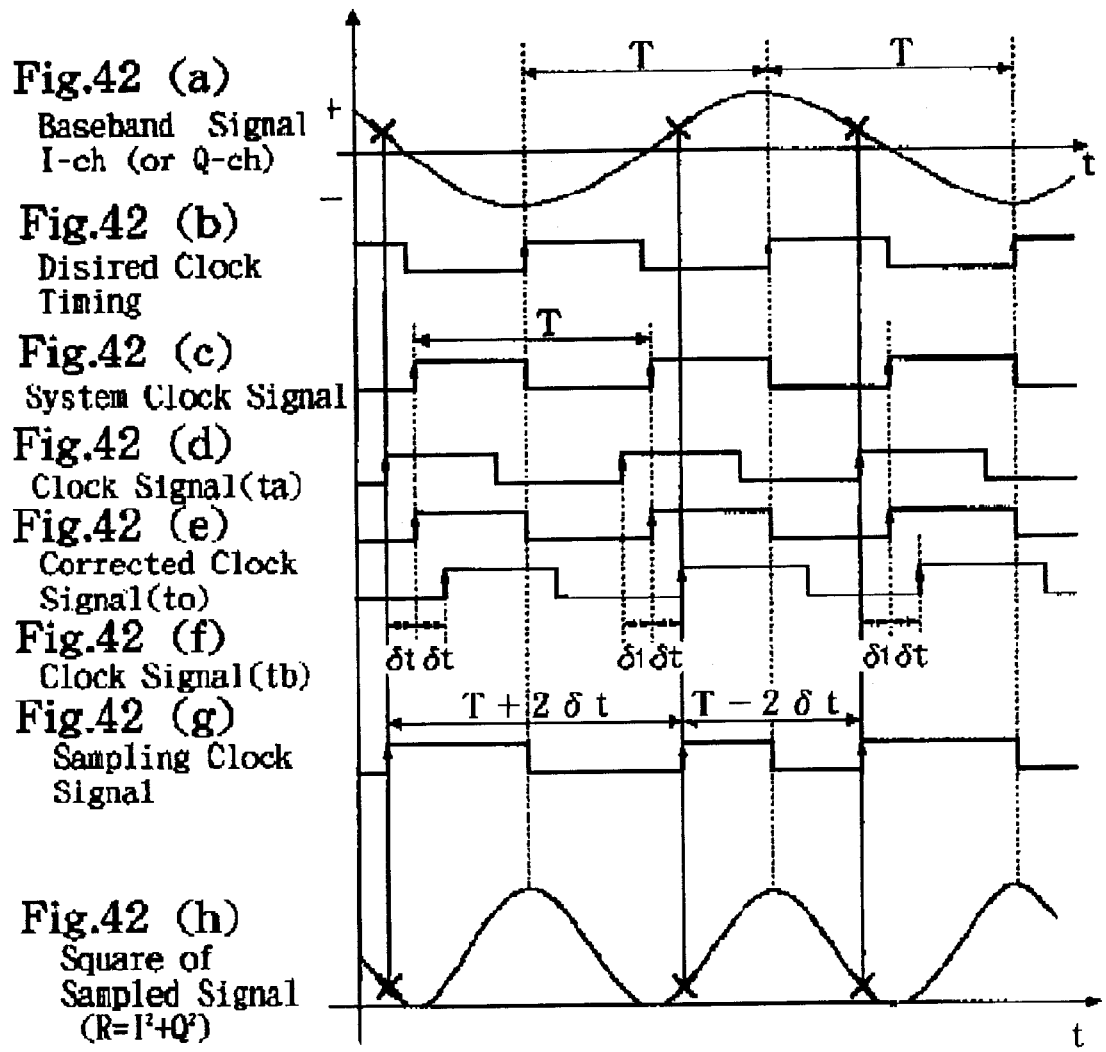

CLOCK TIMING RECOVERY METHODS AND CIRCUITS

CROSS REFERENCE TO RELATED APPLICATIONS

This application claims priority under U.S.C. § 119 from the following Japanese Patent applications: 08-192293 filed Jul. 22, 1996; 09-025429 filed Feb. 7, 1997; and 09-106261 filed Apr. 23, 1997, the contents of each of which are incorporated herein by reference.

BACKGROUND OF THE INVENTION

1. Field of the Invention

The present invention relates to the transmission of digital data, and, in particular, to the recovery of clock timing at the receiving side.

Certain terms used in this specification are defined as follows. First, "sampling clock signal" means a clock signal used for sampling in a demodulator. Next, "clock timing" means the timing of the sampling clock signal when the bit error rate is a minimum. Finally, "symbol rate" means the rate at which the main signal changes, i.e., the modulation rate.

2. Description of the Related Art

The growth of multimedia communications in recent years has necessitated the provision of multimedia wireless communication systems capable of high-speed transmission of digital data in burst form. Examples of such systems include high-speed wireless local area networks (LANs) and future public land mobile telecommunication. To process digital data at high speeds without bit errors, it is essential to have, at the receiving side of these wireless communication systems, a clock timing recovery circuit which rapidly establishes the clock timing using a signal for clock timing recovery added to the front of a burst of digital data, and which subsequently tracks fluctuations in clock timing. A clock timing recovery circuit which tracks fluctuations in clock timing is also necessary when transmitting continuous digital data.

Conventional clock timing recovery circuits can be broadly divided into circuits which recover clock timing at the symbol rate by analog processing, and circuits which recover clock timing by digital processing after oversampling. A tank-limiter clock recovery circuit using IF signal operation is an example of the former, while a clock recovery circuit using a binary quantized digital phase-locked loop (BQDPL) is an example of the latter. Examples of the configuration of these two conventional kinds of clock timing recovery circuit are explained below.

FIG.1 shows an example of the configuration of a demodulator provided with a tank-limiter clock recovery circuit using IF signal operation. This demodulator comprises a quadrature detector 1 to which the IF signal is input, analog-to-digital converters 2 and 3, which sample the outputs of quadrature detector 1, a baseband signal processing circuit 4, which obtains decoded signals by processing the sampled signals that are output by analog-to-digital converters 2 and 3, and a tank-limiter clock recovery circuit using IF signal operation 200 for recovering the clock timing. Tank-limiter clock recovery circuit using IF signal operation 200 comprises an envelope detection circuit 201, a tank circuit 202 and a limiter circuit 203.

The IF signal is input to envelope detection circuit 201, which extracts the clock frequency component by nonlinear processing of the IF signal, which does not itself contain the clock frequency component. Tank circuit 202 comprises a narrowband band-pass filter and reduces clock jitter. Limiter circuit 203 shapes the sinusoidal clock signal obtained by tank circuit 202 into a square wave. If sampling is performed using the clock signal obtained in this way, the bit error rate is minimized. This clock signal 300 is supplied to various sections of the demodulator, including analog-to-digital converters 2 and 3.

A detailed explanation of a tank-limiter clock recovery circuit using IF signal operation is given in "TDMA Communications" by Yamamoto and Kato, published by the IEICE Japan.

FIG. 2 shows an example of the configuration of a demodulator provided with a clock recovery circuit using a binary quantised digital phase-locked loop (BQDPL). A flowchart of the operation of this BQDPL clock recovery circuit is given in FIG.3. The demodulator comprises a quadrature detector 1 to which the IF signal is input, analog-to-digital converters 2 and 3, which sample the output of quadrature detector 1, a baseband signal processing circuit 4, which obtains demodulated signals by processing the sampled signals that are output by analog-to-digital converters 2 and 3, and a BQDPL clock recovery circuit 210 which recovers the clock timing. BQDPL clock recovery circuit 210 comprises a zero-crossing detector 211, phase decision circuit 212, loop filter 213, and VCO (voltage-controlled oscillator) 214.

Analog-to-digital converters 2 and 3 and baseband signal processing circuit 4 operate at twice the symbol rate, and input to BQDPL clock recovery circuit 210 the sampled signal obtained by sampling at twice the symbol rate. Sampled signal D(t+nT)208, which has the same period as the symbols, is input to zero-crossing detector 211. (T is the symbol period and n is an arbitrary integer.) When the sign of the input signal inverts (i.e., when a zero-crossing occurs) zero-crossing detector 211 sends notification of this to phase decision circuit 212. Sampled signal D(t+nT) 302 is then input to phase decision circuit 212 along with sampled signal D{t+(n−½)T} which has been sampled with a timing leading D(t+nT) by T/2. Phase decision circuit 212 decides, on the basis of the signs of the two signals, whether the sampling timing leads or lags the clock timing (at which the bit error rate is minimum). In other words, if D(t+nT)×D{t+(n−½)T} is positive, it decides that the sampling timing lags, and if it is negative, it decides that it leads. Phase decision circuit 212 outputs a decision result only when zero crossing detector 211 has detected a zero crossing. Loop filter 213 is an integrating circuit and integrates the decision results of phase decision circuit 211, and on the basis of the result of this integration controls the frequency of the clock (twice the symbol rate) output by VCO 214. The result of this processing is that any lead or lag of the sampling timing is regulated and a clock timing having a minimum bit error rate is obtained. This clock signal 304 is supplied to various sections of the demodulator, including analog-to-digital converters 2 and 3.

A detailed explanation of a BQDPL clock recovery circuit is given in "Digital Communications By Satellite" by V. K. Bhargava, D. Haccoun, R. Matyas and P. P. Nuspl, New York: Wiley, 1981.

Tank-limiter clock recovery circuits using IF signal operation and BQDPL clock recovery circuits are both widely employed in receivers used when low-speed digital data is being transmitted. However, several problems are encountered in receiving high-speed digital data. These problems are explained below.

A tank-limiter clock recovery circuit using IF signal operation employs a tank circuit, which is a narrowband band-pass filter, to reduce clock jitter. To reduce clock jitter, the Q of the tank circuit has to be made large ($Q=f_0/\Delta f$, where $f_0$ is the center frequency of the filter and $\Delta f$ is the 3-dB bandwidth). However, the delay of a single-tuned resonator, which is generally used as a tank circuit, can be expressed as approximately Q/4 (symbols). Accordingly, if the Q is made large, the delay of the tank circuit is lengthened, so that more time is needed to recover the clock timing. For example, in a wireless LAN system conforming to RCR standard STD-34A, "19GHz Band Data Transmission Radio Equipment for Premises Radio Station", established by the Research & Development Centre for Radio Systems, the Q required to obtain a good bit error rate is around 110. In this case, the delay is approximately 28 symbols, which means that considerable time is needed to recover the clock timing. Moreover, because this circuit is an analog circuit, it is difficult to reduce clock jitter and to optimize the time taken to recover the clock timing. A further shortcoming is that because the clock frequency component has been removed from the IF signal, the clock signal is lost if the level of the IF signal drops as a result of fluctuations etc. of the propagation path conditions.

The loop filter of a BQDPL clock recovery circuit integrates a control signal that shows the phase lead or lag of the sampling clock signal. In other words, the VCO is controlled after the signal for clock timing recovery has been observed for a long time. Clock jitter can therefore be reduced by increasing the integration time of the loop filter, but this also requires more time to recover the clock timing, so that there is the same problem as encountered with a tank-limiter clock recovery circuit using IF signal operation. Furthermore, more time is required to correct the phase difference between the initial phase of the clock, which is output by the VCO, and the phase of the clock timing which minimizes the bit error rate, as this phase difference becomes larger. A resulting problem is that under normal service conditions, in which the size of the phase difference is not fixed, there will be a spread in the time taken to recover the clock timing. Moreover, because this circuit requires oversampling at two or more times the symbol rate, there are difficulties involved in digital implementation and in coping with increases in the transmission rate of digital data.

SUMMARY OF THE INVENTION

It is an object of the present invention to provide a clock timing recovery method and circuit which overcomes such problems, can rapidly establish the clock timing, does not require oversampling, and wherein circuit constants are readily optimized.

According to a first aspect of the present invention, there is provided a clock timing recovery circuit comprising a clock generator that generates a system clock signal which repeats with a fixed period, phase shift circuit which outputs a first clock signal, which is phase-shifted with respect to the system clock signal, as the clock timing for sampling the baseband signal obtained by detection of the received signal, and a control circuit for controlling the amount of phase shift of this phase shift circuit; wherein a signal for clock timing recovery is added to the baseband signal; and the control circuit includes a first circuit which causes there to be output from the phase shift circuit, as a sampling clock signal for sampling the signal for clock timing recovery, a first clock signal whereof the phase of its n-th leading edge point or trailing edge point (n=1, 2, 3, . . . ) from the origin, where one leading edge point or trailing edge point of the system clock signal is taken as the origin, is shifted by $n \times \Delta t$ relative to the phase of the system clock signal (where $\Delta t$ is a predefined amount of phase shift); and a second circuit which estimates, from the sampled signal obtained by sampling the signal for clock timing recovery, the phase difference between the phase of the system clock signal and the clock timing at which the bit error rate becomes a minimum, and which, on the basis of this estimated phase difference, causes there to be output from the phase shift circuit the clock timing for sampling the baseband signal that follows the signal for clock timing recovery.

Radio communication equipment for transmitting digital data in bursts generally transmits and receives burst signals comprising a signal for clock timing recovery (BTR), a signal for frame synchronisation (UW), and data. The BTR portion of the baseband signal obtained by receiving and detecting this burst signal approximates a sine wave (in the absence of noise and transmission path distortion it is an exact sine wave), and the rest of the signal will form an eye pattern. The first aspect of this invention utilizes the fact that the BTR portion of the baseband signal approximates a sine wave, and after sampling this signal with a successively phase-shifted clock signal, uses the sampled signal obtained to estimate the clock timing. This enables clock timing to be recovered rapidly in a time period of the order of four symbols.

In order to make the clock timing recovered from the BTR portion track frequency fluctuations of clock timing in other portions of the baseband signal, there can be provided a sampling clock generator that generates a second clock signal with leading or trailing edge points which lead the leading or trailing edge points of the first clock signal that is output by the phase shift circuit by a predefined timing difference $\delta t$, and a third clock signal with leading or trailing edge points which lag behind the leading or trailing edge points of this first clock signal by the same timing difference $\delta t$; and circuit which selects the clock signal which the control circuit, using the first circuit, makes the phase shift circuit output as the sampling clock signal for sampling the signal for clock timing recovery, and which selects the output of the sampling clock generator as the sampling clock signal for sampling the baseband signal that follows the signal for clock timing recovery; and the second circuit can include an arithmetic unit that calculates the amount of phase shift of the phase shift circuit by comparing the decision error obtained from the sampled signal at the leading or trailing edge points that lead by $\delta t$, with the decision error obtained from the sampled signal at the leading or trailing edge points that lag by $\delta t$.

By tracking frequency fluctuations, accurate clock timing recovery can be performed and bit errors of digital data can be reduced even when a system clock signal with poor frequency stability is used.

The configuration that serves to track frequency fluctuations can also be utilized independently of the configuration of the first aspect of this invention.

According to a second aspect of the present invention, there is provided a clock timing recovery circuit comprising a clock generator that generates a system clock signal which repeats with a fixed period, a phase shift circuit which outputs a first clock signal, which is phase-shifted with respect to the system clock signal, as the clock timing for sampling the baseband signal obtained by detection of the received signal, and a control circuit for controlling the amount of phase shift of this phase shift circuit; wherein there is provided sampling clock generator that generates a second clock signal with leading or trailing edge points which lead the leading or trailing edge points of the first clock signal by a predefined timing difference δt, and a third clock signal with leading or trailing edge points which lag behind the leading or trailing edge points of the first clock signal by the same timing difference δt; and wherein the control circuit includes an arithmetic unit which calculates the amount of phase shift of the phase shift circuit by comparing information relating to the phase error of the clock timing, the information being obtained respectively from the sampled signals obtained by sampling the baseband signal using the second and third clock signals as the respective sampling clock signals.

The decision error of the phase component of the sampled signal obtained by sampling can be utilized as the information relating to the phase error. Alternatively, when the baseline signal is obtained by coherent detection, the decision error of the signal points of the sampled signal can be utilized. By utilizing the decision error of the phase component or the decision error of the signal points, not only can clock timing be recovered for portions of the burst signal other than the BTR, but it will also be possible to recovery clock timing from a continuous signal.

It is also possible to utilize the amplitude of the sampled signal obtained by sampling the BTR as the information relating to phase error that is used to recover the clock timing from the BTR. In this case, it is preferable to provide a circuit which shifts the timing of the first clock signal by a half period when it has been detected from the signal for clock timing recovery that the timing of the system clock signal and the clock timing of the baseband signal deviate by a half period.

A possible configuration is for the sampling clock generator to include a circuit which alternately selects the second clock signal and the third clock signal and outputs these signals as one clock signal, and for the control circuit to compare the phase error related information obtained alternately in respect of the second clock signal and the third clock signal. A possible configuration different from this is for the sampling clock generator to output the second clock signal and the third clock signal separately, and for the control circuit to compare the phase error related information obtained separately in respect of the second clock signal and the third clock signal. When the second clock signal and the third clock signal are output separately, a possible configuration is for the second clock signal to be output as a sampling clock signal for one of the in-phase channel and the quadrature channel; for the third clock signal to be output as a sampling clock signal for the other channel, and for the arithmetic unit to compare the phase error related information obtained respectively from the in-phase channel and the quadrature channel.

A possible configuration is for the second and third clock signals generated by the sampling clock generator to be output to the main signal lines as sampling clock signals for decoding the digital data from the baseband signal. A possible configuration different from this is to output the first clock signal to the main signal lines as the sampling clock signal for decoding the digital data from the baseband signal, and to provide a sampling a circuit which uses the second clock signal and the third clock signal to sample the baseband signal in separate lines from the main signal lines, and a circuit for obtaining phase error related information from the output of this sampling circuit.

When recovering clock timing from a burst signal, it is also possible to acquire the clock signal by utilizing the amplitude of the sampled signal obtained by sampling the BTR, and to track frequency fluctuations of clock timing by utilizing the decision error of the sampled signal obtained by sampling a portion of the signal other than the BTR.

Namely, according to a third aspect of the present invention, there is provided a clock timing recovery circuit comprising a clock generator that generates a system clock signal which repeats with a fixed period, a phase shift circuit which outputs a first clock signal, phase-shifted with respect to the system clock signal, as the clock timing for sampling the baseband signal obtained by detection of the received signal, and control circuit for controlling the amount of phase shift of this phase shift circuit; wherein a signal for clock timing recovery is added to the baseband signal; and wherein a sampling clock generator generates a second clock signal with leading or trailing edge points which lead the leading or trailing edge points of the first clock signal by a predefined timing difference δt, and a third clock signal with leading or trailing edge points which lag behind the leading or trailing edge points of the first clock signal by the same timing difference δt; and wherein the control circuit includes first arithmetic unit which calculates the amount of phase shift of the phase shift circuit by comparing the amplitudes of the sampled signals respectively obtained by sampling the signal for clock timing recovery using the second and third clock signals respectively as sampling clock signals, and a second arithmetic unit which calculates the amount of phase shift of the phase shift circuit by comparing the decision errors obtained when the baseband signal following the signal for clock timing recovery is sampled using the second and third clock signals respectively as sampling clock signals.

According to a fourth aspect of the present invention, there is provided a clock timing recovery method for recovering, from a signal for clock timing recovery contained in the baseband signal obtained by detection of the received signal, the clock timing for sampling the baseband signal that follows this signal for clock timing recovery, the method includes forming, as the sampling clock signal, a clock signal whereof the phase of its n-th leading edge point or trailing edge point ($n = 1, 2, 3, \ldots$) from the origin, where one leading edge point or trailing edge point of a system clock signal which repeats with a fixed period is taken as the origin, is shifted by $n \times \Delta t$ relative to the phase of the system clock (where $\Delta t$ is a predefined amount of phase shift); sampling the signal for clock timing recovery using this sampling clock signal; estimating, from the sampled signal obtained by this sampling, the phase difference between the phase of the system clock signal and the clock timing at which the bit error rate is a minimum; and recovering the clock timing for sampling the baseband signal that follows the signal for clock timing recovery by causing the phase of the system clock signal to shift by the estimated amount of phase difference.

According to a fifth aspect of the present invention, there is provided a clock timing recovery method for recovering clock timing on the basis of the decision error of the sampled signal obtained by sampling the baseband signal, the method includes forming, from a first clock signal obtained by phase shifting a system clock signal which repeats with a fixed period, a second clock signal with leading or trailing edge points which lead the leading or trailing edge points of the first clock signal by a predefined timing difference δt, and a third clock signal with leading or trailing edge points which lag behind the leading or trailing edge points of the first clock signal by the same timing difference δt, the second and third clock signals serving as sampling clocks signals for the main signal lines; obtaining decision errors from the sampled signals obtained by using these second and third sampling clock signals to sample the baseband signal; calculating the amount of phase shift to be applied to the first clock signal on the basis of the result of comparing the decision error obtained from the sampled signal at the leading edge or trailing edge point of the second clock signal with the decision error obtained from the sampled signal at the leading edge or trailing edge point of the third clock signal; and shifting the phase of the system clock signal on the basis of this calculated amount of phase shift.

According to a sixth aspect of the present invention, there is provided a clock timing recovery method for recovering clock timing on the basis of the decision error of the sampled signal obtained by sampling the baseband signal, the method includes: outputting, as the sampling clock signal for the main signal lines, a first clock signal obtained by phase shifting a system clock signal which repeats with a fixed period, and forming a second clock signal with leading or trailing edge points which lead the leading or trailing edge points of the first clock signal by a predefined timing difference δt, and a third clock signal with leading or trailing edge points which lag behind the leading or trailing edge points of the first clock signal by the same timing difference δt; obtaining decision errors from the sampled signals obtained using these second and third clock signals to sample the baseband signal separately from the main signal lines; calculating the amount of phase shift to be applied to the first clock signal on the basis of the result of comparing the decision error obtained from the sampled signal at the leading edge or trailing edge point of the second clock signal, with the decision error obtained from the sampled signal at the leading edge or trailing edge point of the third clock signal; and shifting the phase of the system clock signal on the basis of this calculated amount of phase shift.

According to a seventh aspect of the present invention, there is provided a clock timing recovery method for recovering, from a signal for clock timing recovery contained in the baseband signal obtained by detection of the received signal, the clock timing required for decoding this baseband signal, the method comprising: forming, from a first clock signal obtained by phase shifting a system clock signal which repeats with a fixed period, a second clock signal with leading or trailing edge points which lead the leading or trailing edge points of the first clock signal by a predefined timing difference δt, and a third clock signal with leading or trailing edge points which lag behind the leading or trailing edge points of the first clock signal by the same timing difference δt, these second and third clock signals serving as sampling clock signals for the main signal lines; using these sampling clock signals to sample the signal for clock timing recovery; comparing, in respect of the sampled signals obtained by this sampling, the amplitude of the sampled signal at the leading edge point or trailing edge point of the second clock signal with the amplitude of the sampled signal at the leading edge point or trailing edge point of the third clock signal; calculating the amount of phase shift to be applied to the first clock signal on the basis of the result of this comparison; and recovering the clock timing by shifting the phase of the system clock signal on the basis of this amount of phase shift.

According to an eighth aspect of the present invention, there is provided a clock timing recovery method for recovering, from a signal for clock timing recovery contained in the baseband signal obtained by detection of the received signal, the clock timing required for decoding this baseband signal, the method comprising: outputting, as the sampling clock signal for the main signal lines, a first clock signal obtained by phase shifting a system clock signal which repeats with a fixed period, and forming a second clock signal with leading or trailing edge points which lead the leading or trailing edge points of the first clock signal by a predefined timing difference δt, and a third clock signal with leading or trailing edge points which lag behind the leading or trailing edge points of the first clock signal by the same timing difference δt; using these second and third clock signals to sample the signal for clock timing recovery in separate lines from the main signal lines; comparing, with respect to the sampled signals obtained by this sampling, the amplitude of the sampled signal at a leading edge point or a trailing edge point of the second clock signal with the amplitude of the sampled signal at the leading edge point or trailing edge point of the third clock signal; calculating the amount of phase shift to be applied to the first clock signal on the basis of the results of this comparison; and recovering the clock timing by shifting the phase of the system clock signal on the basis of this amount of phase shift.

In the fifth to the eighth aspects discussed above, the baseband signal can be sampled by means of a clock signal obtained by alternately selecting the second clock signal and the third clock signal, or by sampling the baseband signal separately using the second clock signal and the third clock signal. When separate sampling is performed, the signal in the in-phase channel can be sampled using one clock signal and the signal in the quadrature channel can be sampled using the other clock signal.

In the seventh and eighth aspects, the timing of the first clock signal can be shifted by a half period when it has been detected from the signal for clock timing recovery that the timing of the system clock signal and the clock timing of the received signal deviate by a half period.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of the specification, wherein like reference numerals designate corresponding parts in the various figures.

BRIEF DESCRIPTION OF THE DRAWINGS

FIG. 42(a)–(h) show the timing of the various signals in the pseudostable state.

DETAILED DESCRIPTION OF THE PRESENTLY PREFERRED EMBODIMENTS OF THE INVENTION

Figure 1:
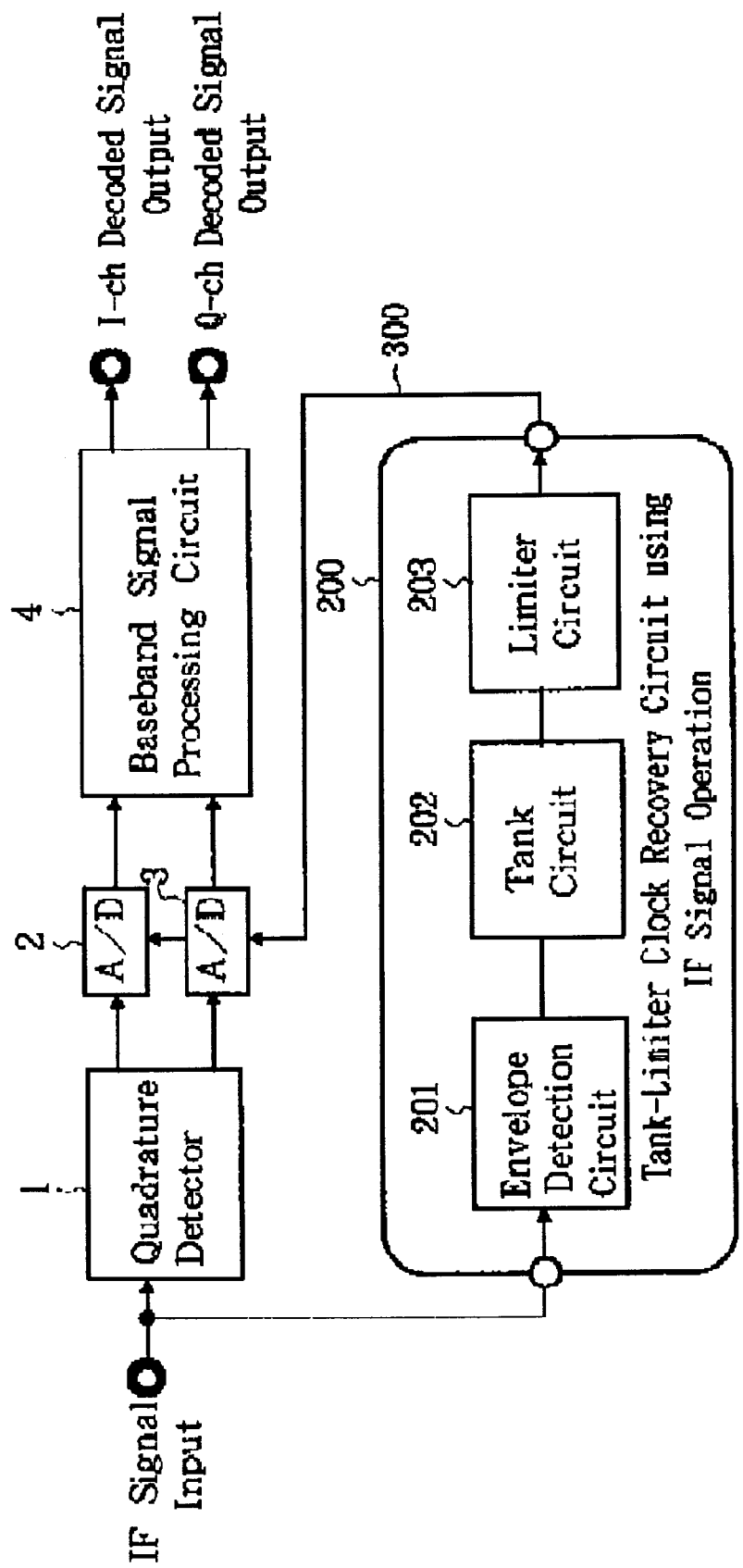
FIG. 1 is a block diagram showing a prior art example of the configuration of a demodulator having a tank-limiter clock recovery circuit using IF signal operation.
Figure 2:
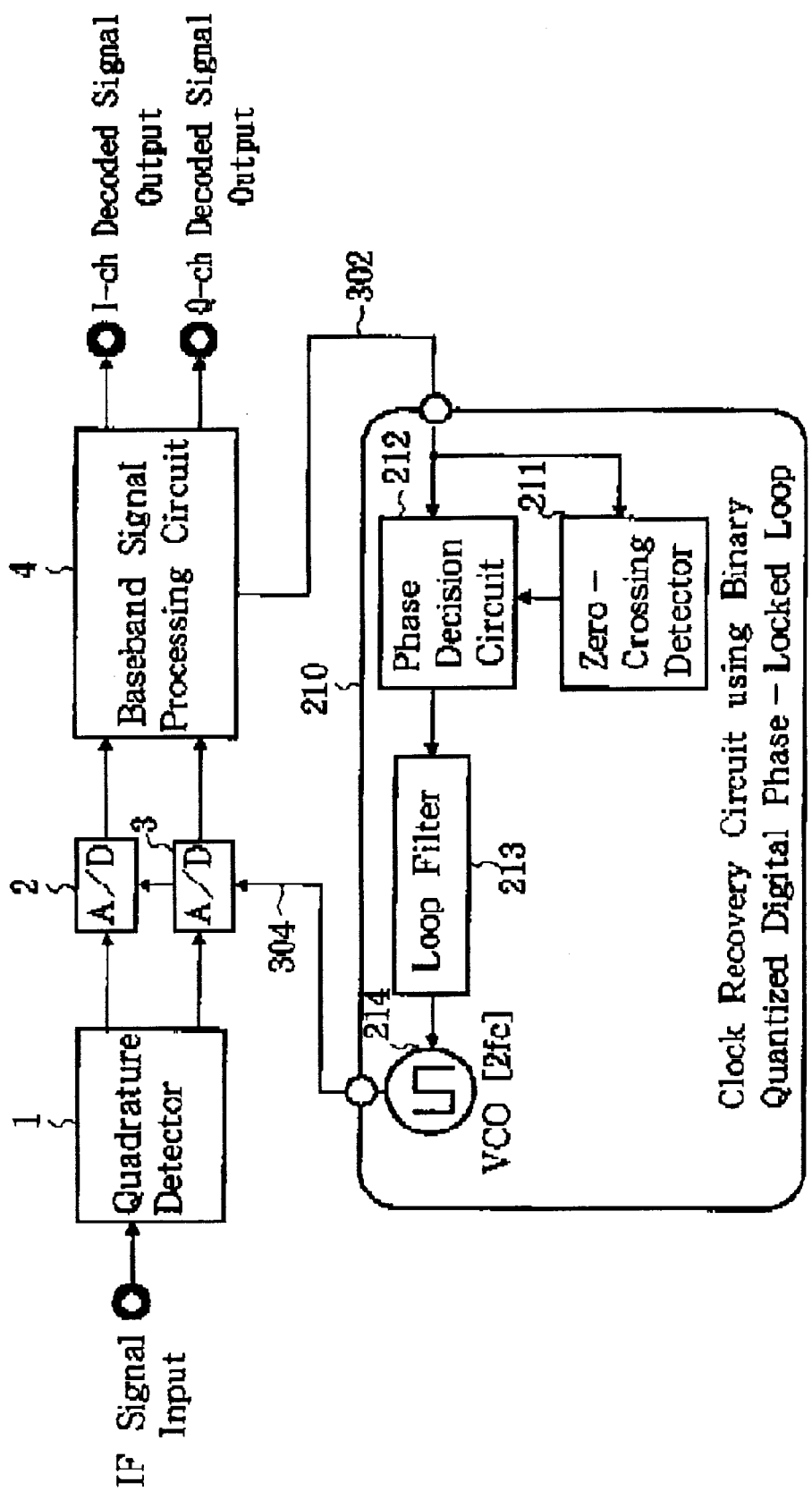
FIG. 2 is a block diagram showing a prior art example of the configuration of a demodulator provided with a BQDPL clock recovery circuit.
Figure 3:
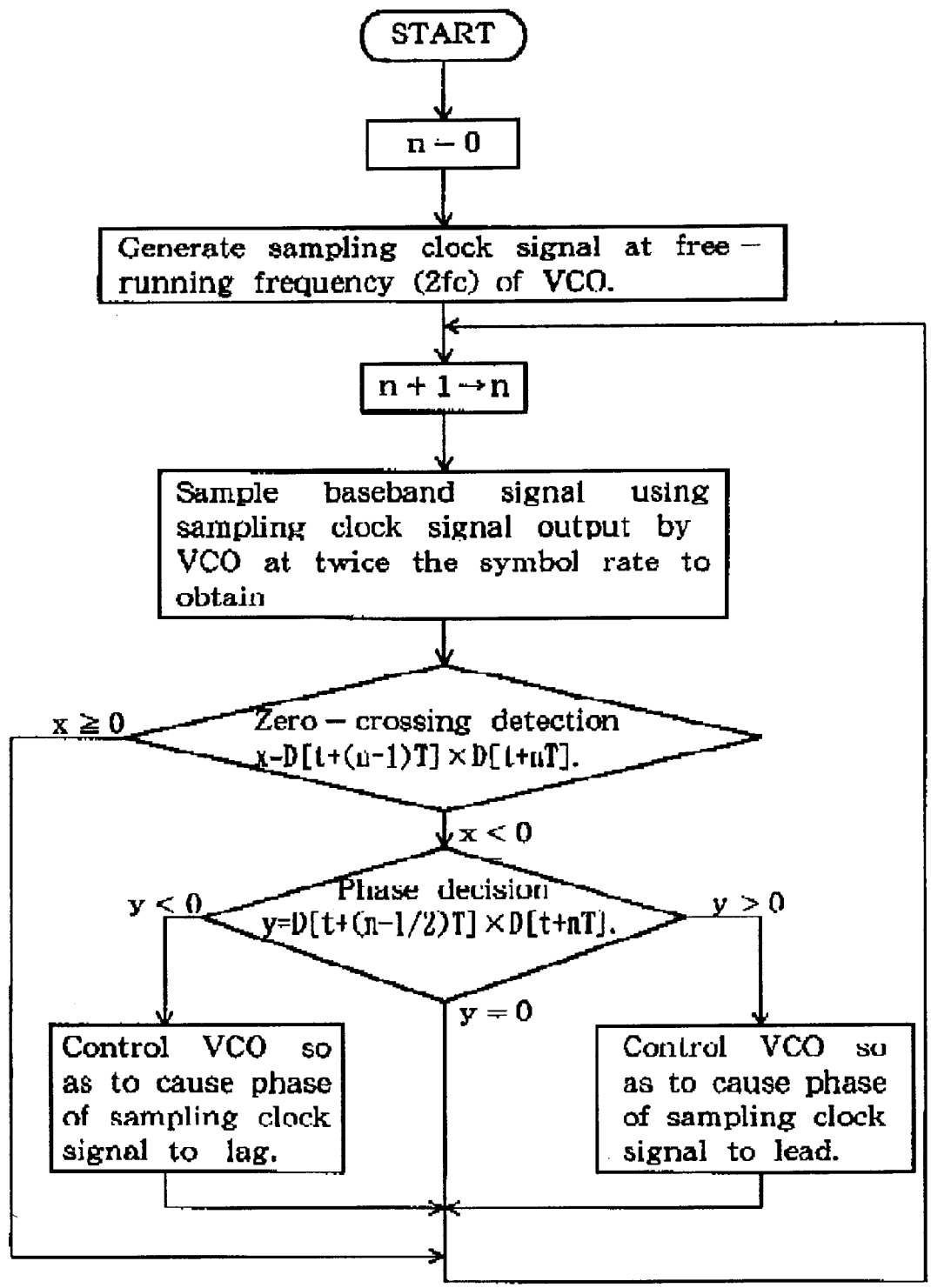
FIG. 3 is a flowchart showing the operation of the BQDPL clock recovery circuit illustrated in FIG. 2.
Figure 4:
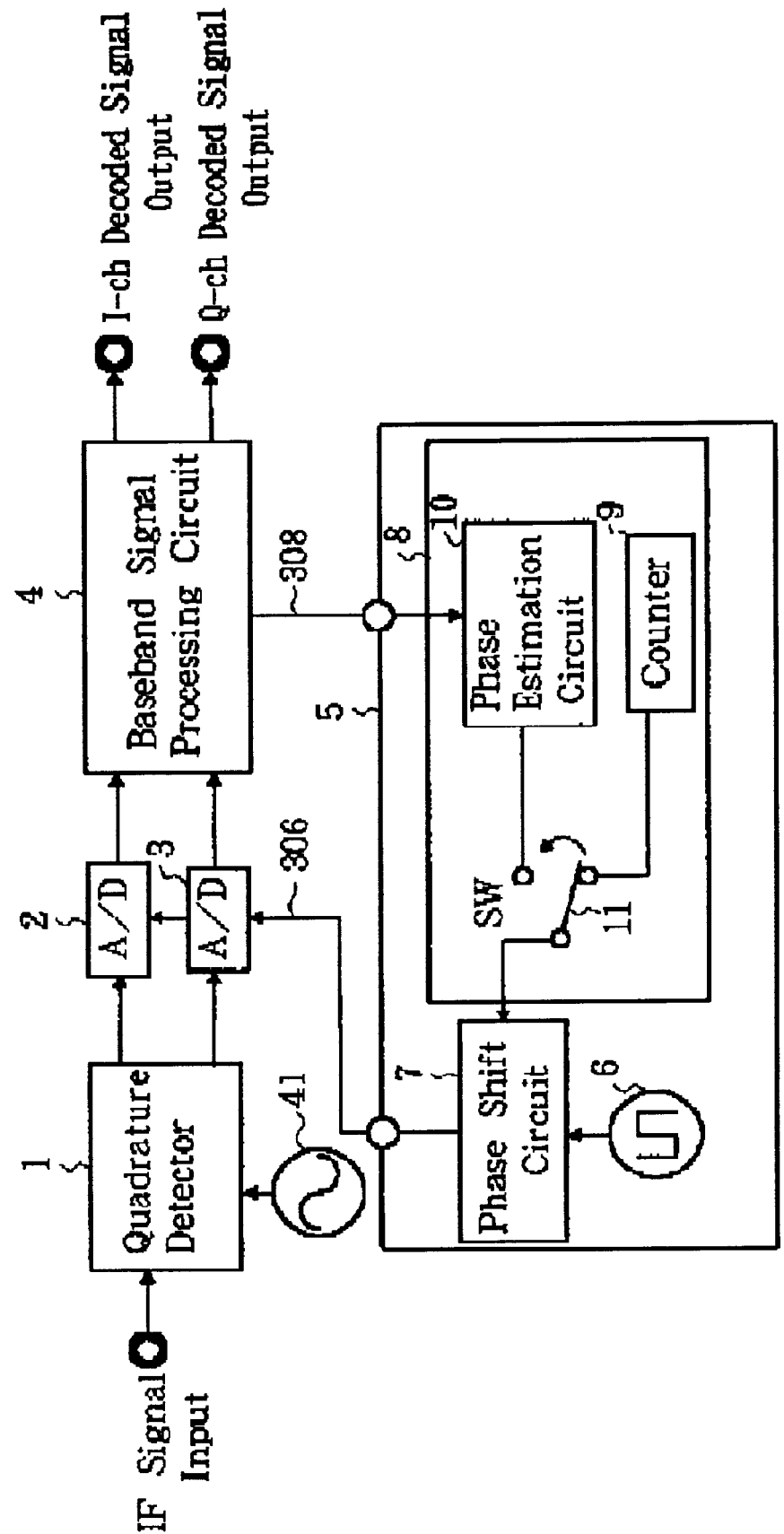
FIG. 4 is a block diagram showing a first embodiment of the present invention.

FIG. 4 is a block diagram showing a first embodiment of the present invention, and the configuration of a demodulator equipped with a clock timing recovery circuit. This particular embodiment rapidly recovers the clock timing using only a signal for clock timing recovery that has been added to the burst signal frame.

This demodulator comprises a quadrature detector 1 to which the IF signal is input, an oscillator 41 which generates a carrier signal which is not synchronized with the IF signal and supplies this to quadrature detector 1, analog-to-digital converters 2 and 3 which convert the in-phase and quadrature outputs of quadrature detector 1 to digital signals, a baseband signal processing circuit 4 which processes the digital signals output by analog-to-digital converters 2 and 3, and a clock timing recovery circuit 5 which recovers, from the clock timing recovery signal, the clock timing for demodulating the received signal.

Clock timing recovery circuit 5 comprises a system clock generator 6 for generating a system clock signal that repeats with a fixed period, a phase shift circuit 7 which outputs a first clock signal 306, phase shifted with respect to the system clock signal, as the clock timing for sampling the baseband signal obtained by detection of the received signal, and a control circuit 8 for controlling the amount of phase shift of phase shift circuit 7.

Figure 5:
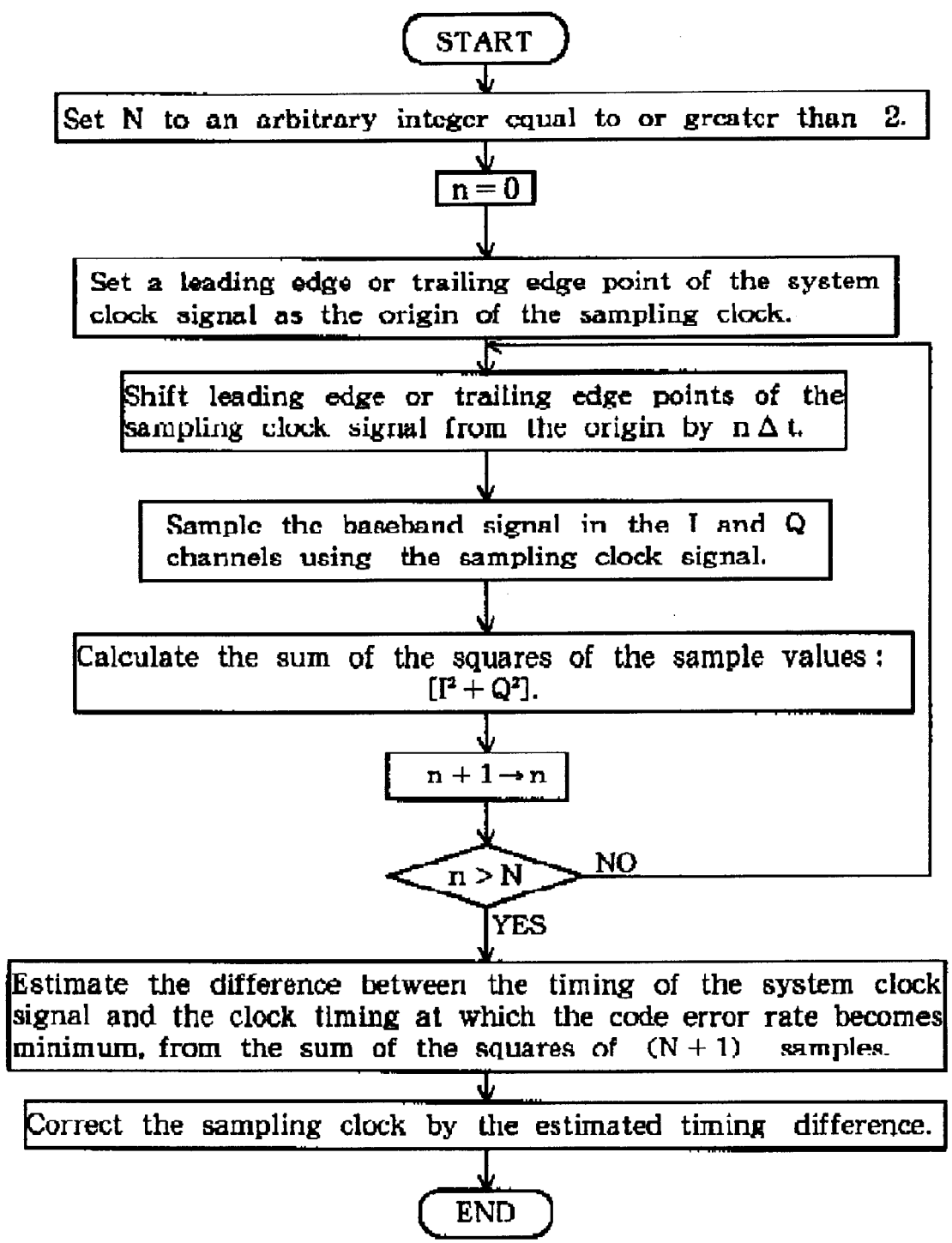
FIG. 5 shows the flow of the control of amount of phase shift in the first embodiment.
Figure 6:
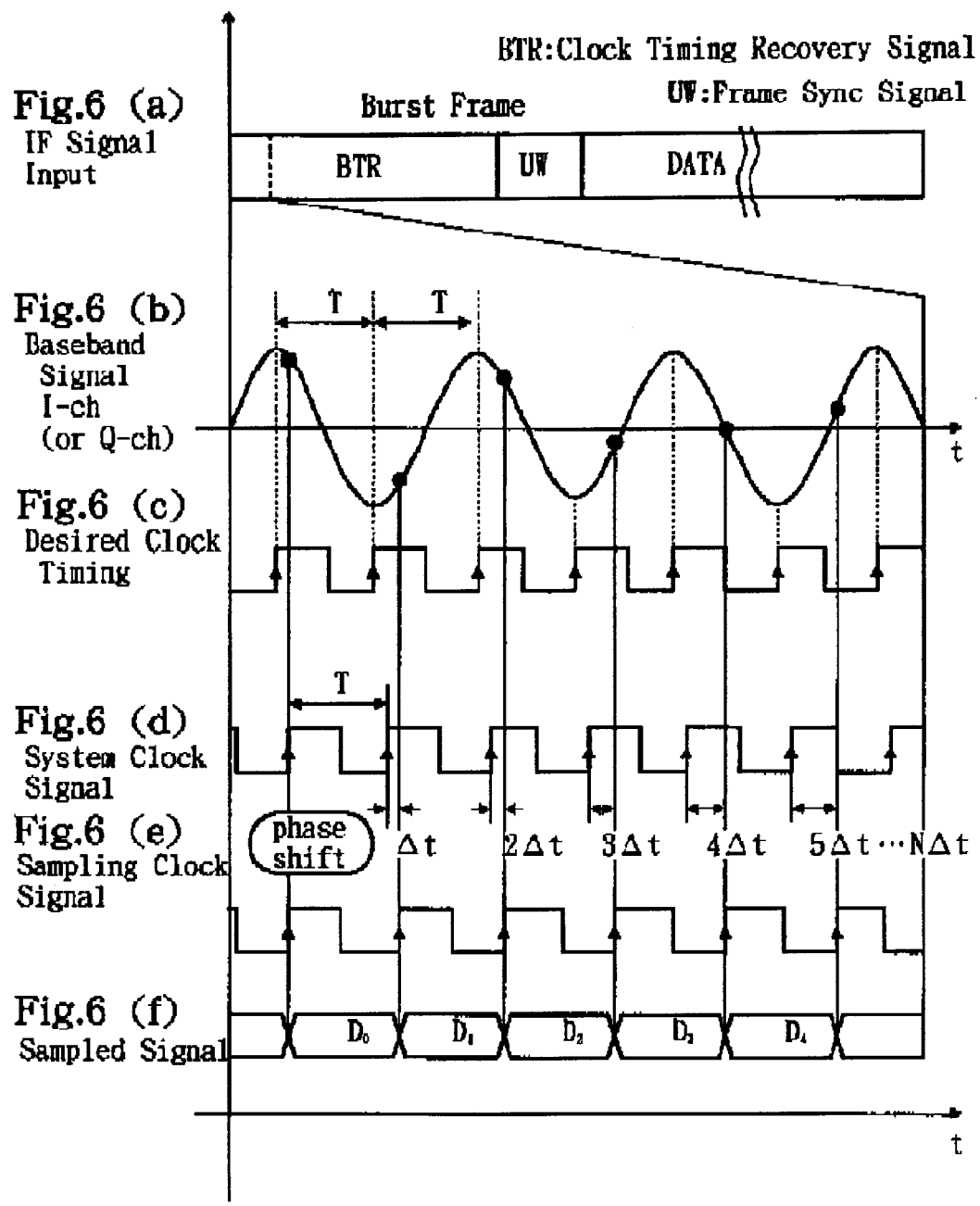
FIG. 6(a)–(f) explain the operation of the clock timing recovery circuit of the first embodiment.

Control circuit 8 comprises a counter 9, a phase estimation circuit 10, and a switch 11 which selects one of the output of counter 9 and the output of phase estimation circuit 10. Counter 9 outputs a phase control signal synchronized with the system clock signal, and causes there to be output from phase shift circuit 7, as a sampling clock signal for sampling the clock timing recovery signal, a clock signal whereof the phase of its n-th leading edge point or trailing edge point (n=1, 2, 3, . . . ) from the origin, where one leading edge point or trailing edge point of the system clock is taken as the origin, is shifted by n×Δt relative to the phase of the system clock (where Δt is a predefined amount of phase shift). Phase estimation circuit 10 estimates, from the sampled signal 308 obtained by sampling the clock timing recovery signal, i.e., from the sampled signal from baseband signal processing circuit 4, the phase difference between the phase of the system clock signal and the clock timing at which the bit error rate is a minimum, and on the basis of this estimated phase difference, causes there to be output from phase shift circuit 7 the clock timing for sampling the baseband signal that follows the clock timing recovery signal. Switch 11 selects the output of counter 9 with the timing of the clock timing recovery signal, and at other times selects the output of phase estimation circuit 10, and supplies these outputs to phase shift circuit 7. Switching times can be arbitrary within a given time period. The switch 11 may also switch between the signals when the UW or frame synchronization signal, shown in FIG. 6(a), is detected. Detection of the UW signal is well known to those or ordinary skill in the art. The flow of the control of amount of phase shift by control circuit 8 is shown in FIG. 5.

FIG. 6(a)–6(f), which serve to explain the operation of the clock timing recovery circuit of the first embodiment, shows the following: FIG. 6(a) the format of the burst signal input to quadrature detector 1 as the intermediate frequency signal; FIG. 6(b) the baseband signal output from quadrature detector 1; FIG. 6(c) a desired clock timing; FIG. 6(d) a system clock signal output by system clock generator 6; FIG. 6(e) a sampling clock signal output from phase shift circuit 7 and; FIG. 6(f) a sampled signal supplied to clock timing recovery circuit 5 from baseband signal processing circuit 4.

A code for efficiently recovering the clock timing is generally added to the front of a burst signal. For example, in the case of QPSK modulation, a bit pattern comprising repetitions of "1100" or "1001" is added. The clock timing recovery signal (BTR) obtained after limiting the bandwidth of this code is the sine wave of period 2T shown in FIG. 6(b), where T is the symbol period. This signal is sampled by analog-to-digital converters 2 and 3. The sampling clock signal used (see FIG. 6(e)) is the clock signal obtained as a result of phase shift circuit 7 having caused the period of the system clock signal (see FIG. 6(d)) generated by system clock generator 6, the system clock signal having the same clock speed as the symbol rate, to change by a fixed amount $\Delta t$ at each sample. The sampled signal obtained by sampling (see FIG. 6(f)) is input to phase estimation circuit 10. Phase estimation circuit 10 estimates, on the basis of this sampled signal, the phase difference between the system clock signal and the timing at which the clock timing recovery signal exhibits an extreme value, i.e., the mid-point of a symbol. The estimation result is output to phase shift circuit 7 which shifts the phase of the system clock by the estimated phase difference, thereby establishing the phase of the sampling clock signal (see FIG. 6(c)).

After the phase of the sampling clock signal has been established, the sampling clock signal is held constant until the end of the burst signal by keeping the amount of phase shift of phase shift circuit 7 constant. Alternatively, the phase of the sampling clock signal is finely adjusted by making minute changes to the amount of phase shift under control of phase estimation circuit 10.

Thus, according to this embodiment, the phase of the sampling clock signal can be aligned with the mid-point of the symbols by processing at about the symbol rate. This is the alignment at which the eye pattern opening is largest, and results in the clock timing at which the bit error rate is a minimum. In other words, the lock timing at which the bit error rate is a minimum can be recovered.

Figure 7:
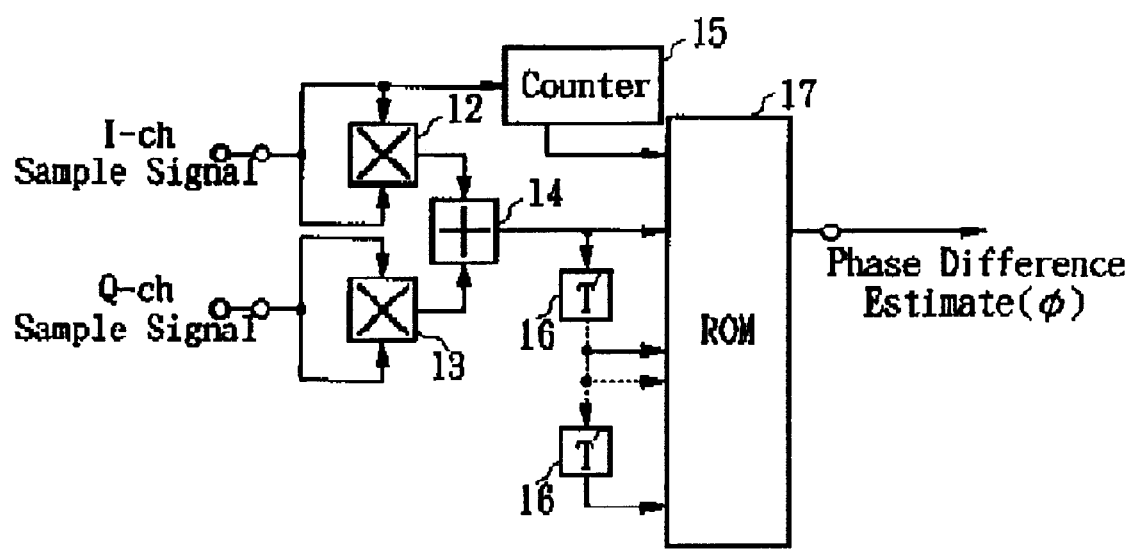
FIG. 7 shows an example of the detailed configuration of a phase estimation circuit.

FIG. 7 is a block diagram showing an example of the detailed configuration of phase estimation circuit 10. Phase estimation circuit 10 comprises multipliers 12 and 13 which respectively square the sampled signals in the in-phase and quadrature channels (hereinafter expressed as "I-ch" and "Q-ch"), an adder 14 which adds the outputs of these, a counter 15 which counts the number of samples by observing when the digital data representing a sampled signal changes, a plurality of delay circuits 16 which successively delay the output of adder 14 by delay time T'(=T+Dt), and a ROM 17 in which an estimate of the phase difference between the system clock signal and the clock timing at which the bit error rate is a minimum has been stored in advance.

Figure 8:
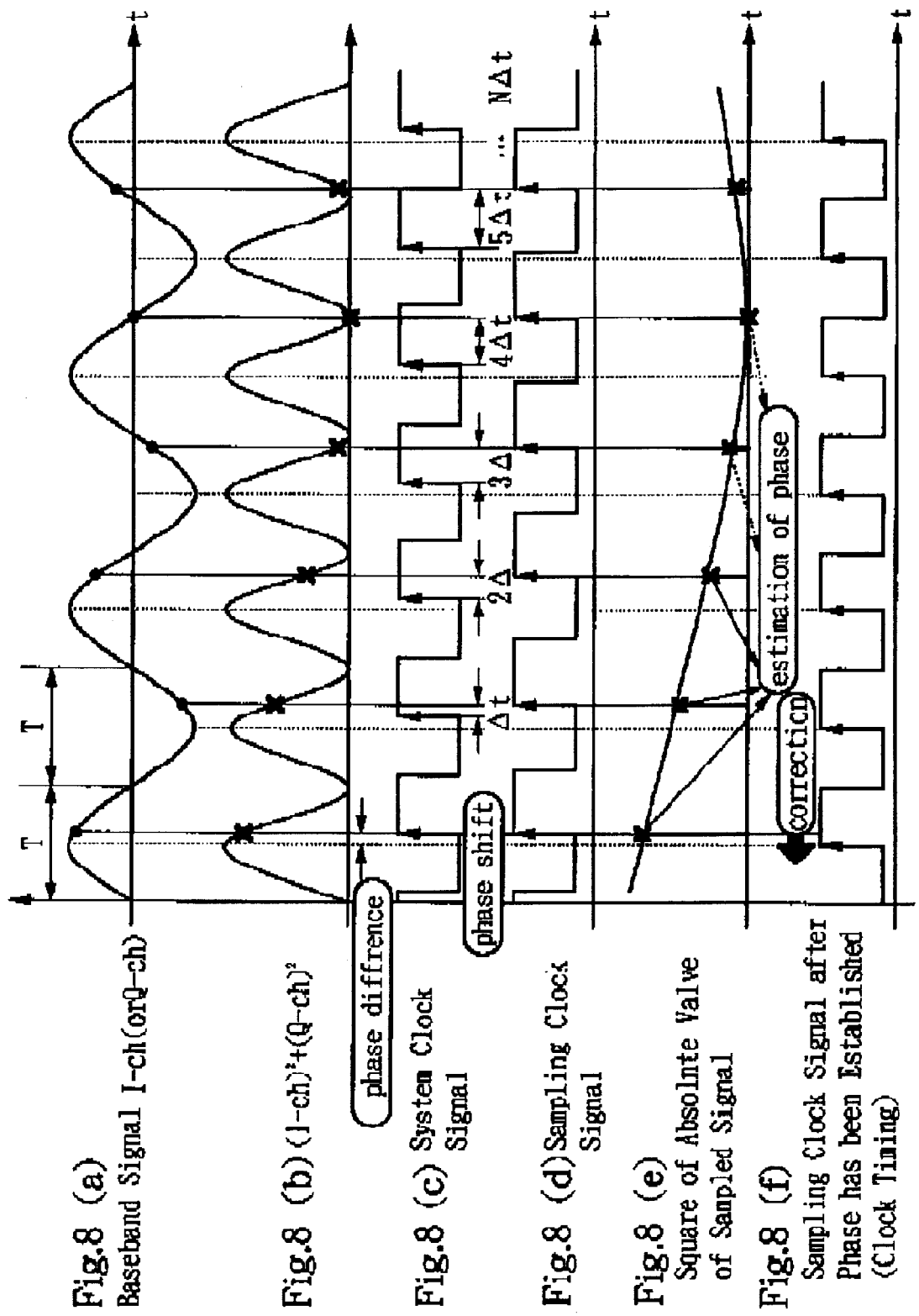
FIG. 8(a)–(f) explain an example of the operation of the clock timing recovery circuit.

In FIG. 8(a)–8(f), which explain an example of the operation of phase estimation circuit 10, the following waveforms are shown: FIG. 8(a) shows a baseband signal, FIG. 8(b) shows an output of adder 14, FIG. 8(c) a system clock signal, FIG. 8(d) sampling clock signal, FIG. 8(e) a square of a sampled signal, and FIG. 8(f) a sampling clock after the phase has been established.

Phase estimation circuit 10 shown in FIG. 7 uses multipliers 12 and 13 and adder 14 to calculate (I-ch)$^2$+(Q-ch)$^2$ to eliminate carrier phase error induced amplitude fluctuations of the sampled signal. An alternative configuration performs this calculation by an analog circuit prior to sampling and samples the resulting signal by means of analog-to-digital converters separate from the main signal lines.

The sampled signal obtained is successively delayed by T'(=T+Dt) by a plurality of delay circuits 16 (where T' is the sampling clock period) and input to ROM 17. Counter 15 observes the data changes of the sampled signal and thereby counts the number of samplings, which it inputs to ROM 17.

ROM 17 estimates, from the number of samplings and a plurality of sampled signals, the phase difference between the system clock signal and the clock timing at which the bit error rate becomes a minimum, and outputs this as a phase difference estimation result. By way of example, the estimation of phase difference can be performed as follows.

By phase shifting the system clock signal by $\Delta t$ at every sampling, a sampling clock signal giving a sampling interval which has been changed by a fixed quantity can be obtained. If the result of the calculation of (I-ch)$^2$+(Q-ch)$^2$ is sampled with the sampling clock signal thereby obtained, the n-th sampled signal works out as:

$$Y_n = A^2\{1+\cos(\omega_c n\Delta t - \phi)\} \qquad (1)$$

where, A is the amplitude, $\omega_c$ is the angular frequency of the system clock signal, $\Delta t$ is the amount of phase shift, and $\phi$ is the phase difference between the system clock signal and the clock timing at which the bit error rate is smallest. $\phi$ can be expressed as follows:

$$\phi = \cos^{-1}\frac{Y_{n-1}F(n) + Y_{n+1}F(n-1) - 2Y_n\cos(\omega_c n\Delta t)}{2Y_n\cos(\omega_c\Delta t) - (Y_{n-1} + Y_{n+1})} \qquad (2)$$

$$F(n) = \frac{\sin\{\omega_c(n+1)\Delta t\} - \sin(\omega_c n\Delta t)}{\sin(\omega_c n\Delta t)}$$

The value of $\phi$ obtained from Equation 2 is stored in ROM 17. Equation 2 is merely one example, and alternatively the $\sin^{-1}$ or $\tan^{-1}$ function can be utilized. The phase difference $\phi$ can be estimated from Equation 2 using the three lowest sampled signals. The clock timing can therefore be recovered in a short space of time.

In the foregoing example, a ROM was used to estimate phase difference $\phi$, but it is also possible to perform a similar calculation with a combination of multipliers and adders. Another possibility is to use a microprocessor or digital signal processor and perform the calculation using software.

The operation of the circuits shown in FIG. 4 and FIG. 7 will now be explained again in terms of the notation used in the above equations. Counter 9 outputs a phase control signal $\theta=n\omega_c\Delta t$ (n=0, 1, 2, ...) synchronized with the system clock signal. Switch 11 outputs the phase control signal from counter 9 to phase shift circuit 7 until it obtains the value of phase difference $\phi$ from ROM 17 in phase estimation circuit 10. When the value of the phase difference $\phi$ has been obtained from ROM 17, $\theta$ is set to $-\phi$ and is output to phase shift circuit 7. Phase shift circuit 7 shifts the phase of the system clock signal output from system clock generator 6 by $\theta$, the value of the phase control signal, and outputs a sampling clock signal which has established the phase. As a result, the clock timing at which the bit error rate is a minimum can be recovered.

Figure 9:
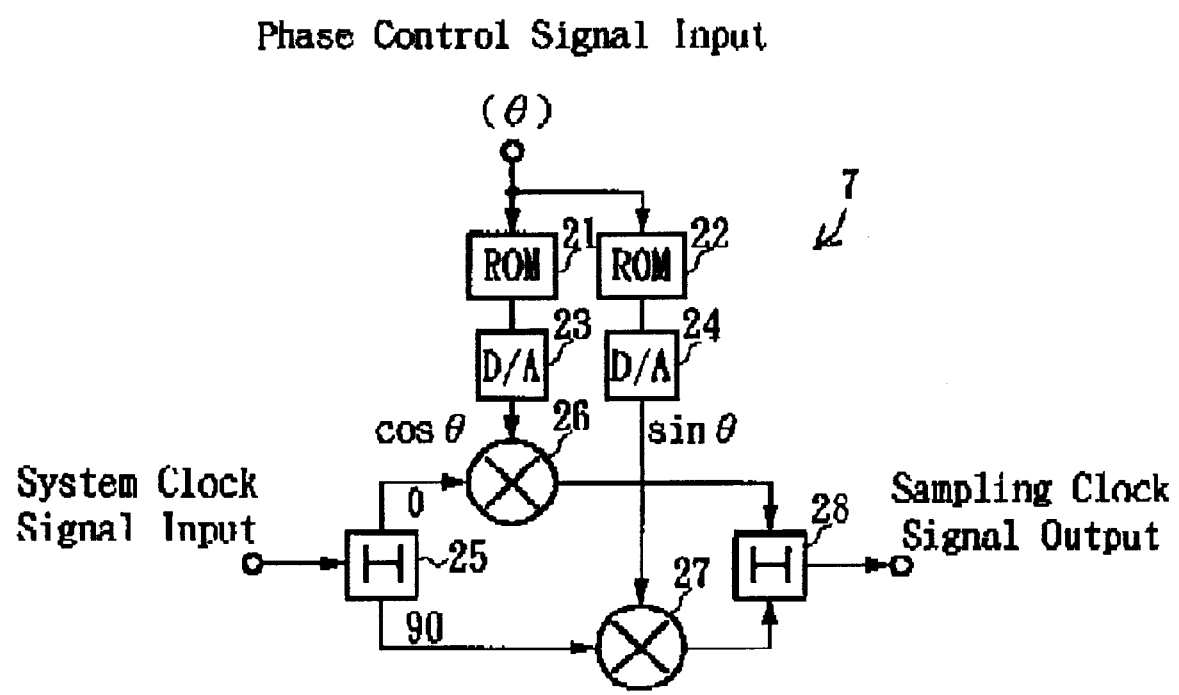
FIG. 9 shows an example of the configuration of a phase shift circuit.

FIG. 9 shows an example of the configuration of phase shift circuit 7. Phase shift circuit 7 comprises ROMs 21 and 22, digital-to-analog converters 23 and 24, hybrids 25 and 28, and analog multipliers 26 and 27. Phase control signal θ and the system clock signal are input to phase shift circuit 7. ROMs 21 and 22, respectively, output the values of cosθ and sinθ for input phase control signal θ. Digital-to-analog converters 23 and 24, respectively, convert these values to analog signals and output these to analog multipliers 26 and 27. Hybrid 25 splits the input system clock signal into two clock signals with a 90° phase difference between them, and outputs these to analog multipliers 26 and 27. Analog multipliers 26 and 27 multiply the two clock signals split by hybrid 25 by the values of cosθ and sinθ respectively, and hybrid 28 adds the results of these multiplications. The result of this processing is that a sampling clock signal phase-shifted from the system clock by θ is obtained.

In the example configuration shown in FIG. 9, the phase shift circuit is defined by analog circuits, but it is also possible to use digital circuits entirely. This can be achieved using a clock signal generator to generate a clock signal at M times the system clock signal (where M is determined by the step width of the phase shift) and a variable-length register to give a variable amount of shift.

In the foregoing explanation, the $(I\text{-}ch)^2 + (Q\text{-}ch)^2$ form of the sampled signal was represented by Equation 1. On the other hand, when coherent detection is employed for the demodulation, because the influence of carrier phase error can be virtually ignored, the $(I\text{-}ch)^2$ or $(Q\text{-}ch)^2$ form of the sampled signal can be represented by Equation 1. It is also possible to estimate phase difference φ by expressing the I-ch or Q-ch form of the sampled signal as:

$$Y_n = A \cos(\omega_c n\Delta t/2 - \phi)\} \quad (3)$$

If a clock recovery code is transmitted from the transmitting side as a binary signal, it will also be possible to utilize the clock timing recovery circuit of the embodiment described above for a multilevel modulation scheme.

Furthermore, if the modulation scheme is π/4 shift QPSK, because the carrier phase plane rotates in a fixed direction by π/4 at every symbol, baseband signal processing circuit 4 corrects the carrier phase plane by −π/4 at every symbol. This correction can also be performed on an analog basis prior to analog-to-digital converters 2 and 3.

In the foregoing explanation of the first embodiment, it was assumed that the demodulator employs coherent detection, quasi-coherent detection or baseband delay detection schemes, and that the clock timing recovery circuit is capable of supporting these schemes. However, the clock timing recovery circuit described above can also be utilized in similar manner in a demodulator that uses an IF delay detection scheme.

Figure 10:
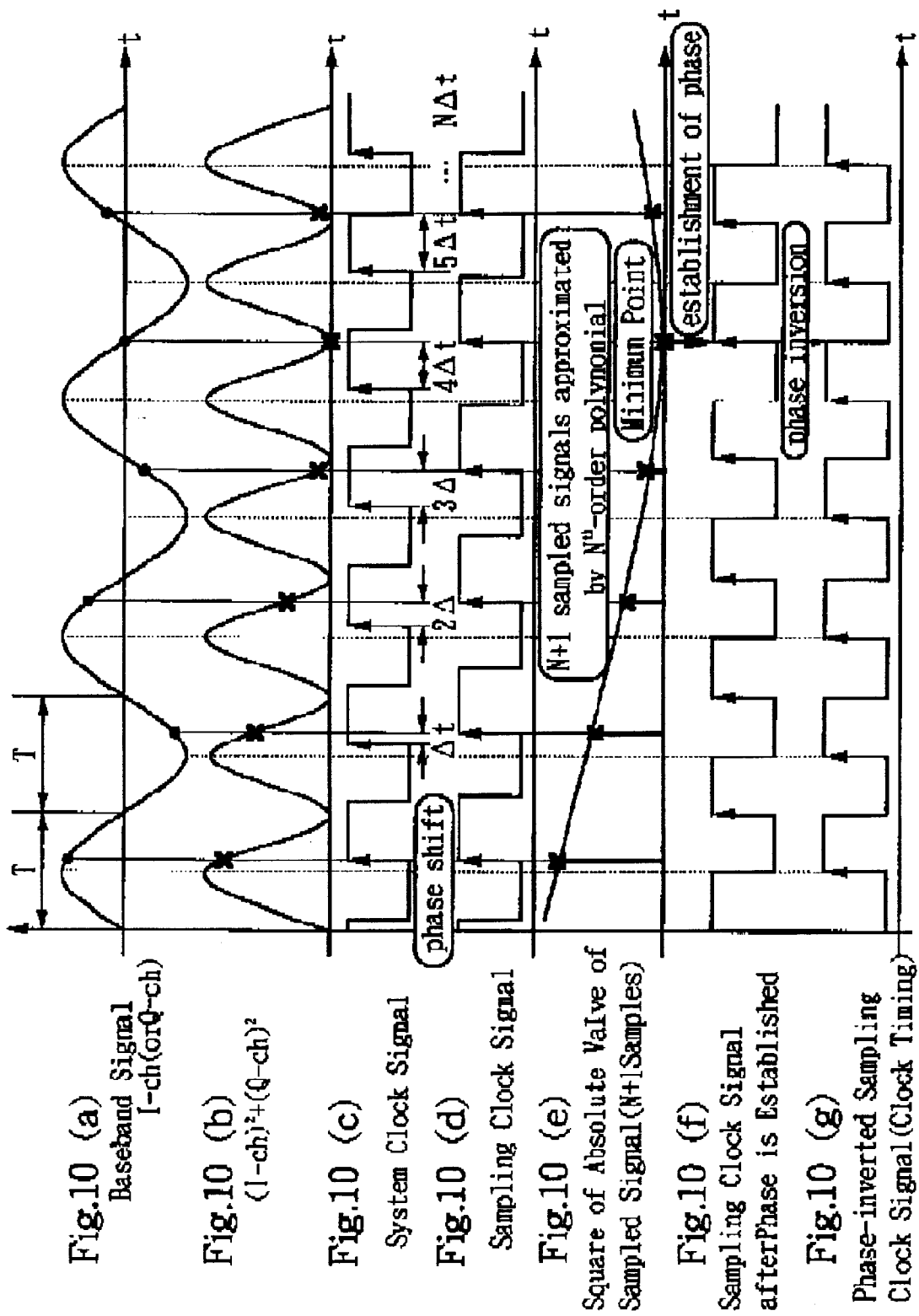
FIG. 10(a)–(g) serve to explain another example of the operation of the clock timing recovery circuit.

FIG. 10(a)–10(g) explain another example of the operation of clock timing recovery circuit 5, and shows an example in which the sampled signal is approximated not by a trigonometric, function but by an Nth order polynomial. The following waveforms are shown: FIG. 10(a) shows a baseband signal, FIG. 10(b) shows $(I\text{-}ch)^2 + (Q\text{-}ch)^2$, FIG. 10(c) shows a system clock signal, FIG. 10(d) sampling clock signal, FIG. 10(e) sampled signal, FIG. 10(f) sampling clock signal after the phase has been established, FIG. 10(g) shows a sampling clock signal with phase inverted.

In this case, N+1 sampled signals obtained in the same manner as explained with reference to FIG. 8(a)–(f) are approximated by an Nth order polynomial. Namely:

$$y(t) = a_0 + a_1 t + \ldots + a_N t^N \quad (4)$$

The values of $a_n$ in this equation (n=1, 2, ..., N) are found. To do this, if simultaneous equations with N+1 unknowns are solved, the following equation is obtained:

$$\begin{bmatrix} a_0 \\ a_1 \\ \vdots \\ a_N \end{bmatrix} = \begin{bmatrix} 1 & 0 & \cdots & 0 \\ 1 & \Delta t & \cdots & \Delta t^N \\ \vdots & \vdots & & \vdots \\ 1 & N\Delta t & \cdots & (N\Delta t)^N \end{bmatrix}^{-1} \begin{bmatrix} y(0) \\ y(\Delta t) \\ \vdots \\ y(N\Delta t) \end{bmatrix} \quad (5)$$

Next, to obtain the extreme values of Equation 4, t is found after differentiating Equation 4, which gives:

$$dy/dt = a_1 + 2 a_2 t + \ldots + n a_N t^{N-1} \quad (6)$$

In addition, when nΔt≡t, if the value of the nth sampled signal y(nΔt) approaches a maximum value of the sampled signal, then because t is a maximum point, the phase shift circuit is controlled by the clock timing estimation circuit so that sampling takes place with timing t. Conversely, if y(nΔt) approaches a minimum value, then because t is a minimum point, the phase shift circuit is controlled by the clock timing circulation circuit so that after the sampling clock signal has been established with timing t, the phase of this timing is inverted. This gives the clock timing at which the bit error rate is minimum.

According to the embodiment explained above, it is unnecessary to oversample, as in a conventional clock recovery circuit using a binary quantised digital phase-locked loop, and because processing can be performed using a sampling clock signal of the same order as the symbol rate, the circuit can easily cope with high transmission rates. Moreover, the phase of the sampling clock signal can be aligned with the mid-point of the symbols in as few as 3 samplings, i.e., in no more than 4 symbols. This symbol mid-point is the point at which the eye opening is largest and the bit error rate is smallest. It is therefore possible to recover the clock timing having a minimum bit error rate (i.e., the optimum clock timing) in a short space of time.

The foregoing explanation concerns the rapid recovery of clock timing from a clock timing recovery signal. An explanation will now be given of an embodiment which performs clock timing recovery by tracking frequency fluctuations that occur after clock timing has already been recovered in the manner of the first embodiment, or which performs clock timing recovery for continuous digital data.

Figure 11:
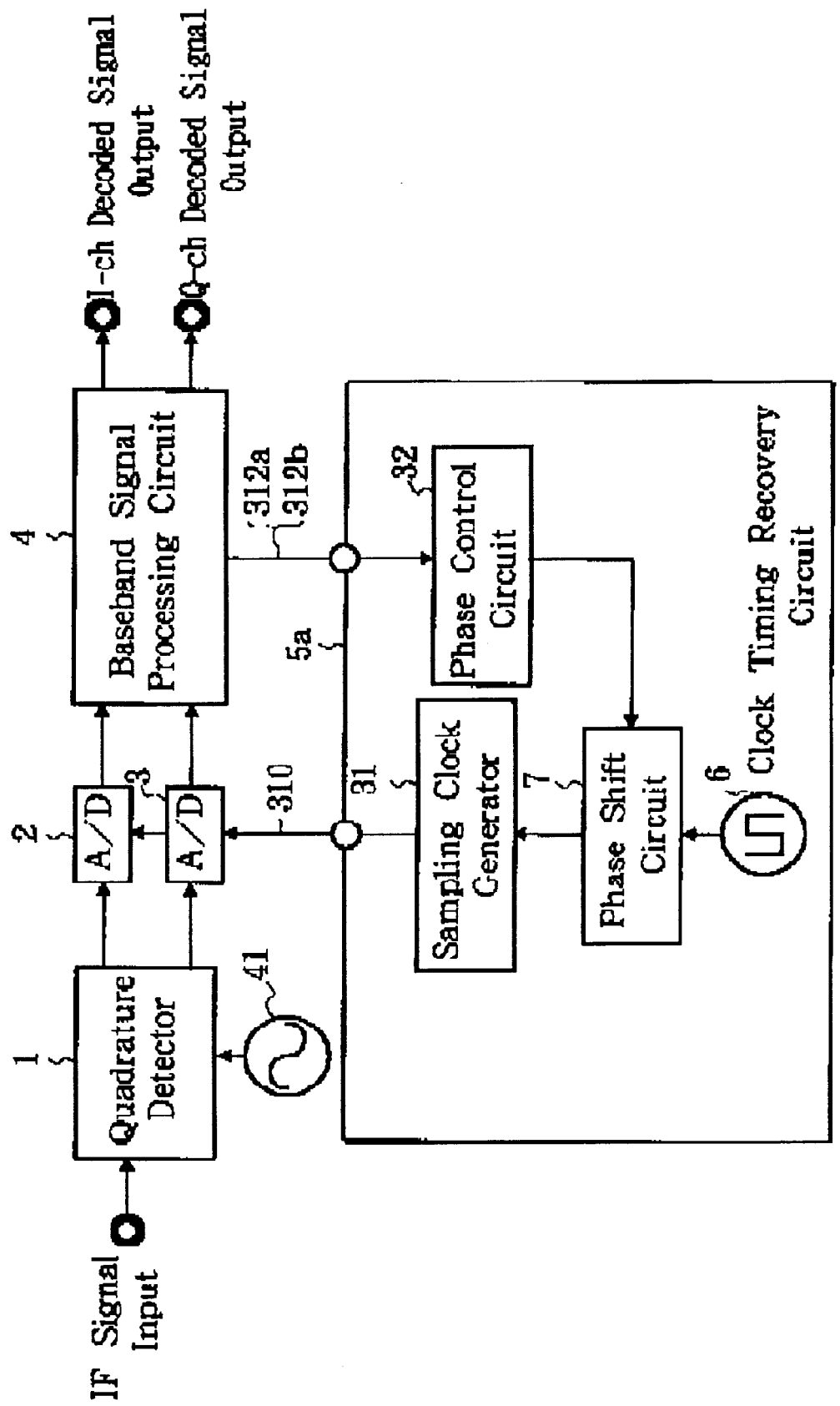
FIG. 11 is a block diagram showing a second embodiment of the present invention.

FIG. 11 is a block diagram of a second embodiment of the present invention, and shows an example of the configuration of a demodulator which is equipped with a clock timing recovery circuit.

This demodulator comprises a quadrature detector 1, an oscillator 41, analog-to-digital converters 2 and 3, a baseband signal processing circuit 4, and clock timing recovery circuit 5a. An IF signal is input to quadrature modulator 1. Oscillator 41 generates a carrier signal which is not synchronized with the IF signal and supplies this to quadrature detector 1. Analog-to-digital converters 2 and 3 sample the outputs of quadrature detector 1 with the timing of the sampling clock signal 310 supplied from clock timing recovery circuit 5a, and convert the outputs to digital signals. Baseband signal processing circuit 4 processes the sampled signals output by analog-to-digital converters 2 and 3, outputs decoded signals 312a, and also outputs the decision error(i.e., a decision error signal 312b) obtained from these sampled signals to clock timing recovery circuit 5a.

Clock timing recovery circuit 5a comprises a system clock generator 6, a phase shift circuit 7, a sampling clock signal generator 31 and a phase control circuit 32. System clock generator 6 generates a system clock signal with a predefined fixed period. Phase shift circuit 7 outputs, as the clock timing for sampling the baseband signal in the demodulator, corrected clock signal $t_0$ which corrects the phase of the system clock signal output by system clock generator 6. Sampling clock generator 31 generates a clock signal which alternately has a leading or trailing edge point which leads the leading or trailing edge point of corrected clock signal $t_0$ by a predefined timing difference $\delta t$, and a leading or trailing edge point which lags behind the leading edge or trailing edge point of corrected clock signal $t_0$ by the same timing difference $\delta t$. Sampling clock generator 31 outputs this clock signal as the sampling clock signal for the main signal lines. Phase control circuit 32 compares, on the basis of decision error signals from baseband signal processing circuit 4, the decision error obtained from the sampled signal at the leading or trailing edge point which leads by $\delta t$, with the decision error obtained from the sampled signal at the leading or trailing edge point which lags by $\delta t$, and on the basis of this comparison result, calculates the amount of phase shift of phase shift circuit 7. By controlling the amount of phase shift of phase shift circuit 7 on the basis of this calculation result, a leading edge or trailing edge of corrected clock signal $t_0$ can be brought into alignment with the optimum clock timing.

Figure 12:
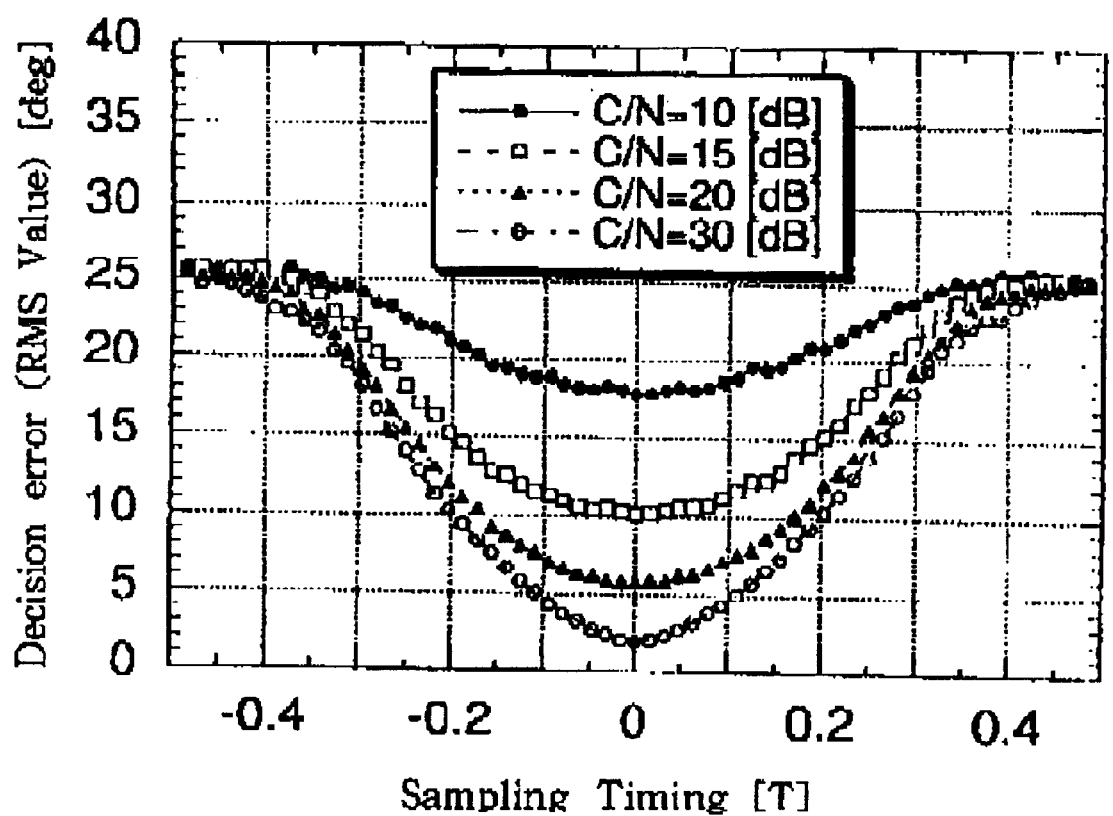
FIG. 12 shows the decision error as a function of sampling timing in the baseband signal processing circuit.

FIG. 12 shows the decision error in baseband signal processing circuit 4 as a function of sampling timing. Sampling at timings that deviate from the optimum timing (the timing at which the decision error is minimum) results in the absolute value or the square of the decision error tracing a convex curve with a downwards-pointing apex. FIG. 12 shows the results obtained by computer simulation of the root-mean-square (RMS) value of the decision error as a function of sampling timing under various fixed carrier-to-noise power ratios (C/N). In this simulation, the modulation and demodulation schemes were taken to be QPSK and differential detection, respectively, and the transmission system was assumed to be a Nyquist system with a roll-off factor of 0.6. It will be seen from FIG. 12 that the decision error, and thereby the bit error rate as well, becomes a minimum at the timing at which the derivatives of the curves traced by the decision error become zero.

Figure 13:
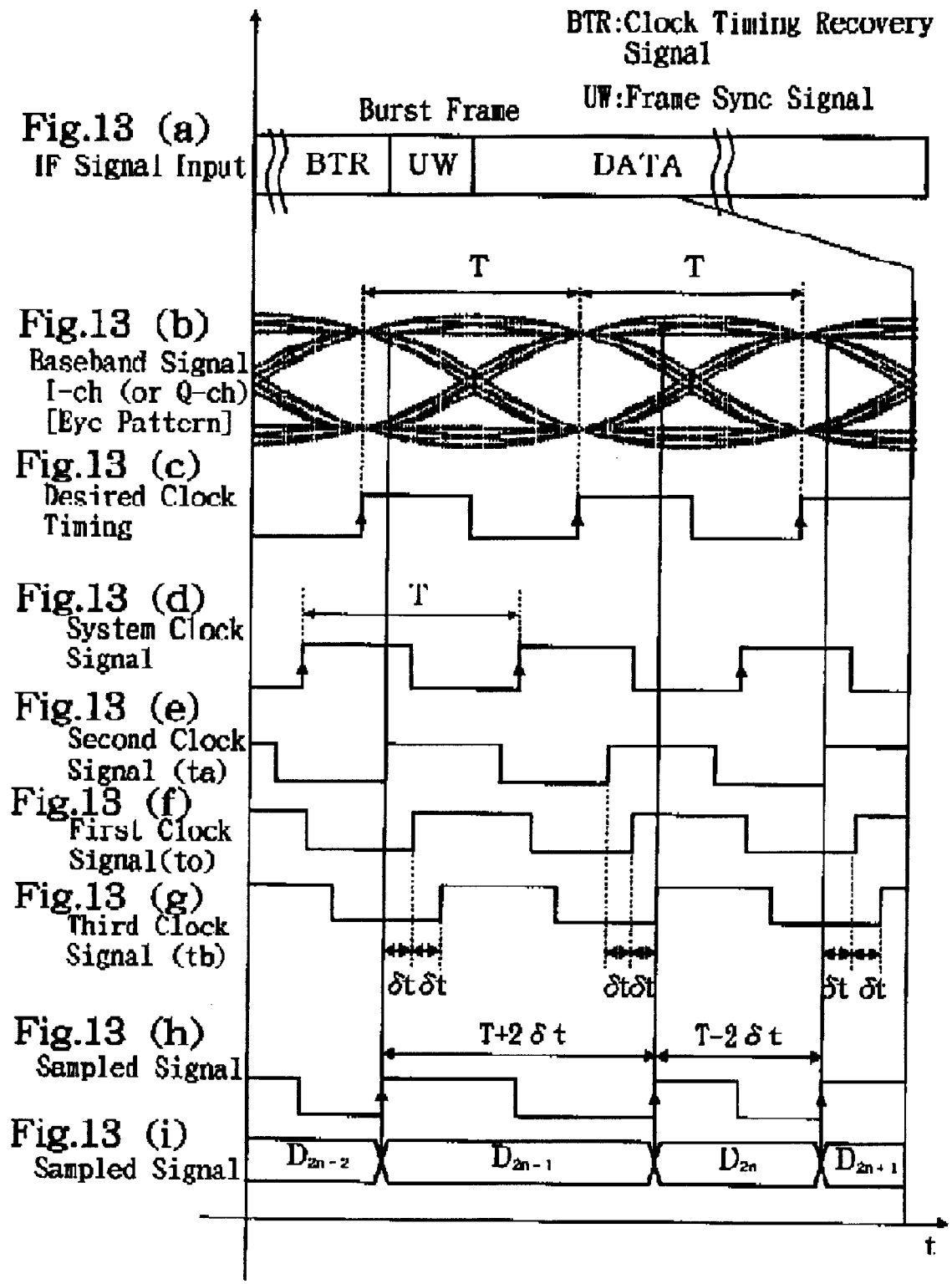
FIG. 13(a)–(i) show the various signal waveforms.

FIG. 13(*a*)–13(*i*) show the signals at various parts of the circuit, as follows: FIG. 13(*a*) shows the intermediate frequency signal input to quadrature detector 1, showing the configuration of a burst signal frame; FIG. 13(*b*) shows baseband signal (eye pattern) output from quadrature detector 1; FIG. 13(*c*) shows a desired clock timing; FIG. 13(*d*) shows a system clock signal output by system clock generator 6; FIG. 13(*e*) shows a clock signal $t_a$ which leads corrected clock signal $t_0$ output by phase shift circuit 7 by timing difference $\delta t$; FIG. 13(*f*) shows corrected clock signal $t_0$ output by phase shift circuit 7; FIG. 13(*g*) shows a clock signal $t_b$ which lags corrected clock signal $t_0$ by timing difference $\delta t$; FIG. 13(*h*) sampling clock signal output by sampling clock generator 31; FIG. 13(*i*) sampled signal output by analog-to-digital converters 2 and 3.

As shown in FIG. 13(*a*)–13(*i*), phase shift circuit 7 forms corrected clock signal $t_0$, which is obtained by shifting the phase of system clock system t. The amount of phase shift from t to $t_0$ is $\tau$. Note, however, that $\tau=0$ when this clock timing recovery circuit 5*a* is in its initial state, and that when the clock timing is established, $\tau$ constitutes the time difference between system clock signal t and the clock timing at which the bit error rate becomes a minimum. On the basis of corrected clock signal $t_0$, sampling clock generator 31 forms two clock signals $t_a$ and $t_b$ with a phase difference of $2\delta t$ and uses these two clock signals to generate the sampling clock signal shown in FIG. 13(*h*). This sampling clock signal is supplied to analog-to-digital converters 2 and 3 where it is used to sample the baseband signal. Phase control circuit 32 obtains, on the basis of the decision error signal e obtained from baseband signal processing circuit 4, the absolute values or the squares of the decision errors $e_a$ and $e_b$ obtained using the timings of clock signals $t_a$ and $t_b$, respectively. Phase control circuit 32 also obtains sampling timing correction $+\alpha$ or $-\alpha$ or 0 on the basis of $e_a$, $e_b$ and difference $\delta e$. $\alpha$ ($\alpha>0$) is the correction width, and can either be set to a constant value or can be changed adaptively according to difference $\delta e$. Phase control circuit 32 updates the sampling timing as follows:

$\delta e>0$: replace $t_0$ with $t_0+\alpha$
$\delta e<0$: replace $t_0$ with $t_0-\alpha$
$\delta e=0$: leave $t_0$ unchanged.

Figure 14:
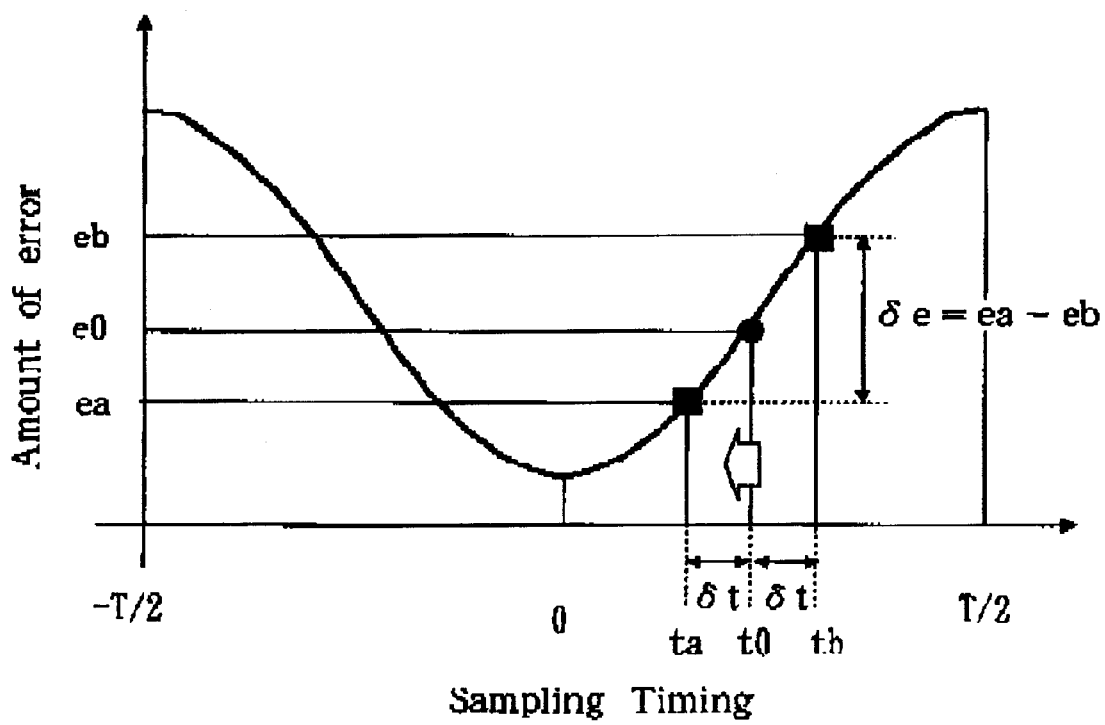
FIG. 14 explain the operating principles of the present invention.

FIG. 14 explains the operating principles and shows the relation between sampling timing and decision error. The sampling timing is repeatedly updated in phase shift circuit 7 on the basis of the above updating equations, and when $\delta e$ has become zero, the derivative of the curve shown in FIG. 14 becomes zero and the mid-point $t_0$ between $t_a$ and $t_b$ coincides with the timing at which the decision error becomes a minimum, or in other words with the clock timing at which the bit error rate becomes a minimum.

Clock timing recovery circuit 5*a* in this second embodiment can cause the sampling timing to coincide with the clock timing at which the bit error rate becomes a minimum, at a processing speed of the order of the symbol rate. Accordingly, because oversampling is not necessary, this clock timing recovery circuit can easily cope with high symbol rates and can also achieve reductions in power consumption. Furthermore, because the system clock signal is incorporated in the clock timing recovery circuit, the clock signal is not lost even if the IF signal level drops. In addition, because almost the entire constitution of the clock timing recovery circuit can be implemented with digital circuits, there is little clock jitter, and once the parameters $\delta t$ and $\alpha$ have been set so that only a short time is required to establish the clock timing, it is unnecessary to make subsequent adjustments to these parameters. A non-adjusting circuit is therefore possible.

Figure 15:
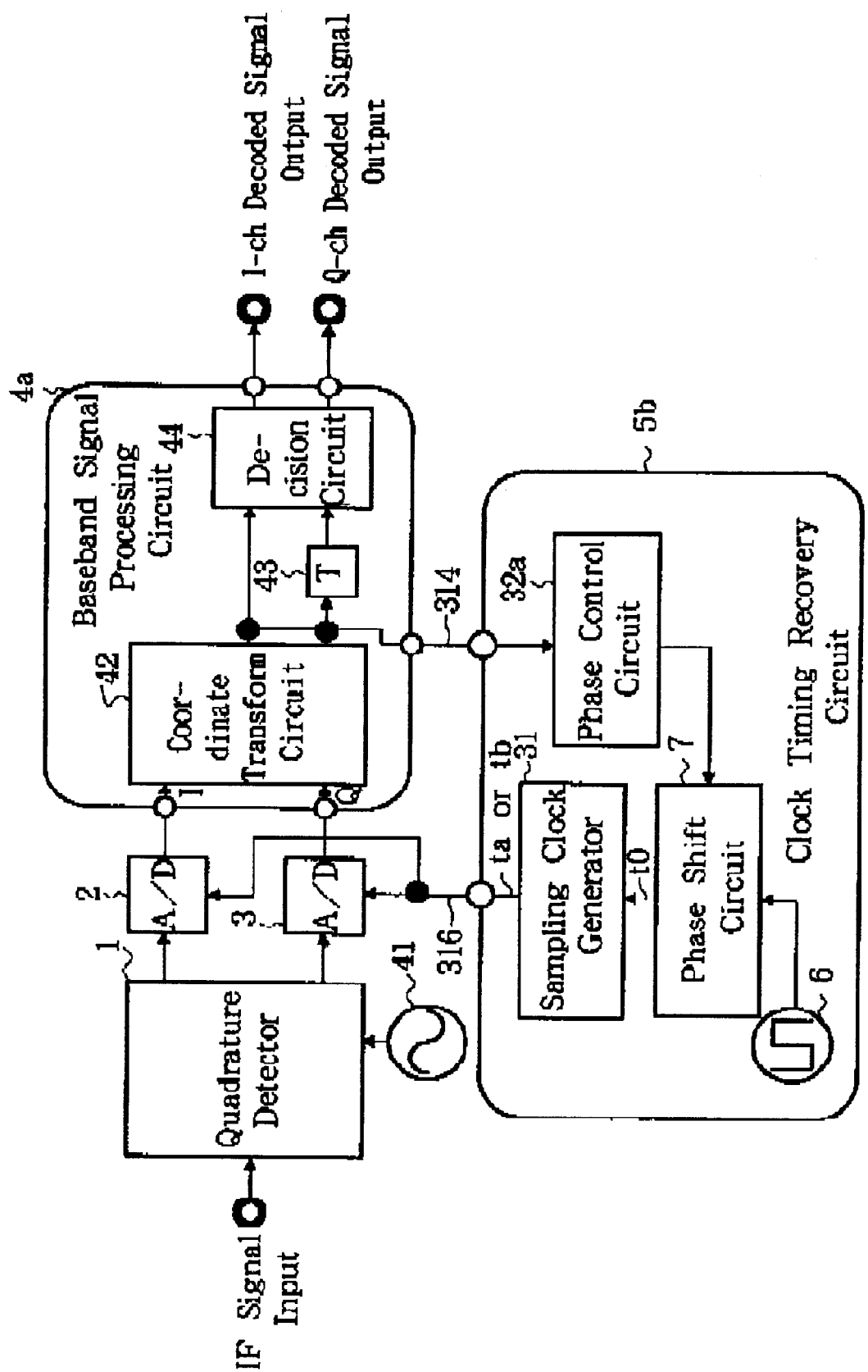
FIG. 15 is a block diagram showing a third embodiment of the present invention.

FIG. 15 is a block diagram of a third embodiment of the present invention, and shows the configuration of a clock timing recovery circuit and a demodulator, in which this is provided. This embodiment implements the present invention in the clock timing recovery circuit of a demodulator which uses a phase modulation scheme, such as QPSK or $\pi/4$ shift QPSK, for the modulation and a quasi-coherent detection scheme, such as baseband differential detection, for the demodulation. The demodulator comprises a quadrature detector 1, an oscillator 41, analog-to-digital converters 2 and 3, a baseband signal processing circuit 4*a* and a clock timing recovery circuit 5*b*. The IF signal is input to quadrature detector 1. Oscillator 41 generates a carrier signal which is not synchronized with the IF signal and supplies the carrier signal to quadrature modulator 1. Analog-to-digital converters 2 and 3 respectively sample the in-phase and quadrature channel outputs from quadrature modulator 1 and convert these outputs to digital signals. Baseband signal processing circuit 4*a* processes the sampled signals in the in-phase and quadrature channels output by analog-to-digital converters 2 and 3, and thereby obtains a decoded signal for each channel. Clock timing recovery circuit 5*b* generates, from the phase component $\theta$ 314 of the sampled signals, a sampling clock signal 316 which it supplies to the analog-to-digital converters.

Baseband signal processing circuit 4a comprises a coordinate transform circuit 42, a delay circuit 43 and a decision circuit 44. Coordinate transform circuit 42 obtains the phase component by transforming the orthogonal coordinate representation of the sampled in-phase and quadrature signals to a polar coordinate representation. Delay circuit 43 causes the output of this coordinate transform circuit 42 to be delayed by one symbol period T. Decision circuit 44 obtains the decoded signal for each channel from the output of coordinate transform circuit 42 and the output of delay circuit 43; in other words, from the phase components of the two sampled signals which deviate by one symbol period.

Clock timing recovery circuit 5b comprises a system clock generator 6, phase shift circuit 7, a sampling clock generator 31 and a phase control circuit 32a. The phase component of the sampled signal obtained by coordinate transform circuit 42 in baseband signal processing circuit 4a is input to phase control circuit 32a, which controls the amount of phase shift of phase shift circuit 7 on the basis of this phase component. The operation of system clock generator 6 and phase shift circuit 7 is the same as in the first embodiment illustrated in FIG. 4 and as in the second embodiment illustrated in FIG. 11, and the operation of sampling clock generator 31 is the same as in the second embodiment.

Figure 16:
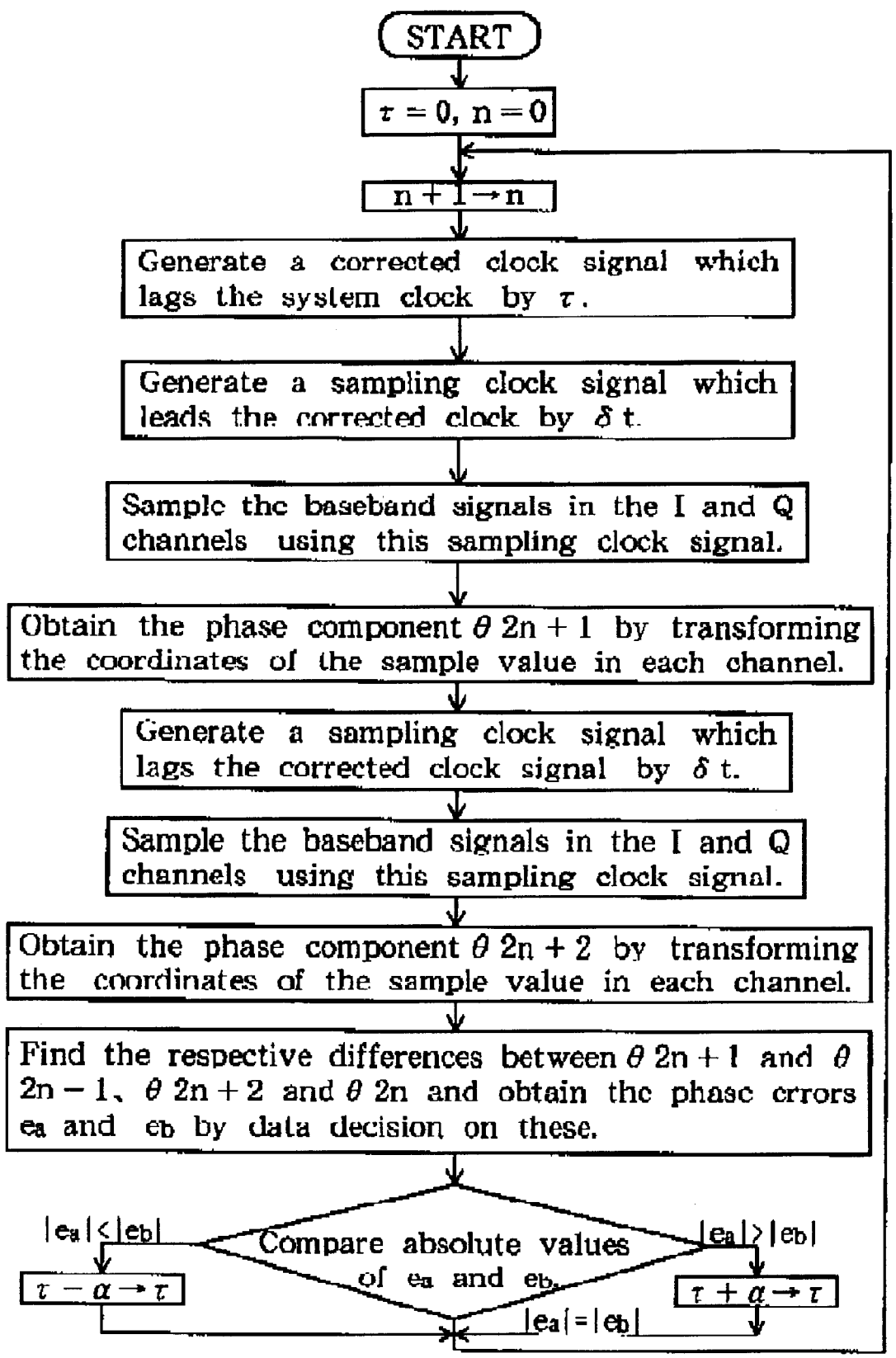
FIG. 16 shows the operating flow of the third embodiment.

The operating flow of the clock timing recovery in this third embodiment is shown in FIG. 16. This operating flow shows not only the operation of clock timing recovery circuit 5b but also the related operations of analog-to-digital converters 2 and 3 and of coordinate transform circuit 42.

Figure 17:
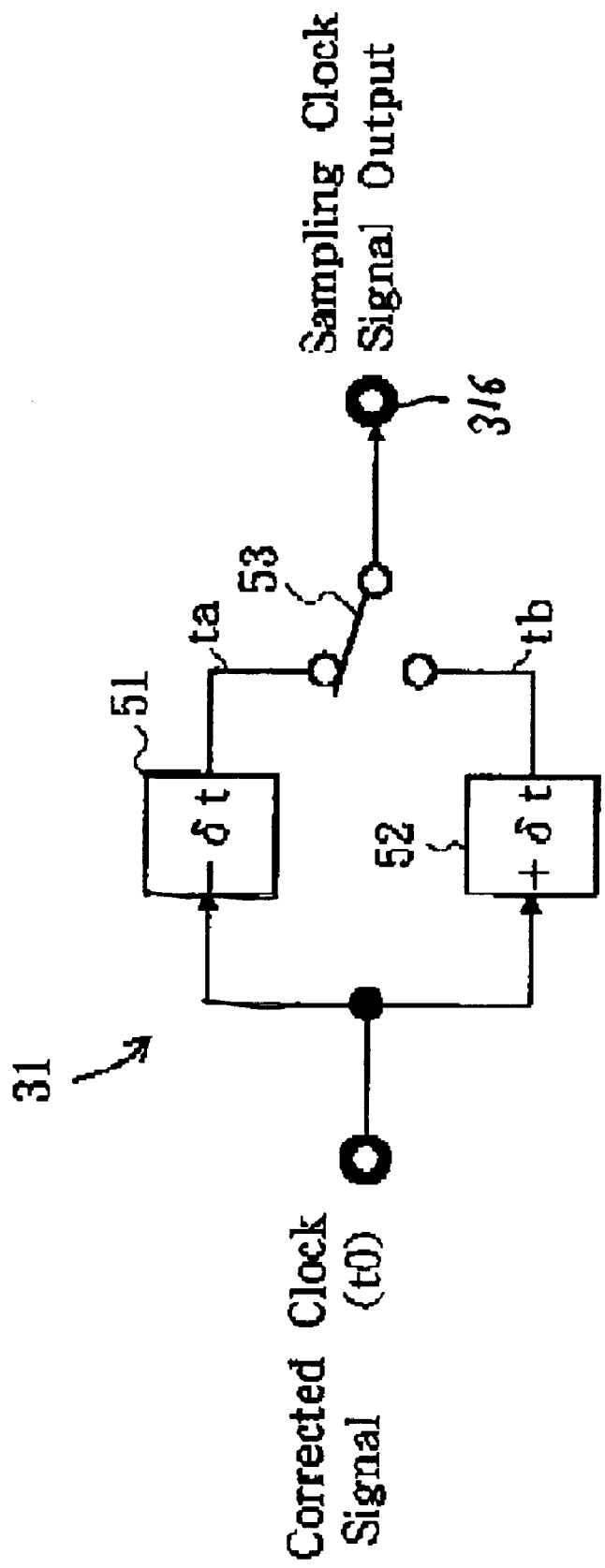
FIG. 17 shows an example of a specific configuration of a sampling clock generator.

FIG. 17 shows an example of a specific configuration of sampling clock generator 31. This sampling clock generator 31 comprises phase lead circuit 51, phase delay circuit 52, and switch 53. Phase lead circuit 51 causes the timing of corrected clock signal $t_0$ to lead by δt. Phase delay circuit 52 causes the timing of corrected clock $t_0$ to lag by δt. Switch 53 switches alternately between the outputs of these circuits in synchronisation with corrected clock signal $t_0$.

Figure 18:
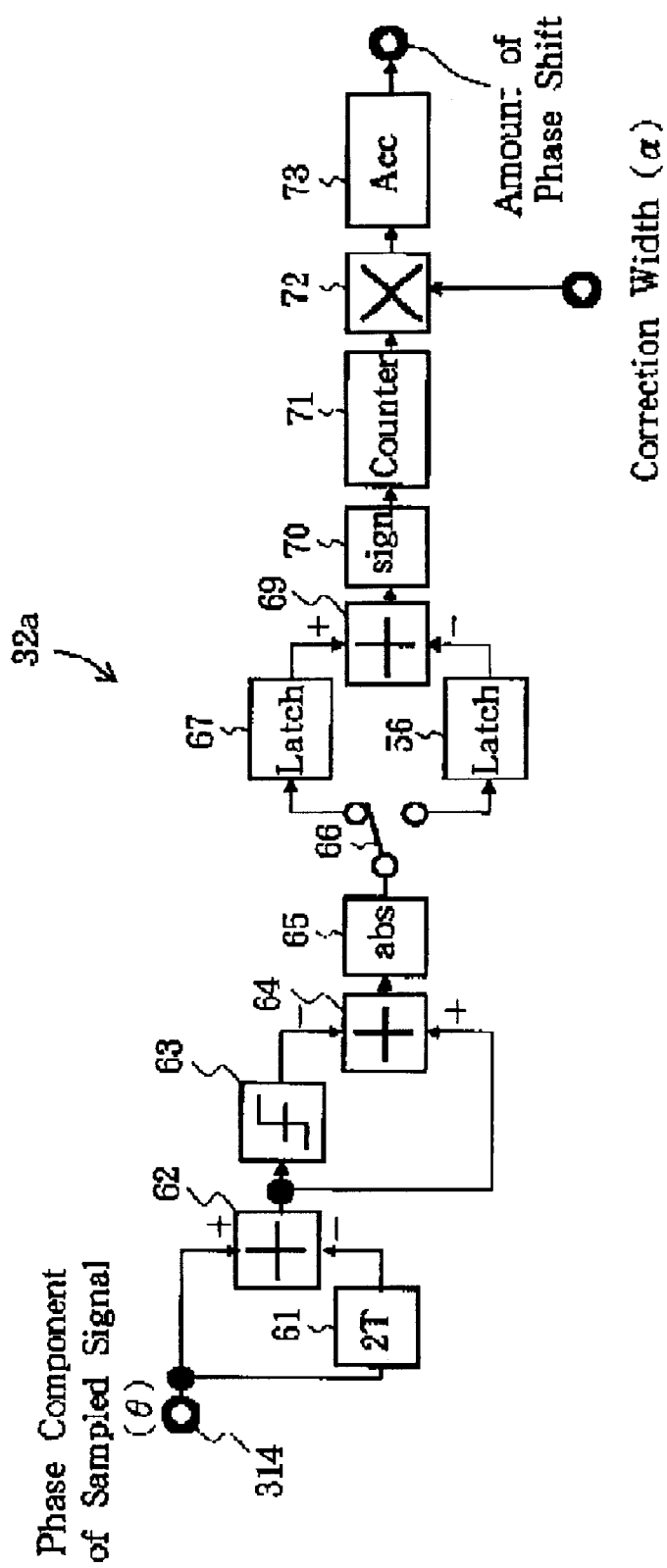
FIG. 18 shows an example of the configuration of a phase control circuit.

FIG. 18 shows an example of a specific configuration of phase control circuit 32a. This circuit comprises a delay circuit 61, an adder 62, a decision circuit 63, an adder 64, an absolute value circuit 65, a switch 66, latches 67 and 68, an adder 69, a sign detector 70, up/down counter 71, a multiplier 72, and an accumulator 73. The phase component θ of the sampled signal 314 is supplied from coordinate transform circuit 42 in baseband signal processing circuit 4a to this phase control circuit 32a. Delay circuit 61 causes this signal to be delayed by two symbol periods 2T, and adder 62 obtains the difference between the phase component θ of the sampled signal and the output of delay circuit 61. Decision circuit 63 decides the output of adder 62, and adder 64 calculates the difference between the output of adder 62 and the output of decision circuit 63, i.e., the decision error. Absolute value circuit 65 calculates the absolute value of the output of adder 64. Switch 66 distributes the output of absolute value circuit 65 to the two latches 67 and 68 in each symbol period. Latches 67 and 68 store the output of switch 66 for two symbol periods. Adder 69 obtains the difference δe between the outputs of the two latches 67 and 68 once every two symbols. Sign detector 70 obtains the sign of the output of adder 69. Up/down counter 71 counts the output of sign detector 70 and outputs a +1 or a −1 when its value has exceeded a fixed amount. Multiplier 72 multiplies the output of up/down counter 71 by the correction width α (α>0) and outputs the result as an amount of correction. Accumulator 73 accumulates these corrections and outputs them to phase shift circuit 7. In this example, the difference δe between the outputs of the two latches 67 and 68 can be expressed as follows:

$$\delta e = |Err(\theta_{2n+1} - \theta_{2n-1})| - |Err(\theta_{2n} - \theta_{2n-2})| \tag{4}$$

where $\theta_{2n}$ is the phase component of the 2n-th sampled signal and Err is a function expressing the decision error.

A squaring circuit can be used instead of absolute value circuit 65. An alternative configuration would be to use an accumulator instead of sign detector 70 and up/down counter 71, and to cause the amount of correction to change adaptively in accordance with the amount of error.

Figure 19:
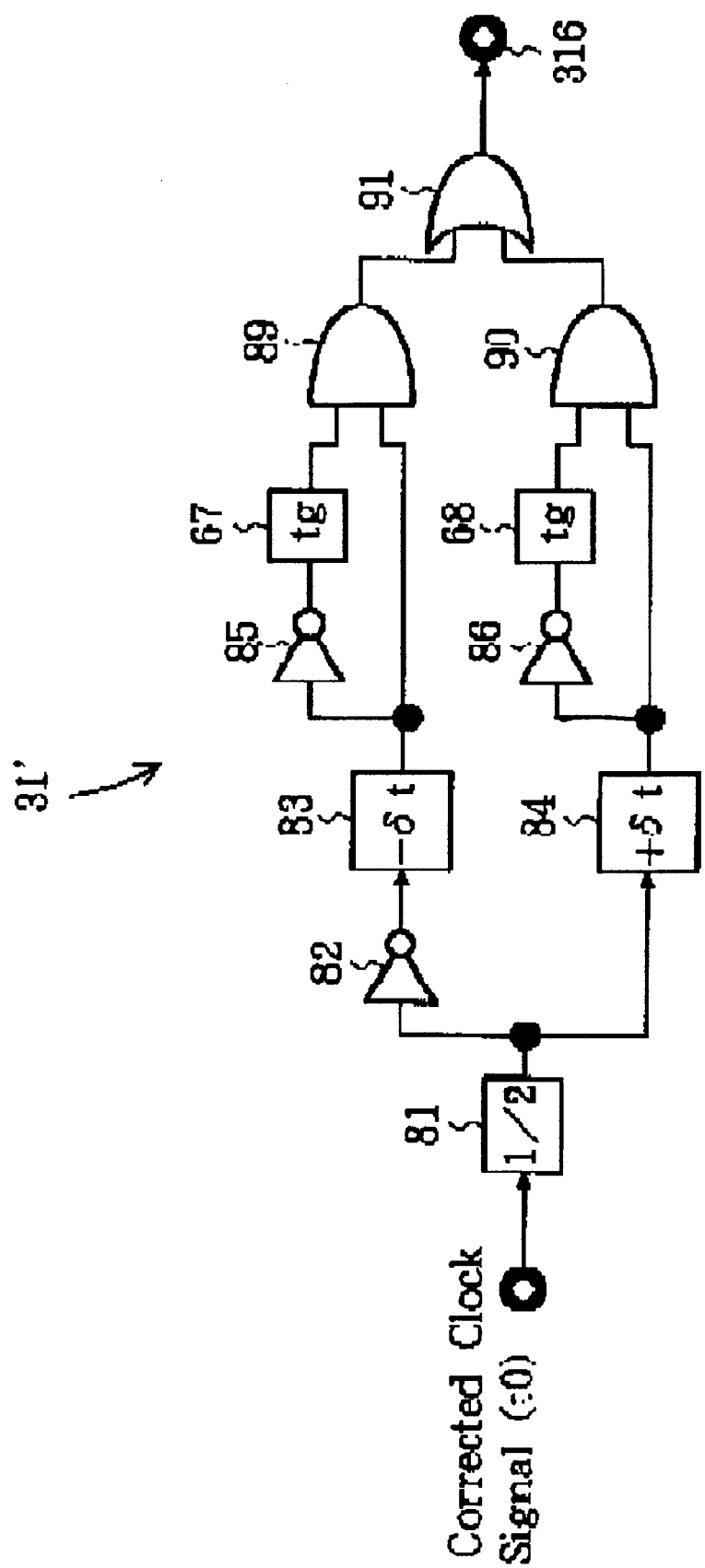
FIG. 19 shows another example of the configuration of a sampling clock generator.

FIG. 19 shows another example of the configuration of sampling clock generator 31. This sampling clock generator 31, comprises a frequency divider 81, an inverter 82, a phase lead circuit 83, a phase delay circuit 84, inverters 85 and 86, delay circuits 87 and 88, AND circuits 89 and 90, and OR circuit 91. Frequency divider 81 halves the frequency of corrected clock signal $t_0$. Inverter 82 inverts the clock signal that is output by frequency divider 81. Phase lead circuit 83 causes the timing of the clock signal output by inverter 82 to lead by δt, while phase delay circuit 84 causes the timing of the clock signal output by frequency divider 81 to lag by δt. Inverters 85 and 86 respectively invert the clock signals output by phase lead circuit 83 and phase delay circuit 84. Delay circuits 87 and 88 respectively delay the outputs of inverters 85 and 86 by a very small time $t_g$. AND circuit 89 obtains the logical product of the clock signal that is output by phase lead circuit 83 and the clock signal obtained by inverting this clock signal and then delaying it by $t_g$ (i.e., the output of delay circuit 87). AND circuit 90 obtains the logical product of the clock signal that is output by phase delay circuit 84 and the clock signal obtained by inverting this clock signal and then delaying it by $t_g$ (i.e., the output of delay circuit 88). OR circuit 91 obtains the logical sum of the clock signals output by AND circuit 89 and 90.

Figure 20:
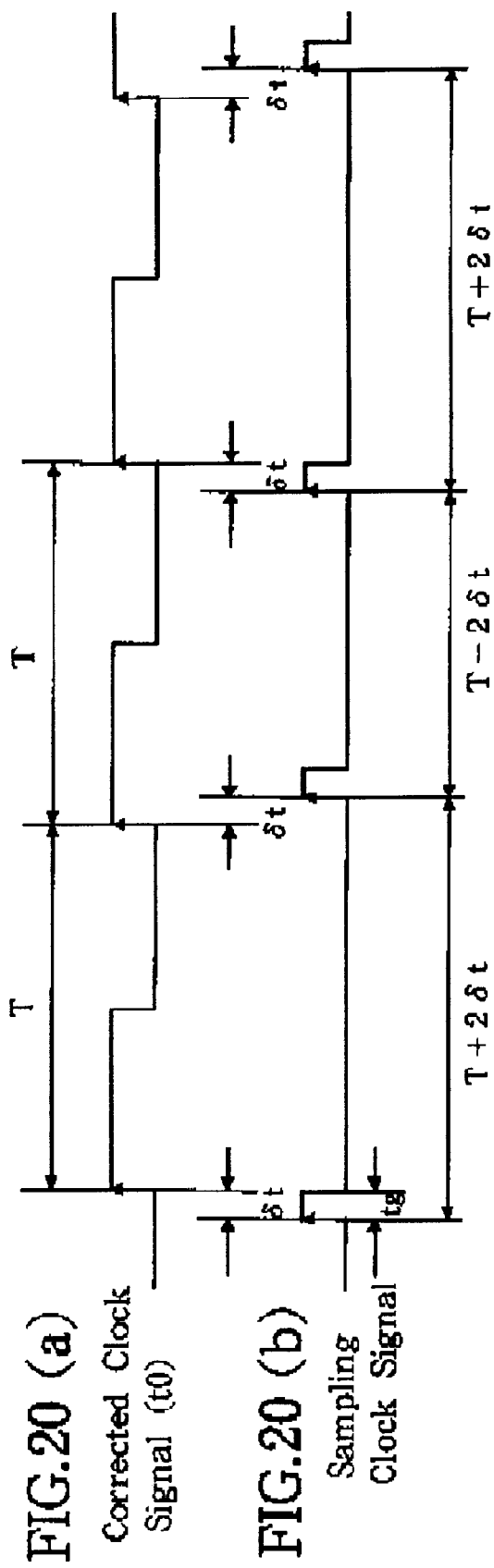
FIGS. 20(a) and 20(b) show the sampling clock signal which is output by the sampling clock generator illustrated in FIG. 19.

FIGS. 20(*a*) and 20(*b*) show the sampling clock signal that is output by the sampling clock generator shown in FIG. 19. With the configuration shown in FIG. 19, the duty ratio of the sampling clock signal output by the sampling clock generator does not reach 50%. However, analog-to-digital converters capable of supporting such a clock signal are already commercially available, and provided that $t_g$ is made longer than the hold time required by the analog-to-digital converter, these will certainly be useable.

Figure 21:
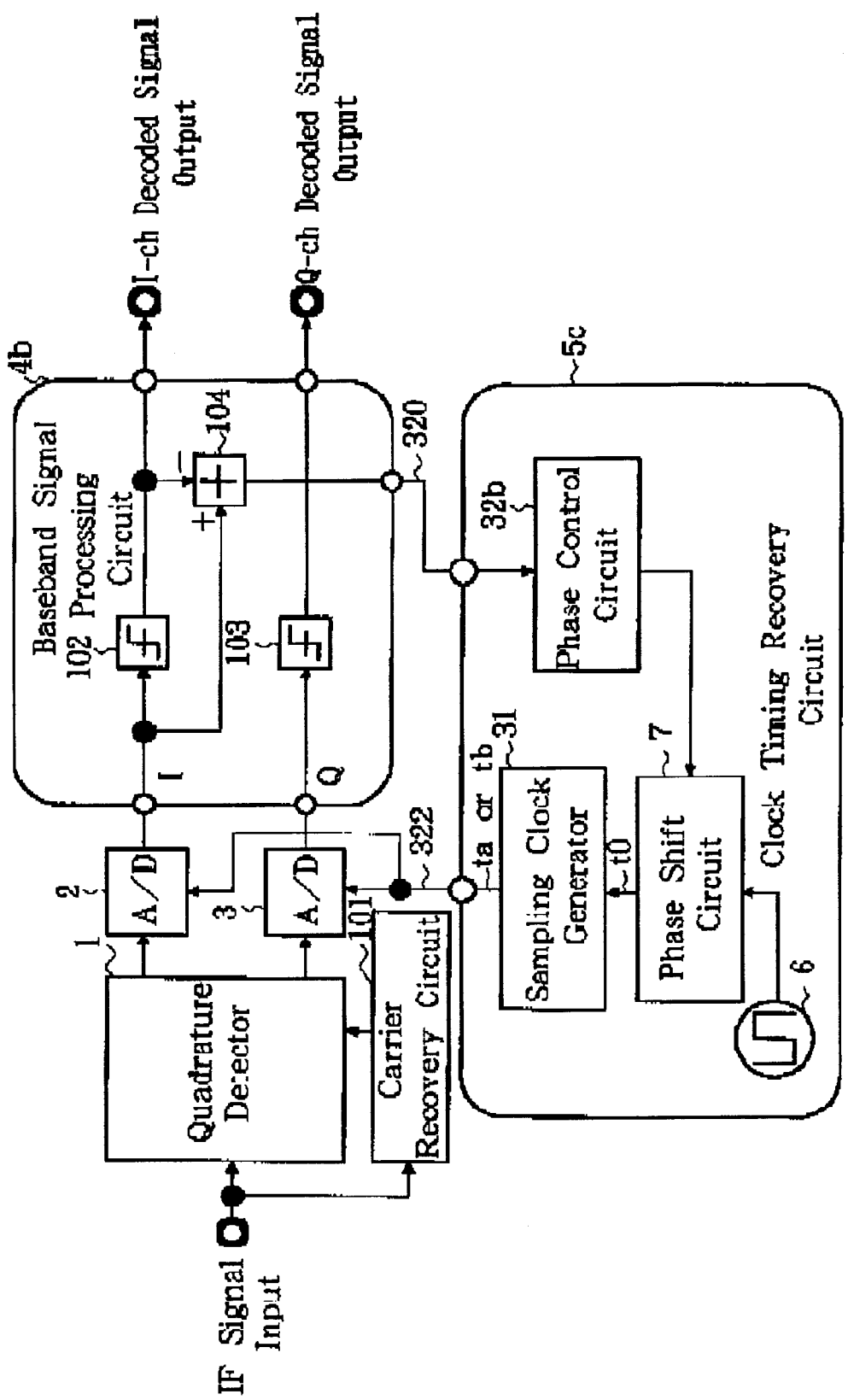
FIG. 21 is a block diagram showing a fourth embodiment of the present invention.

FIG. 21 is a block diagram of a fourth embodiment of the present invention and shows the configuration of a clock timing recovery circuit and of a demodulator in which this is provided. This embodiment implements the present invention in a clock timing recovery circuit of a demodulator which uses $2^{2n}$ QAM (n=1, 2, . . . ) modulation as the modulation scheme and coherent detection for the demodulation scheme. The demodulator comprises a quadrature detector 1, a carrier recovery circuit 101, analog-to-digital converters 2 and 3, a baseband signal a processing circuit 4b and clock timing recovery circuit 5c. The IF signal is input to quadrature detector 1, which performs quadrature detection using the carrier signal supplied from carrier recovery circuit 101. Carrier recovery circuit 101 generates the carrier synchronously with the IF signal. Analog-to-digital converters 2 and 3 respectively convert the outputs in the in-phase and quadrature channels of quadrature detector 1 to digital signals. Baseband signal processing circuit 4b performs data decision on the sampled signals in the in-phase and quadrature channels output by analog-to-digital converters 2 and 3, and thereby obtains a decoded signal for each channel. Clock timing recovery circuit 5c generates, from a decision error signal 320 obtained from baseband signal processing circuit 4b, the sampling clock signal 322 to be supplied to analog-to-digital converters 2 and 3.

Baseband signal processing circuit 4b comprises two decision circuits 102 and 103, and an adder 104. Decision circuits 102 and 103 perform data decision on the sampled signals in the in-phase and quadrature channels, thereby obtaining a decoded signal for each channel. Adder 104 calculates the difference between the sampled signal in the in-phase channel and the decoded signal, and outputs this as decision error signal 320.

Clock timing recovery circuit 5c comprises a system clock generator 6, a phase shift circuit 7, a sampling clock generator 31, and a phase control circuit 32b. The configuration and operation of system clock generator 6, phase shift circuit 7 and sampling clock generator 31 are the same as in the embodiment described above. The circuit remaining after delay circuit 61, adder 62, decision circuit 63 and adder 64 have been removed from the circuit illustrated in FIG. 18 can be utilized as phase control circuit 32b.

Figure 22:
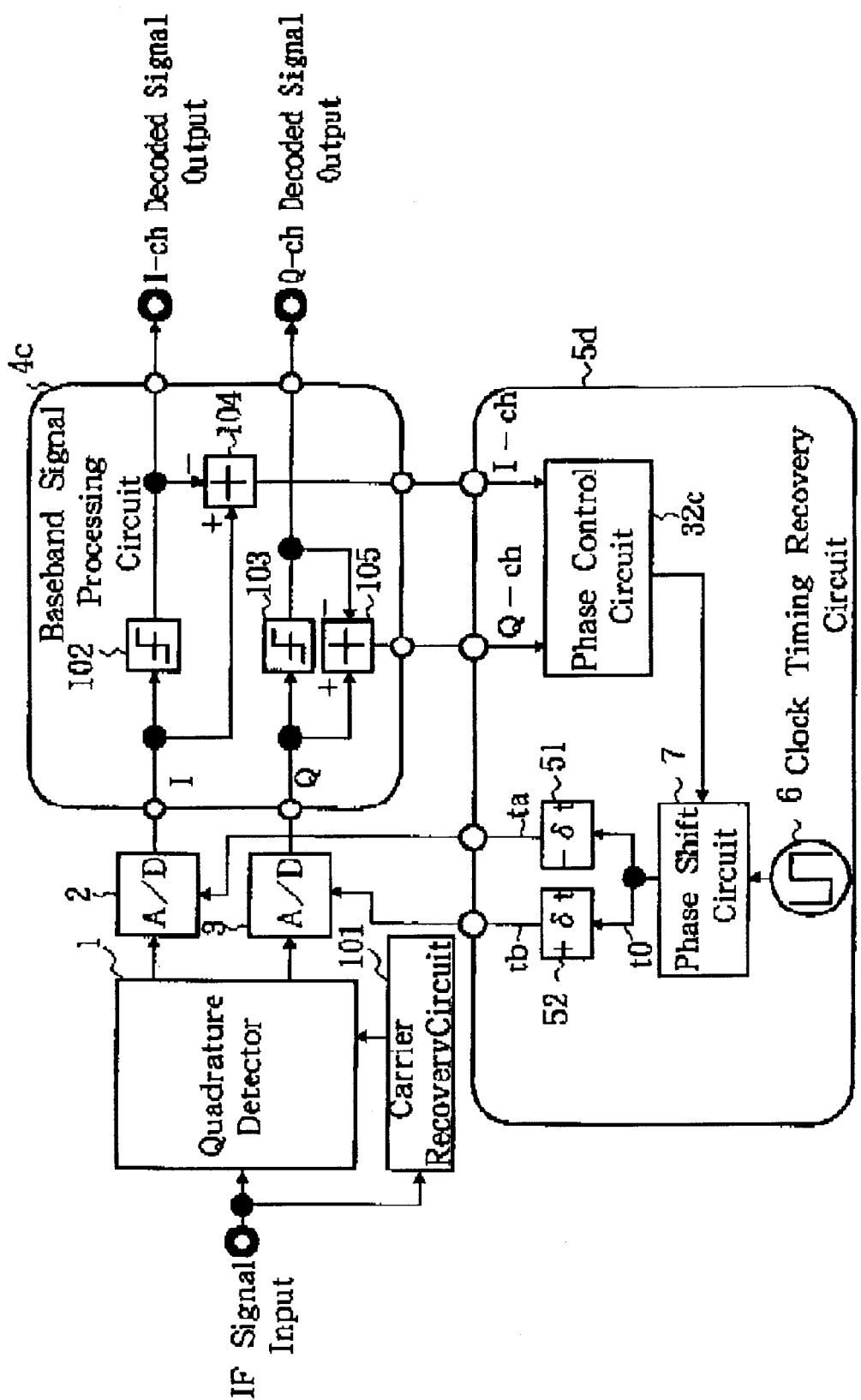
FIG. 22 is a block diagram showing a fifth embodiment of the present invention.

FIG. 22 is a block diagram of a fifth embodiment of the present invention, and shows the configuration of a clock timing recovery circuit and of a demodulator in which this is provided. This embodiment implements the present invention in the clock timing recovery circuit of a demodulator which employs $2^{2n}$ QAM (n=1, 2, . . . ) modulation as the modulation scheme and coherent detection for the demodulation scheme.

The demodulator comprises a quadrature detector 1, a carrier recovery circuit 101, analog-to-digital converters 2 and 3, baseband signal processing circuit 4c and a clock timing recovery circuit 5d. The IF signal is input to quadrature detector 1 which performs quadrature detection using the carrier signal supplied from carrier recovery circuit 101. Carrier recovery circuit 101 generates a carrier signal synchronized with the IF signal. Analog-to-digital converters 2 and 3 respectively convert the outputs in the in-phase and quadrature channels of quadrature detector 1 to digital signals. Baseband signal processing circuit 4c performs data decision on the sampled signals in the in-phase and quadrature channels that are output by analog-to-digital converters 2 and 3, thereby obtaining a decoded signal for each channel. Clock timing recovery circuit 5d generates, from the decision error signal 324 obtained from baseband signal processing circuit 4c for each channel, sampling clock signals $t_a$ and $t_b$ for supply to analog-to-digital converters 2 and 3.

Baseband signal processing circuit 4c comprises two decision circuits 102 and 103, and likewise two adders 104 and 105. Decision circuits 102 and 103 perform data decision on the sampled signals in the in-phase and quadrature channels, thereby obtaining a decoded signal for each channel. Adder 104 calculates the difference between the sampled signal and the decoded signal in the in-phase channel and outputs this as a decision error signal, while adder 105 calculates the difference between the sampled signal and the decoded signal in the quadrature channel and outputs this as a decision error signal.

Clock timing recovery circuit 5d comprises system clock generator 6, phase shift circuit 7, phase lead circuit 5 1, phase delay circuit 52, and phase control circuit 32c.

In this fifth embodiment, rather than alternately selecting one of the two clock signals $t_a$ and $t_b$, the signals in the in-phase and quadrature channels are respectively sampled using these two clock signals $t_a$ and $t_b$. For this reason, switch 53 of the sampling clock generator shown in FIG. 17 is unnecessary, and the two clock signals $t_a$ and $t_b$ are obtained, from corrected clock signal $t_0$ output by phase shift circuit ι, by phase lead circuit 51 and phase delay circuit 52.

Figure 23:
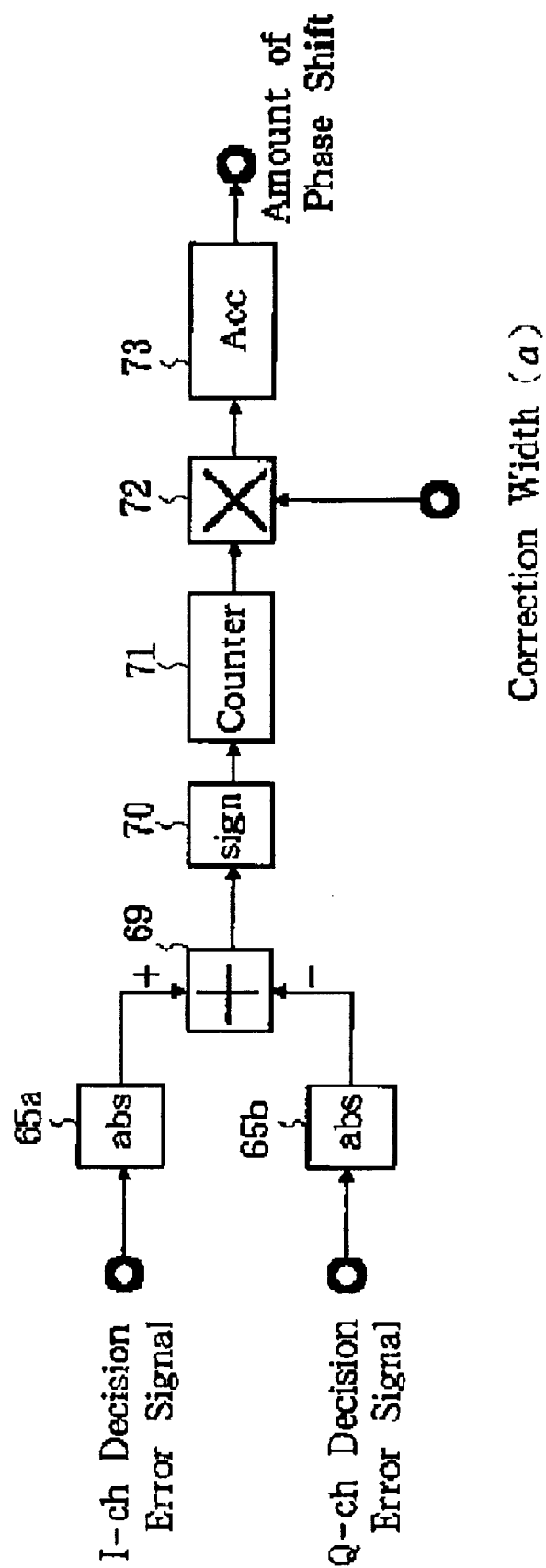
FIG. 23 shows an example of the configuration of a phase control circuit.

FIG. 23 shows an example of the configuration of phase control circuit 32c. This phase control circuit 32c comprises absolute value circuits 65a and 65b, adder 69, sign detector 70, up/down counter 71, multiplier 72, and accumulator 73.

Absolute value circuit 65a calculates the absolute value of the decision error signal in the in-phase channel, while absolute value circuit 65b calculates the absolute value of the decision error signal in the quadrature channel. Adder 69 calculates the difference between the outputs of the two absolute value circuits 65a and 65b. Sign detector 70 obtains the sign of the output of adder 69. Up/down counter 71 counts the output of sign detector 70 and outputs a +1 or a −1 when and only when this value exceeds a fixed quantity. Multiplier 72 multiplies the output of up/down counter 71 by the correction width α (α>0) and outputs the result as an amount of correction. Accumulator 73 accumulates these corrections and outputs them to phase shift circuit 7.

In this example configuration as well, as in the example configuration shown in FIG. 18, a squaring circuit can be used instead of absolute value circuits 65a and 65b. An alternative configuration that is possible is to use an accumulator instead of sign detector 70 and up/down counter 71, and to cause the amount of correction to change adaptively according to the amount of error.

Figure 24:
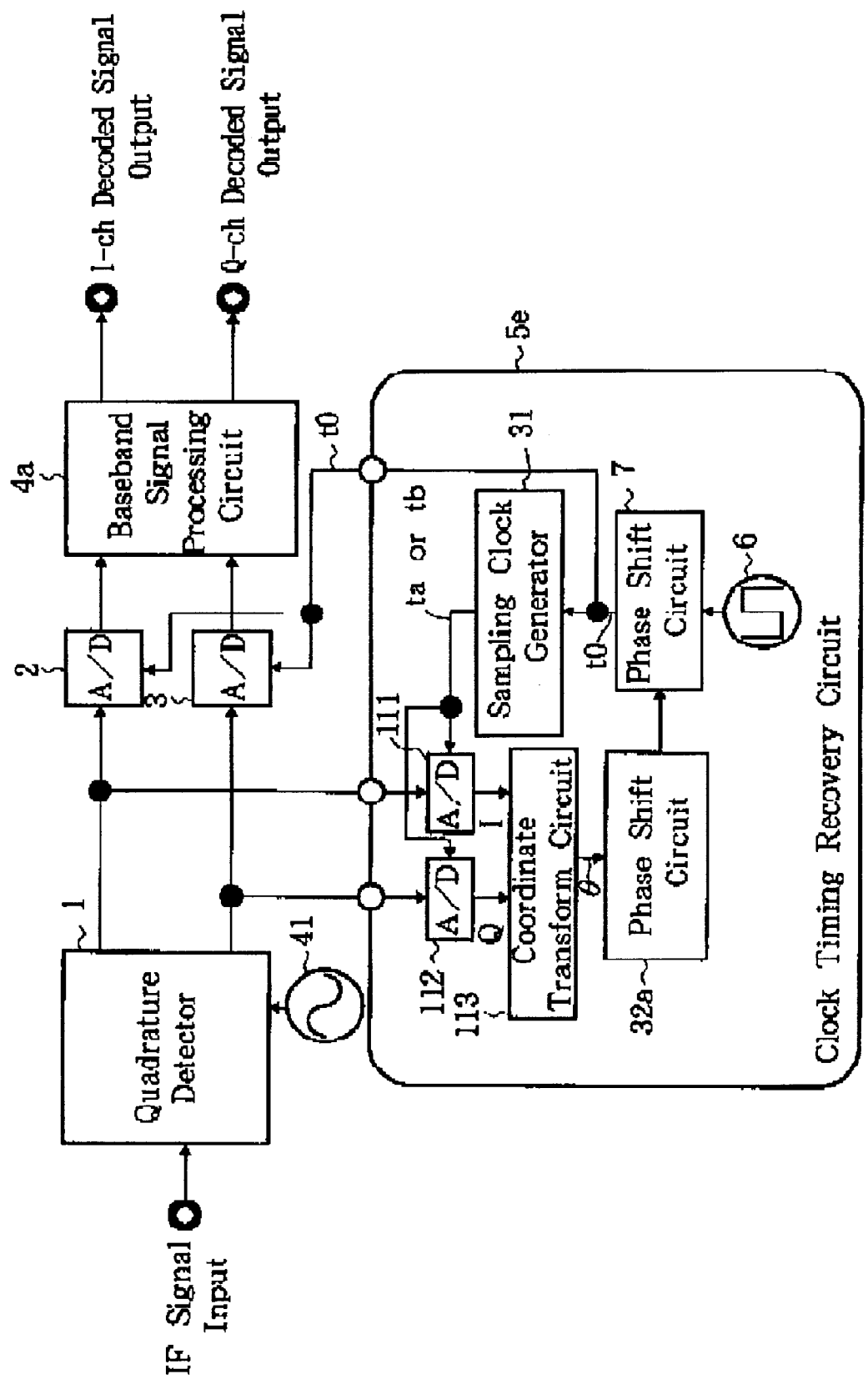
FIG. 24 is a block diagram showing a sixth embodiment of the present invention.

FIG. 24 is a block diagram of a sixth embodiment of the present invention, and shows the configuration of a clock timing recovery circuit and of a demodulator in which this is provided. This embodiment differs from the third embodiment in that it provides analog-to-digital converters 111 and 112 and coordinate transform circuit 113 in clock timing recovery circuit 5e, separately from the main signal lines; and in that it supplies corrected clock signal $t_0$ to analog-to-digital converters 2 and 3 in the main signal lines.

As in the third embodiment, clock timing recovery circuit 5e comprises system a clock generator 6, a phase shift circuit 7, a sampling clock generator 31 and a phase control circuit 32a, but additionally comprises analog-to-digital converters 111 and 112 and coordinate transform circuit 113. The clock signal from sampling clock generator 31 is supplied to analog-to-digital converters 111 and 112, and these respectively sample the signals in the in-phase and quadrature channels from quadrature detector 1. Coordinate transform circuit 113 transforms the sampled signals in the in-phase and quadrature channels from orthogonal to polar coordinates, thereby obtaining the phase component θ. Phase control circuit 32a controls the amount of phase shift of phase shift circuit 7 on the basis of this phase component θ.

Although this embodiment has a larger circuit scale than the second to the fifth embodiments, an improved bit error rate can be obtained because the influence of δt can be excluded from the decoded signals.

This embodiment has been explained on the assumption that QPSK modulation or π/4 shift QPSK modulation or some other phase modulation scheme has been used for the modulation, and that a quasi-coherent detection scheme such as baseband differential detection is used for the demodulation. However, by using a carrier recovery circuit instead of oscillator 41, and by providing, in place of coordinate transform circuit 113, a circuit which performs data decision on the sampled signals to obtain the decision errors at those signal points, this embodiment can be implemented in similar manner when $2^{2n}$ QAM (n=1, 2, . . . ) modulation is used as the modulation scheme and coherent detection is used for the demodulation.

Figure 25:
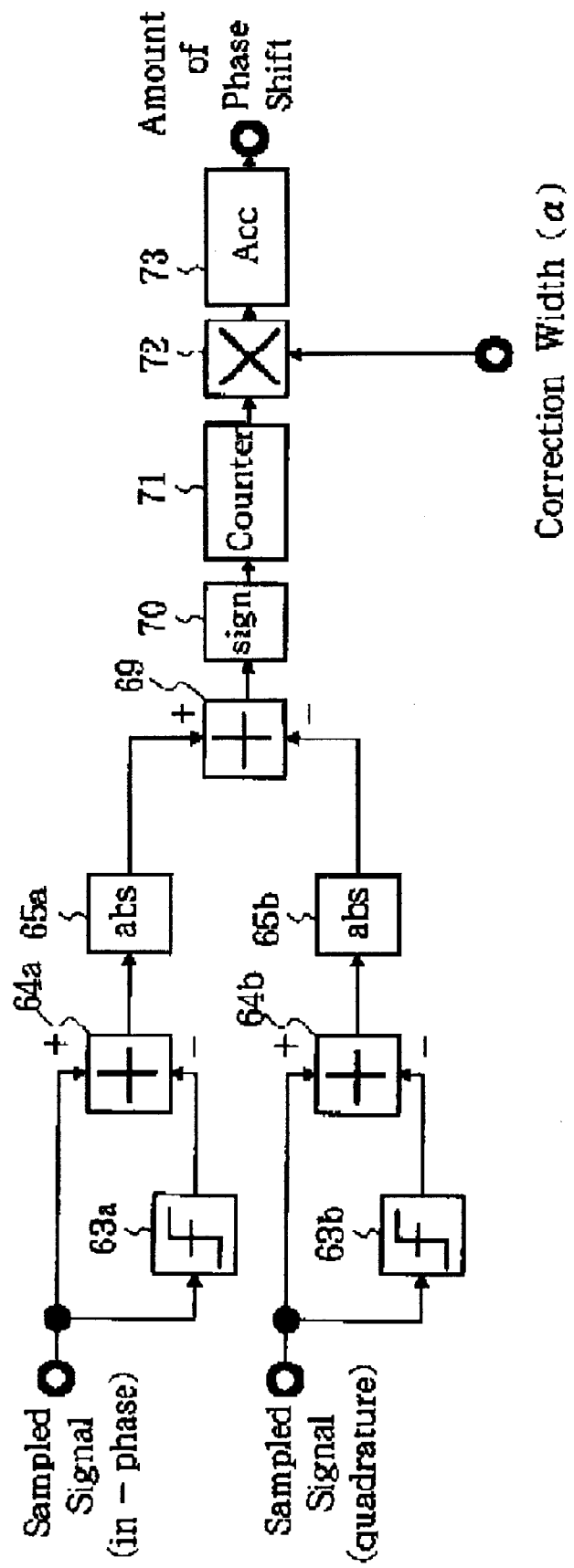
FIG. 25 shows an example of the configuration of a phase control circuit.

FIG. 25 shows an example of the configuration of a phase control circuit used instead of coordinate transform circuit 113 and phase control circuit 32a when the embodiment shown in FIG. 24 is revised and $2^{2n}$ QAM (n=1, 2, . . . ) modulation is used as the modulation scheme, and coherent detection is used as the demodulation scheme.

This phase control circuit comprises decision circuits 63a and 63b, adders 64a and 64b, absolute value circuits 65a and 65b, adder 69, sign detector 70, up/down counter 71, multiplier 72 and accumulator 73. Decision circuits 63a and 63b perform data decision on the sampled signals in the in-phase and quadrature channels respectively. Adders 64a and 64b calculate, respectively, the difference between the sampled signal in the channel and the decision output of decision circuits 63a and 63b in respect of this sampled signal. In other words, adders 64a and 64b calculate the decision error. Absolute value circuits 65a and 65b respectively calculate the absolute values of the outputs of adders 64a and 64b. Adder 69 calculates the difference δe between the outputs of absolute value circuits 65a and 65b. Sign detector 70 obtains the sign of the output of adder 69. Up/down counter 71 counts the outputs of sign detector 70 and outputs a +1 or a −1 when, and only when, this value exceeds a fixed quantity. Multiplier 72 multiplies the output of up/down counter 71 by the correction width $\alpha$ ($\alpha>0$), and outputs this as the amount of correction. Accumulator 73 accumulates these corrections and outputs them to phase shift circuit 7.

Figure 26:
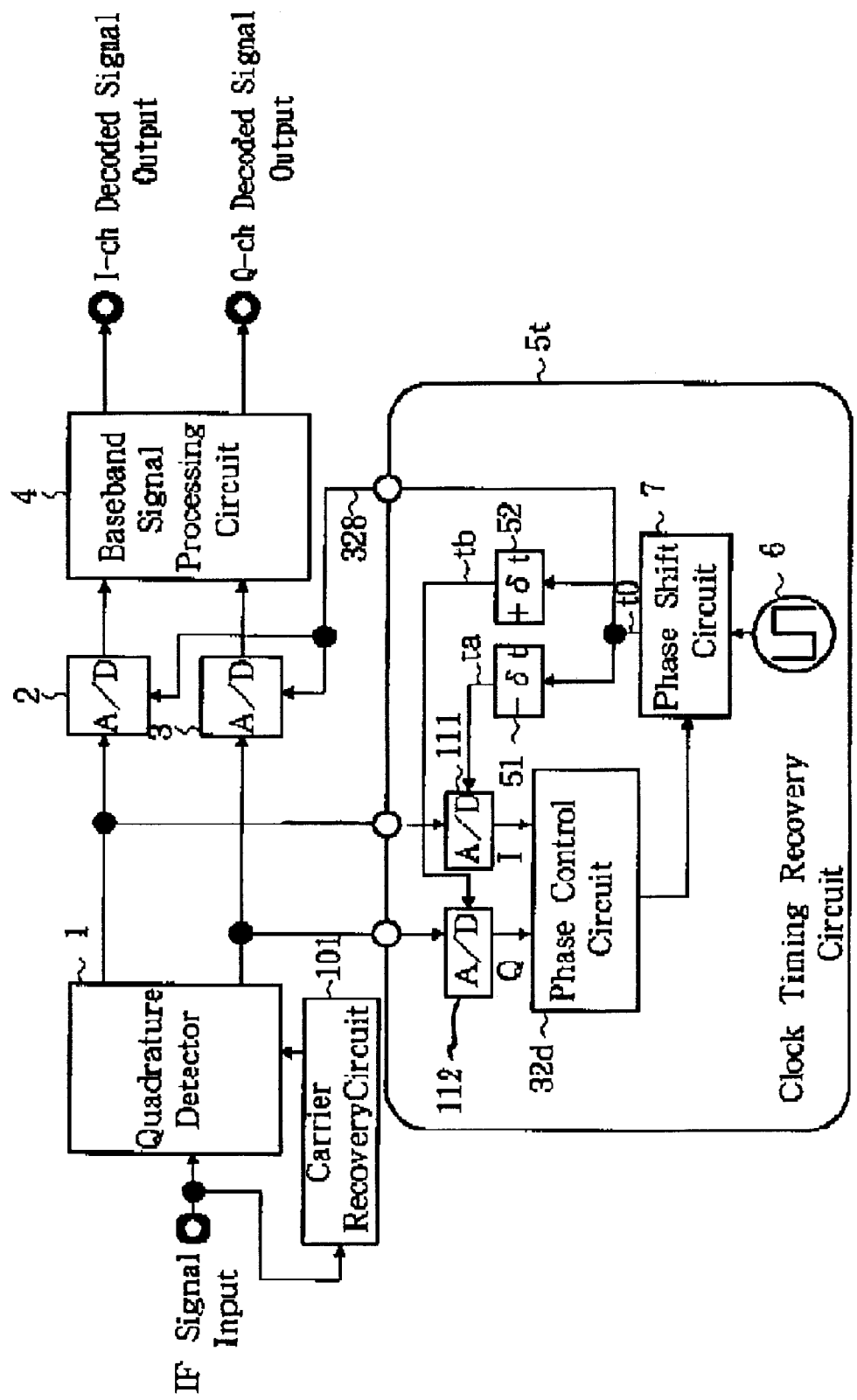
FIG. 26 is a block diagram showing a seventh embodiment of the present invention.

FIG. 26 is a block diagram of a seventh embodiment of the present invention, and shows the configuration of a clock timing recovery circuit and of a demodulator in which this is provided. This embodiment implements the present invention in a clock timing recovery circuit of a demodulator which uses $2^{2n}$ QAM (n=1, 2, . . . ) modulation as the modulation scheme and coherent detection as the demodulation scheme. This seventh embodiment is similar to the sixth embodiment in that it includes analog-to-digital converters 111 and 112 separately from the main signal lines, and in that it supplies corrected clock signal $t_0$ to analog-to-digital converters 2 and 3 of the main signal lines. However, it differs significantly from the sixth embodiment in that it uses different clock signals $t_a$ and $t_b$ for sampling the in-phase and quadrature channels in clock timing recovery circuit 5f.

Clock timing recovery circuit 5f comprises a system clock generator 6, a phase shift circuit 7, a phase lead circuit 51, a phase delay circuit 52, analog-to-digital converters 111 and 112, and phase control circuit 32d. System clock generator 6 generates the reference clock signal. Phase shift circuit 7 generates corrected clock signal $t_0$ by correcting the system clock signal on the basis of the output of phase control circuit 32d, and outputs this corrected clock signal $t_0$ to analog-to-digital converters 2 and 3 as the sampling clock signal, and also outputs it to phase lead circuit 51 and phase delay circuit 52. Phase lead circuit 51 causes the phase of corrected clock signal $t_0$ advance by δt, while phase delay circuit 52 causes it to lag by δt. Analog-to-digital converter 111 samples the signal in the in-phase channel using clock signal $t_a$ output by phase lead circuit 51, while analog-to-digital converter 112 samples the signal in the quadrature channel using clock signal $t_b$ output by phase delay circuit 52. Phase control circuit 32d obtains the amount of phase correction from the outputs of analog-to-digital converters 111 and 112, and thereby controls the amount of phase shift of phase shift circuit 7. The phase control circuit shown in FIG. 25 can be used as phase control circuit 32d.

In the first embodiment, when a burst signal is received, the clock timing can be recovered rapidly using only a clock timing recovery signal added to the signal frame. As opposed to this, in the second to the seventh embodiments, highly accurate clock timing recovery can be carried out for continuous signals and for the portion of a burst signal other than the clock timing recovery signal portion, by tracking frequency fluctuations. Accordingly, when a burst signal is received, it is preferable to recover the clock timing using a clock timing recovery signal in accordance with the first embodiment, and otherwise it is preferable to recover the clock timing in accordance with any of the second to the seventh embodiments. An embodiment of this sort will now be explained.

Figure 27:
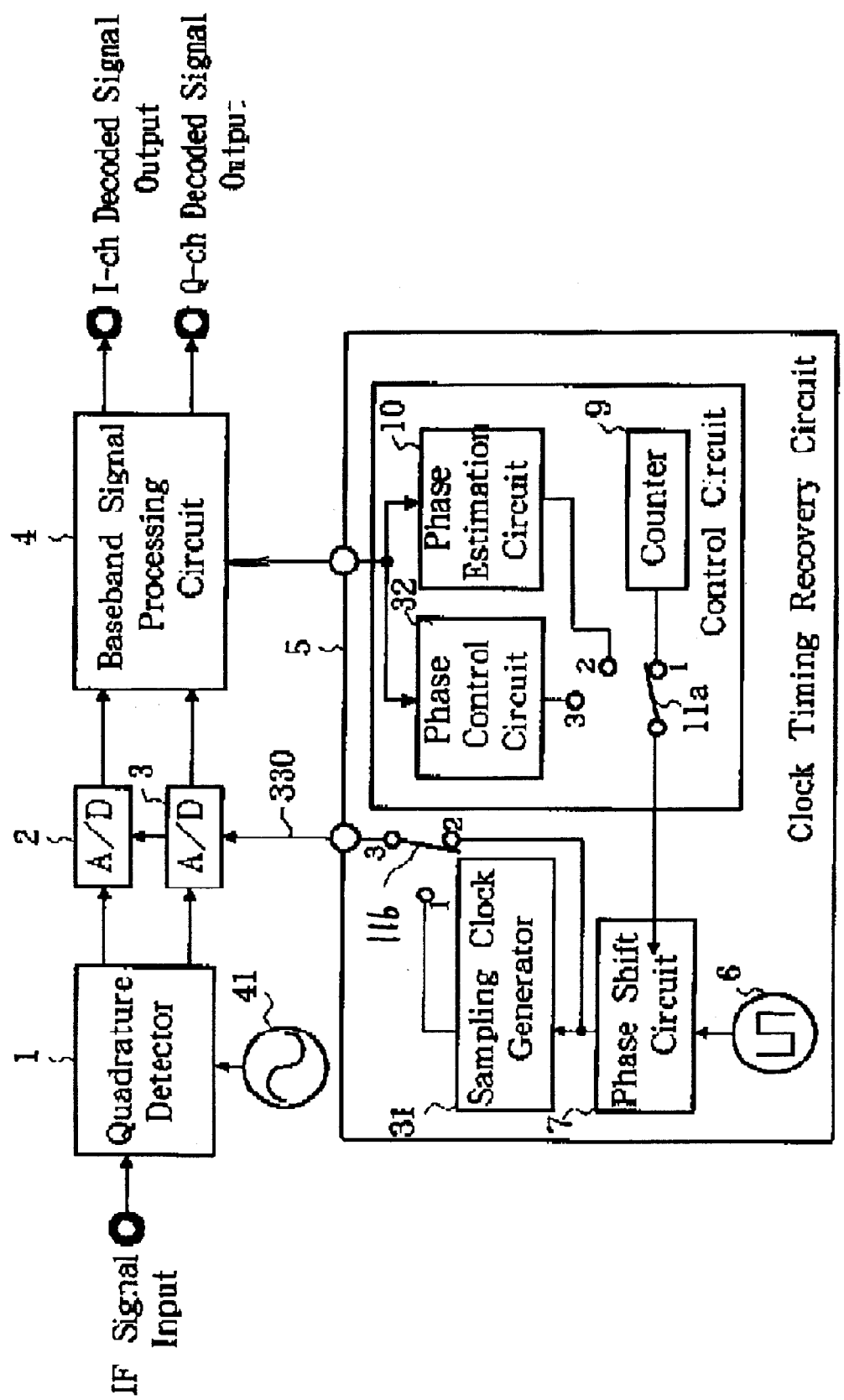
FIG. 27 is a block diagram showing an eighth embodiment of the present invention.

FIG. 27 is a block diagram of an eighth embodiment of the present invention, and shows the configuration of a clock timing recovery circuit and of a demodulator in which this is provided. This eighth embodiment combines the first and second embodiments, and its demodulator comprises a quadrature detector 1, an oscillator 41, analog-to-digital converters 2 and 3, a baseband signal processing circuit 4, and a clock timing recovery circuit 5g, while clock timing recovery circuit 5g comprises system clock generator 6, a phase shift circuit 7, a control circuit 8a, a sampling clock generator 31, and a switch 11b. Control circuit 8a comprises a counter 9, a phase estimation circuit 10, switch 11a and a phase control circuit 32.

The operation of all parts other than switches 11a and 11b is as explained in connection with the first embodiment or the second embodiment. Switch 11a selects the output of counter 9 with the timing of the clock timing recovery signal. When the clock timing recovery signal ends, switch 11a first of all selects the output of phase estimation circuit 10 and then selects the output of phase control circuit 32. In each case it supplies the output to phase shift circuit 7. Switch 11b selects, as the sampling clock signal 320 for sampling the clock timing recovery signal, the clock signal which counter 9 causes phase shift circuit 7 to output, and subsequently selects the output of sampling clock signal generator 31 as the sampling clock signal for sampling the baseband signal that follows the clock timing recovery signal.

In other words, switch 11a selects the output of counter 9 and switch 11b selects the output of phase shift circuit 7 with the timing of the clock timing recovery signal. As a result, the clock signal that is output from clock timing recovery circuit 5g as the sampling clock signal has the phase of its n-th leading edge point or trailing edge point from the origin (n=1, 2, 3, . . . ), where one leading edge point or trailing edge point of the system clock signal is taken as the origin, shifted by n×Δt relative to the phase of the system clock signal (where Δt is a predefined amount of phase shift). Phase estimation circuit 10 then uses the sampled signal obtained on the basis of this sampling clock signal to estimate the phase difference between the phase of the system clock signal and the clock timing at which the bit error rate becomes minimum.

Switch 11a selects the output of phase estimation circuit 10 when this circuit has estimated the aforesaid phase difference on the basis of a prescribed number of sampled signals. As a result, the amount of phase shift of phase shift circuit 7 is established on the basis of an estimated phase difference.

When the clock timing recovery signal is finished, switch 11a selects the output of phase control circuit 32 and switch 11b selects the output of sampling clock generator 31. As a result, there is output from clock timing recovery circuit 5g, as a sampling clock signal, a second clock signal with leading or trailing edge points which lead the leading or trailing edge points of the first clock signal that is output by phase shift circuit 7 by a predefined timing difference δt, and a third clock signal with leading or trailing edge points which lag behind the leading or trailing edge points of the first clock signal by the same timing difference δt. Phase control circuit 32 then corrects the amount of phase shift of phase shift circuit 7 on the basis of sampled signals obtained using these sampling clock signals.

The present embodiment is thus capable of rapid acquisition of optimum clock timing using a clock timing recovery signal, and also of tracking any frequency fluctuations of the signal that follows the clock timing recovery signal. Accordingly, although the circuit scale is relatively large, this embodiment is very effective when rapid acquisition of a highly accurate clock signal is required.

It is also possible to utilize modified versions of the second to the seventh embodiments to acquire optimum clock timing using a clock timing recovery signal. Such an embodiment will be explained below.

Figure 28:
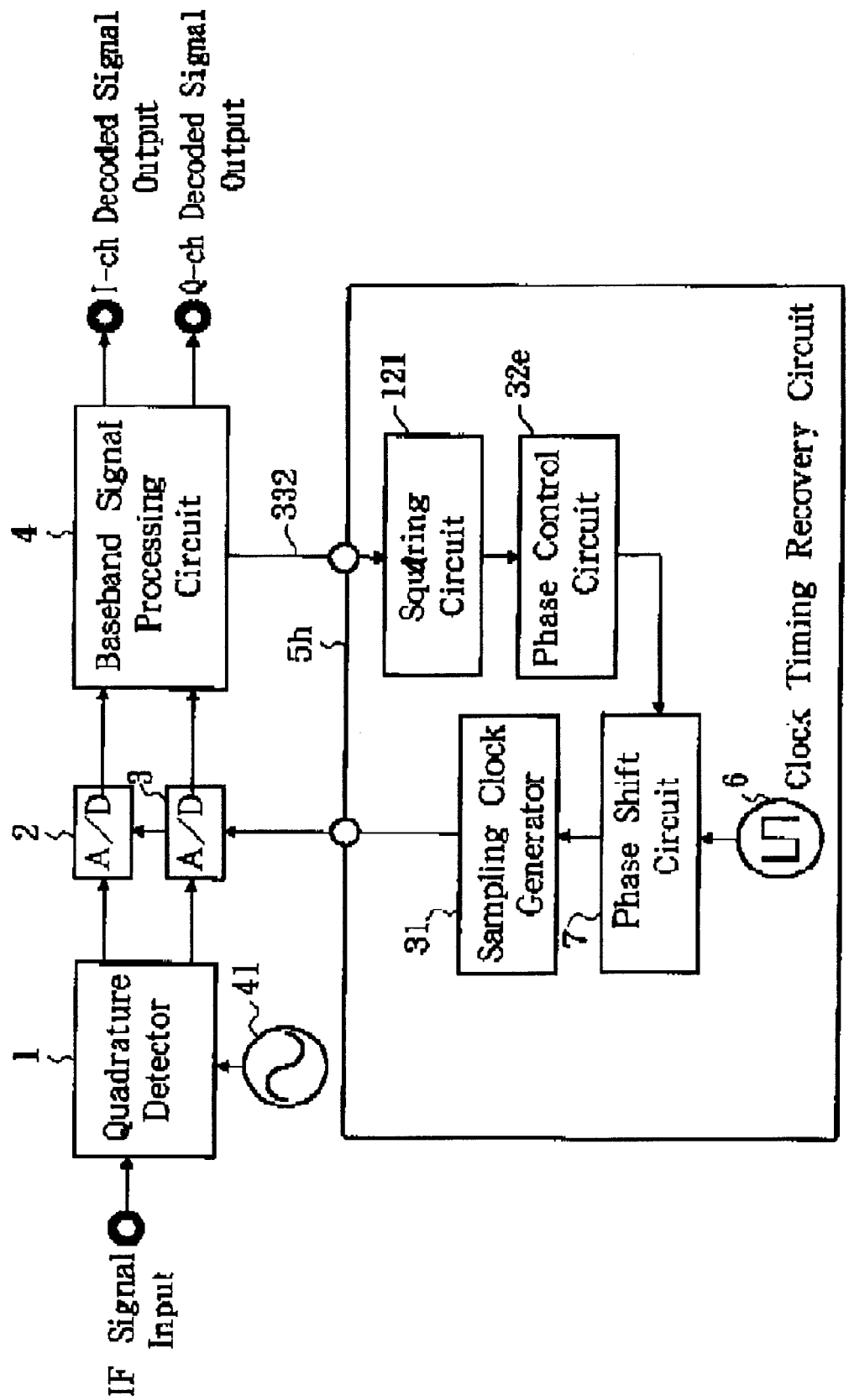
FIG. 28 is a block diagram showing a ninth embodiment of the present invention.

FIG. 28 is a block diagram of a ninth embodiment of the present invention, and shows the configuration of a clock timing recovery circuit and of a demodulator in which this is provided.

This demodulator comprises a quadrature detector 1, an oscillator 41, analog-to-digital converters 2 and 3, a baseband signal processing circuit 4, and clock timing recovery circuit 5h. Clock timing recovery circuit 5h comprises a system clock generator 6, a phase shift circuit 7, a sampling clock generator 31, a phase control circuit 32e, and a squaring circuit 121.

In this embodiment, it is the sampled signal 332 itself, rather than the decision error of the sampled signal, which is input to clock timing recovery circuit 5h. Squaring circuit 121 squares the sampled signal obtained by sampling on the basis of the sampling clock signal. Phase control circuit 32e compares the amplitude of the squared sampled signal obtained by sampling at leading edge or trailing edge points which lead the clock signal output by phase shift circuit 7 by δt, with the amplitude at leading edge or trailing edge points which lag by δt, and calculates the amount of phase shift of phase shift circuit 7 on the basis of the result of this comparison.

Figure 29:
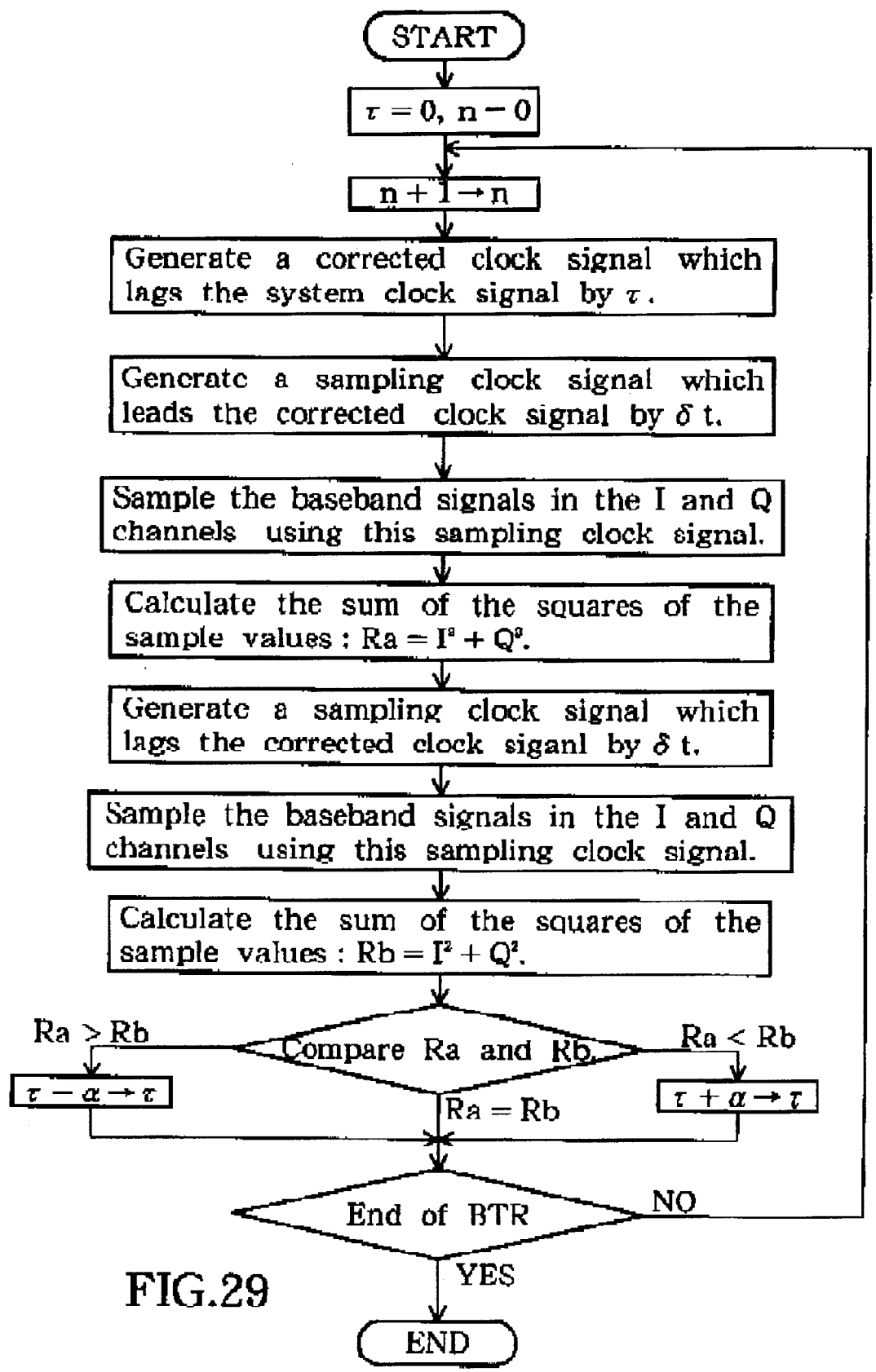
FIG. 29 shows the operation flow of the ninth embodiment.
Figure 30:
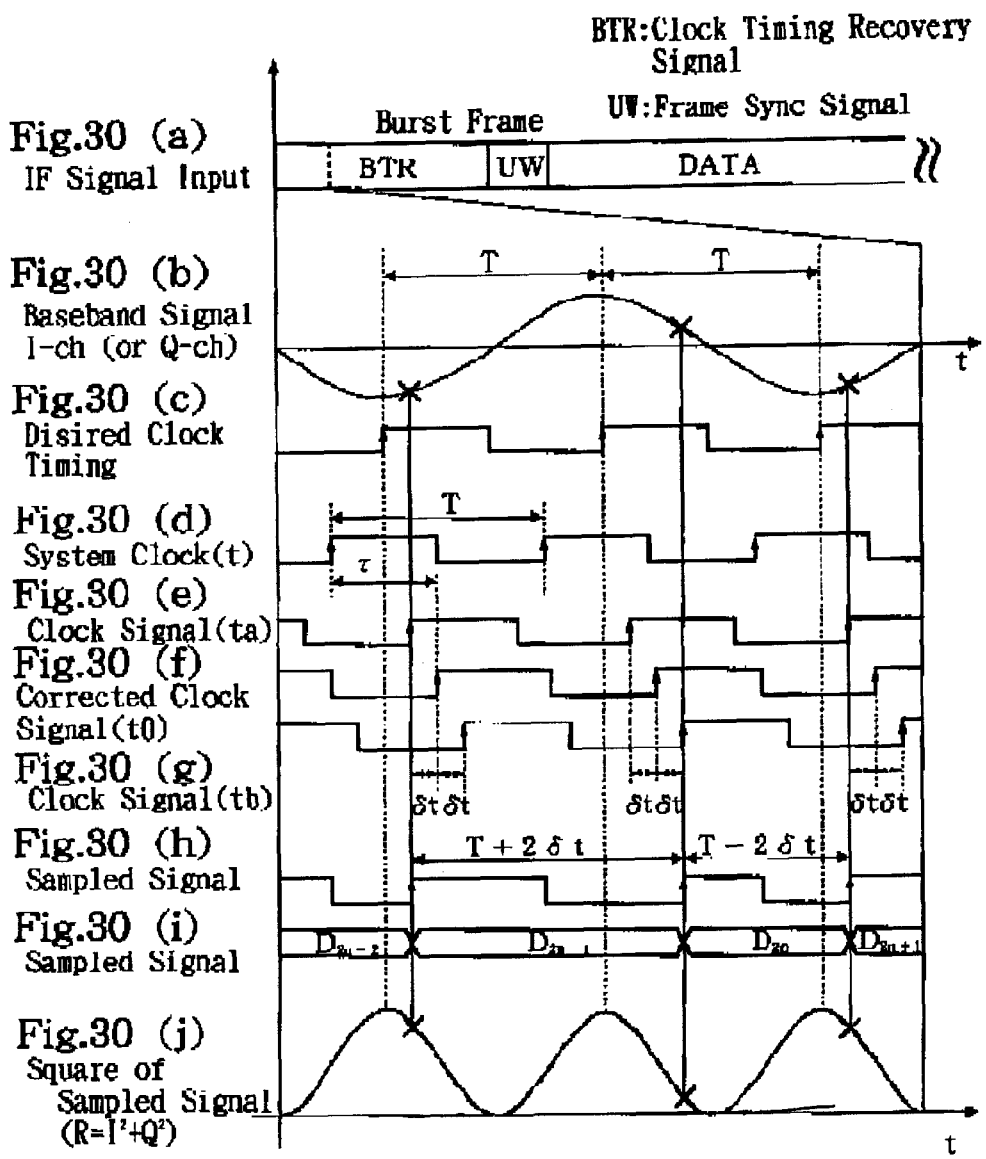
FIG. 30(a)–(j) show the timing of the various signals.
Figure 31:
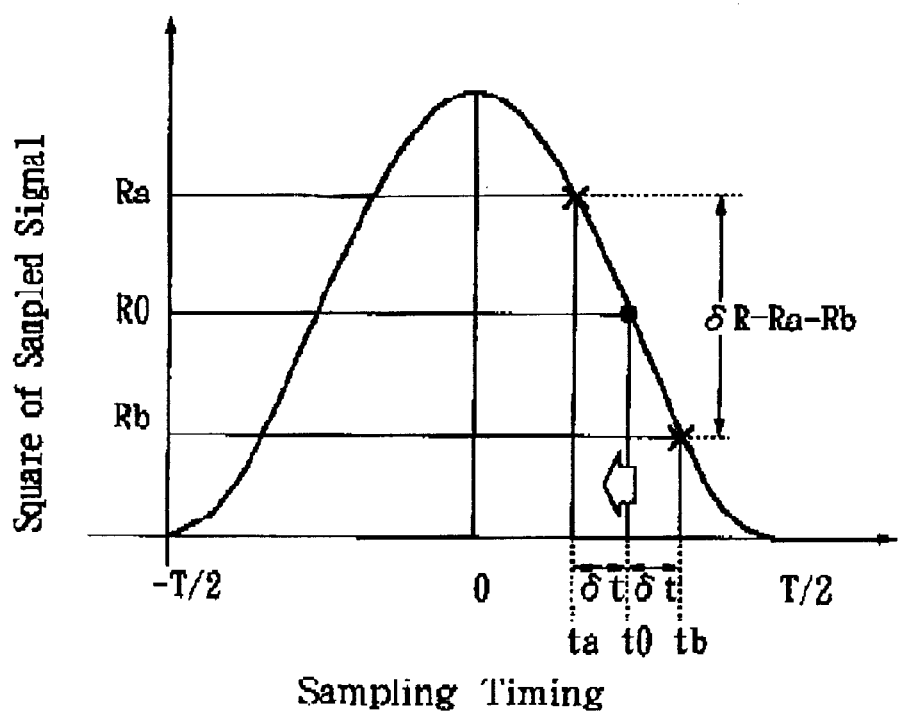
FIG. 31 shows the relation between the sampling timing and the square of the sampled signal.

FIG. 29 to FIG. 31 serve to explain the operation of clock timing recovery circuit 5h. FIG. 29 shows the operation flow, FIG. 30(a)–(j) show the timing of the various signals, and FIG. 31 shows the relation between the sampling timing and the square of the sampled signal.

As shown in FIG. 30(a), the IF signal which is input to the demodulator illustrated in FIG. 28 has a burst frame configuration comprising a clock timing recovery signal (BTR), a frame synchronisation signal (UW), and data. FIG. 30(b)–(j) show, in enlarged form, a portion of the clock timing recovery signal and associated signals and clock signals present at various locations in the demodulator. The sinusoidal baseband signal shown in FIG. 30(b) is obtained when the clock timing recovery signal is detected and has its bandwidth limited. The desired clock timing which gives the smallest bit error rate for this baseband signal is the signal shown in FIG. 30(c). Clock timing recovery circuit 5h utilizes the fact that the baseband signal constitutes the sine wave shown in FIG. 30(b), and recovers from this signal the desired clock timing shown in FIG. 30(c).

To accomplish this, phase shift circuit 7 corrects system clock signal t shown in FIG. 30(d) by τ, thereby generating corrected clock signal $t_0$ shown in FIG. 30(f). Note, however, that τ=0 when clock timing recovery circuit 5h is in its initial state, and that when clock timing has been established, τ constitutes the time difference between system clock t shown in FIG. 30(d) and the clock timing. On the basis of corrected clock signal $t_0$, sampling clock generator 31 generates two clock signals $t_a$ and $t_b$ with a phase difference of 2δt, and further forms the sampling clock shown in FIG. 30(h), for example, by switching between these two clock signals at every symbol. This sampling clock signal is then used to sample the baseband signal at analog-to-digital converters 2 and 3. As a result, a sampled signal is obtained, and this is the digital signal shown in FIG. 30(i). This sampled signal is squared by squaring circuit 121, giving the signal shown in FIG. 30(j).

It will be seen that the timing giving the maximum squares in FIG. 30(j) has to be extracted to obtain the clock timing shown of FIG. 30(b). In other words, as shown in FIG. 31, the clock timing is the timing at which the square of the sampled signal is not zero and the derivative is zero. Utilising this, the amount of correction of the sampling timing is determined by phase control circuit 32e from the output of squaring circuit 121.

In other words, the squares $R_a$ and $R_b$ of the sampled signal at the respective timings are obtained, and the amount of correction of the sampling timing (+α or −α or 0) is found on the basis of the difference δR between $R_a$ and $R_b$. α (α>0) is the correction width, and can either be set to a constant value or can be changed adaptively according to difference δR. Phase shift circuit 7 updates the sampling timing as follows:

δR<0: replace $t_0$ with $t_0+α$
δR>0: replace $t_0$ with $t_0−α$
δR=0: leave $t_0$ unchanged.

When δR has become zero as a result of repetitions of this updating, the derivative of the curve shown in FIG. 31 becomes zero and mid-point $t_0$ between $t_a$ and $t_b$ coincides with the clock timing at which the bit error rate becomes minimum.

Figure 32:
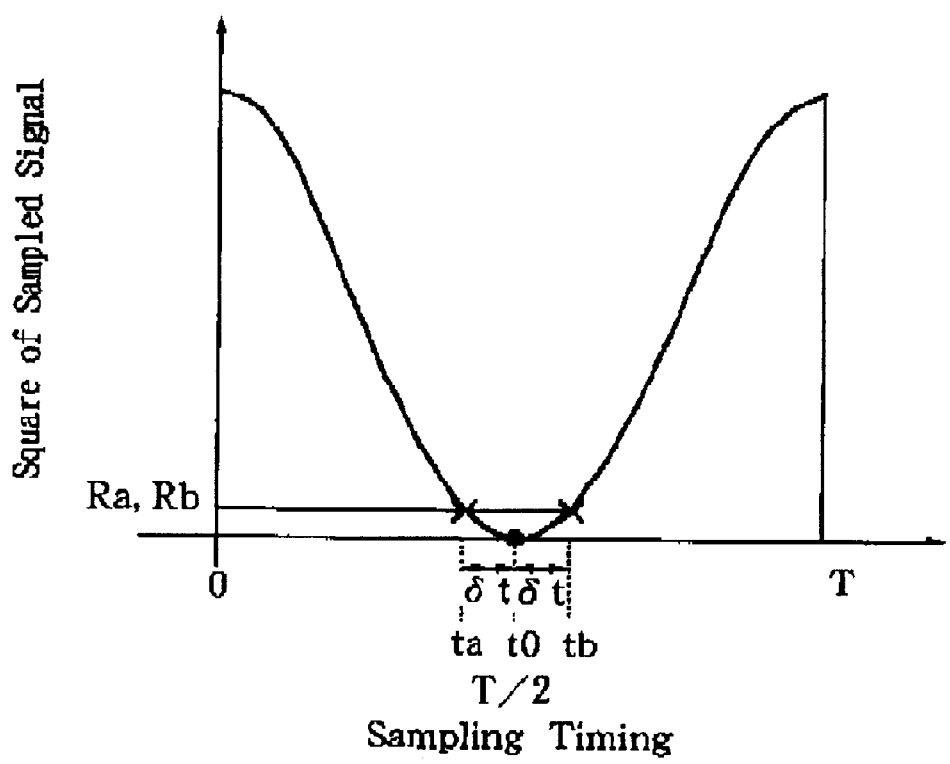
FIG. 32 explains the operation in the pseudostable state.

FIG. 32 explains the operation of the clock timing recovery circuit in its pseudostable state. When the timing of corrected clock signal $t_0$ has coincided with ±T/2, there arises a pseudostable state in which although the derivative becomes zero, clock timing cannot be obtained. However, this pseudostable state arises only when clock timing recovery circuit 5h is in its initial state (τ=0) or when the difference between system clock timing t and the clock timing of the received signal is exactly ±T/2. The probability of this state occurring is therefore very small. A countermeasure against the pseudostable state would be to correct the corrected clock signal $t_0$ by ±T/2 if the squares $R_a$ and $R_b$ of the sampled signal were less than a given threshold.

Figure 33:
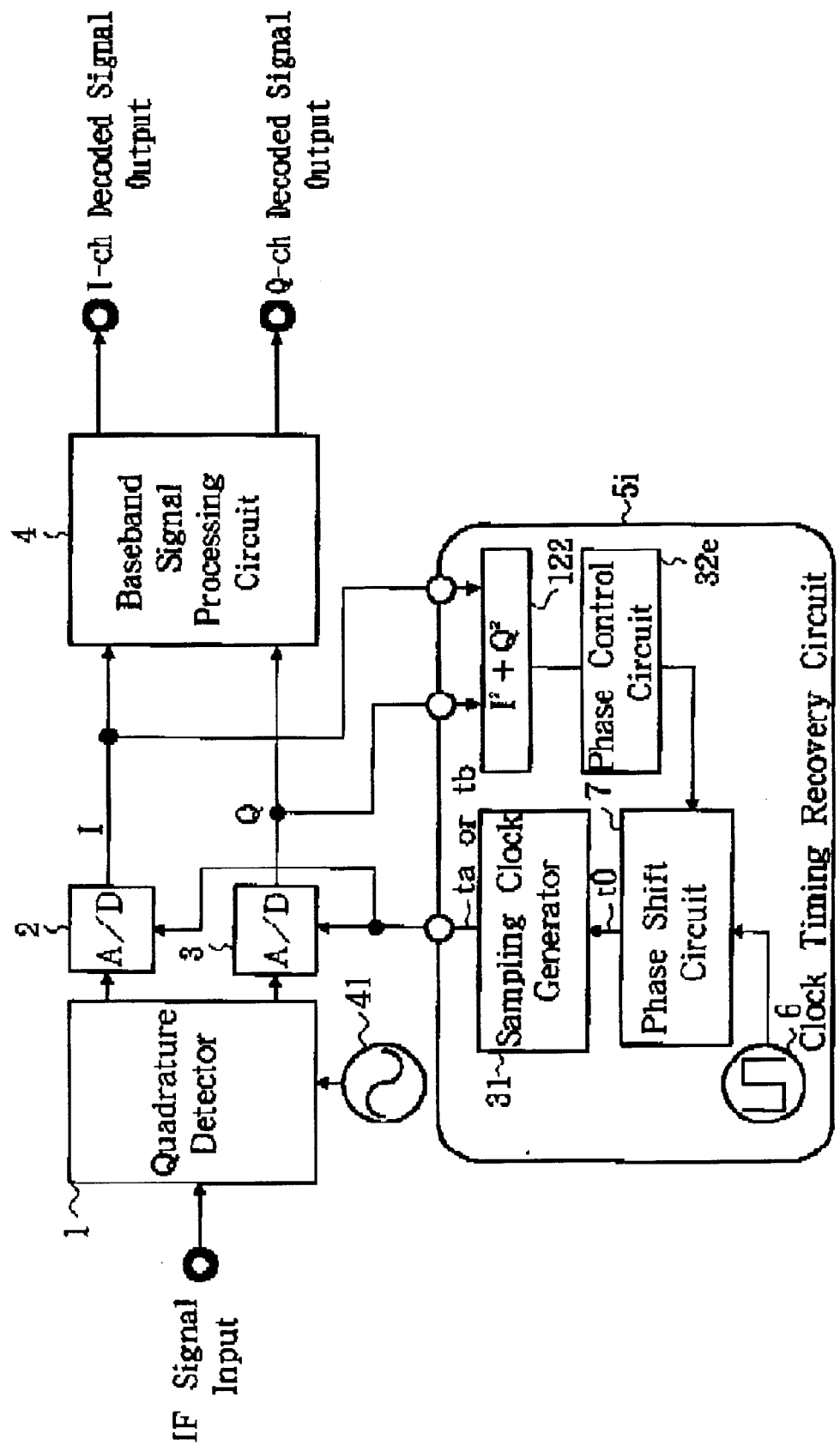
FIG. 33 is a block diagram showing a tenth embodiment of the present invention.

FIG. 33 is a block diagram of a tenth embodiment of the present invention, and shows the configuration of a clock timing recovery circuit and of a demodulator in which this is provided. This embodiment implements the present invention in the clock timing recovery circuit of a demodulator which uses a phase modulation scheme such as QPSK or π/4 shift QPSK for the modulation and a quasi-coherent detection scheme such as baseband differential detection for the demodulation.

The demodulator comprises a quadrature a detector 1, an oscillator 41, analog-to-digital converters 2 and 3, a baseband signal processing circuit 4, and a clock timing recovery circuit 5i. Clock timing recovery circuit 5i comprises a system clock generator 6, phase shift circuit 7, a sampling clock generator 31, a squares adding circuit 122, and phase control circuit 32e. Squares adding circuit 122 comprises two multipliers which square the respective signals in the in-phase and quadrature channels, and an adder which adds the outputs of these two multipliers.

Figure 34:
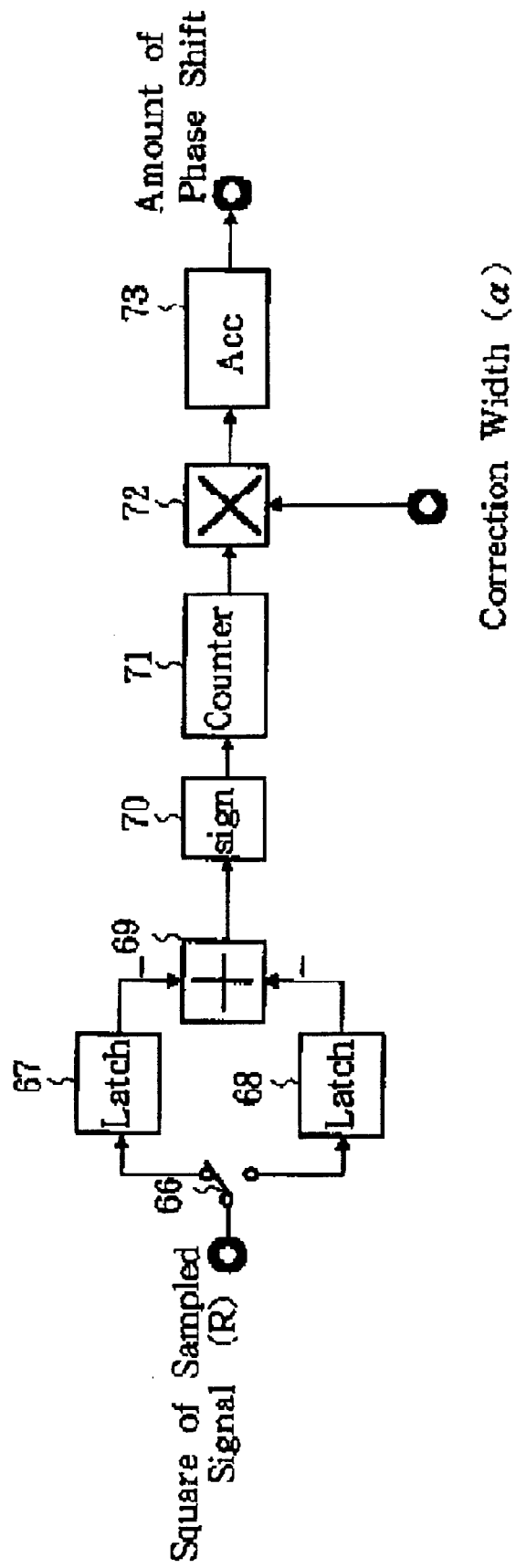
FIG. 34 shows an example of the configuration of the phase control circuit in the tenth embodiment.

FIG. 34 shows an example of a specific configuration of phase control circuit 32e. This circuit comprises switch 66, latches 67 and 68, adder 69, sign detector 70, up/down counter 71, multiplier 72 and accumulator 73. Switch 66 distributes the square (R) of the input sampled signal to the two latches 67 and 68 at every symbol. Latches 67 and 68 store the output of switch 66 for a time interval length corresponding to two symbols. Once every two symbols, adder 69 obtains the difference δR between the outputs of the two latches 67 and 68. Sign detector 70 obtains the sign of the output of adder 69. Up/down counter 71 counts the output of sign detector 70 and outputs a +1 or a −1 when, and only when, this value exceeds a fixed quantity. Multiplier 72 multiplies the output of up/down counter 71 by the correction width α (α>0) and outputs the result as the amount of correction. Accumulator 73 accumulates these corrections and outputs them to phase shift circuit 7.

An accumulator can be used instead of sign detector 70 and up/down counter 71, and the amount of correction can be changed adaptively in accordance with the difference δR.

Figure 35:
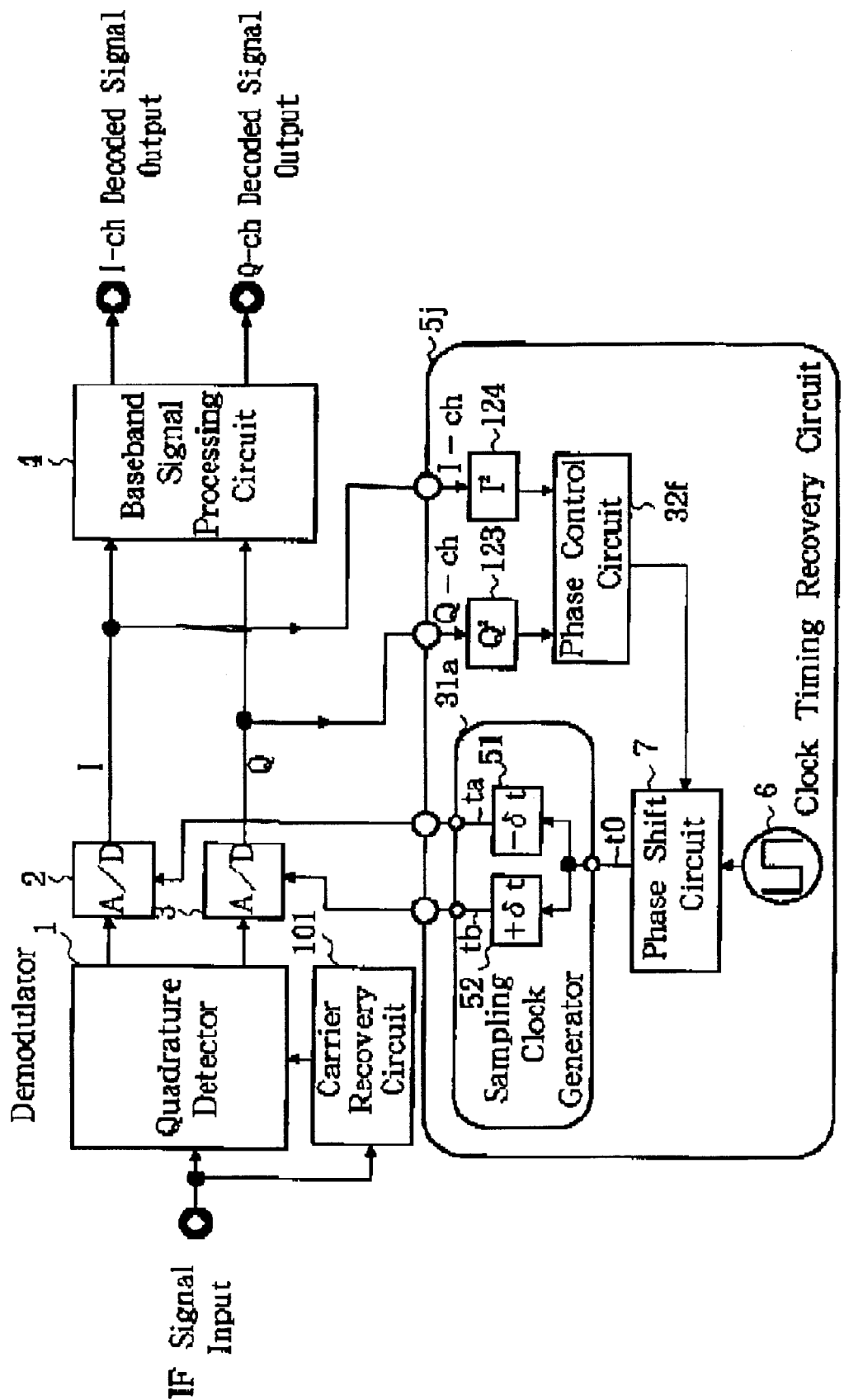
FIG. 35 is a block diagram showing an eleventh embodiment of the present invention.

FIG. 35 is a block diagram of an eleventh embodiment of the present invention, and shows the configuration of a clock timing recovery circuit and of a demodulator in which this is provided. This embodiment implements the present invention in a clock timing recovery circuit of a demodulator which uses $2^{2n}$ QAM (n=1, 2, . . . ) modulation as the modulation scheme and coherent detection as the demodulation scheme. Note that in this case it is assumed that a binary clock timing recovery signal is inserted at the transmitting side in order for a sine wave to be obtained after the quadrature detection.

The demodulator in this embodiment comprises a quadrature detector 1, a carrier recovery circuit 101, analog-to-digital converters 2 and 3, a baseband signal processing circuit 4, and a clock timing recovery circuit 5j. Clock timing recovery circuit 5j comprises system clock generator 6, phase shift circuit 7, sampling clock generator 31a, squaring circuits 123 and 124, and phase control circuit 32f. Sampling clock generator 31a comprises a phase lead circuit 51 and a phase delay circuit 52.

Figure 36:
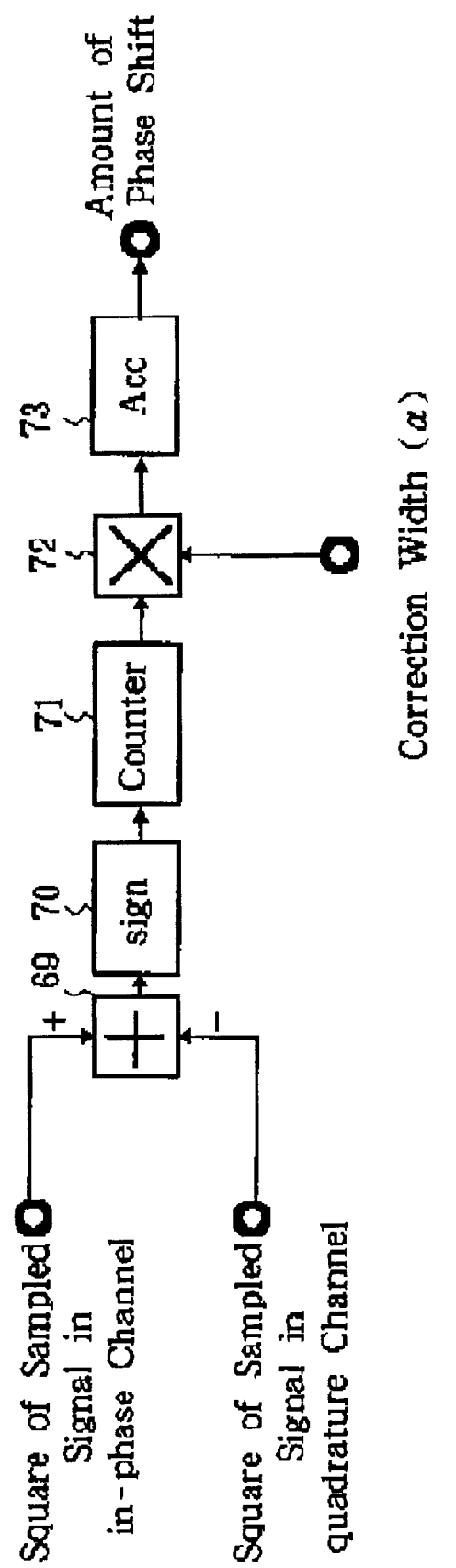
FIG. 36 shows an example of the configuration of the phase control circuit in the eleventh embodiment.

FIG. 36 shows an example of a specific configuration of phase control circuit 32f used in this embodiment. This circuit comprises adder 69, sign detector 70, up/down counter 71, multiplier 72 and accumulator 73. Adder 69 calculates the difference δR of the squares of the sampled values in the in-phase and quadrature channels. Sign detector 70 obtains the sign of the output of adder 69. Up/down counter 71 counts the output of sign detector 70 and outputs a +1 or a −1 when, and only when, this value exceeds a fixed quantity. Multiplier 72 multiplies the output of up/down counter 71 by a correction width α (α>0) and outputs the result as the amount of correction. Accumulator 73 accumulates these corrections and outputs them to phase shift circuit 7.

Figure 37:
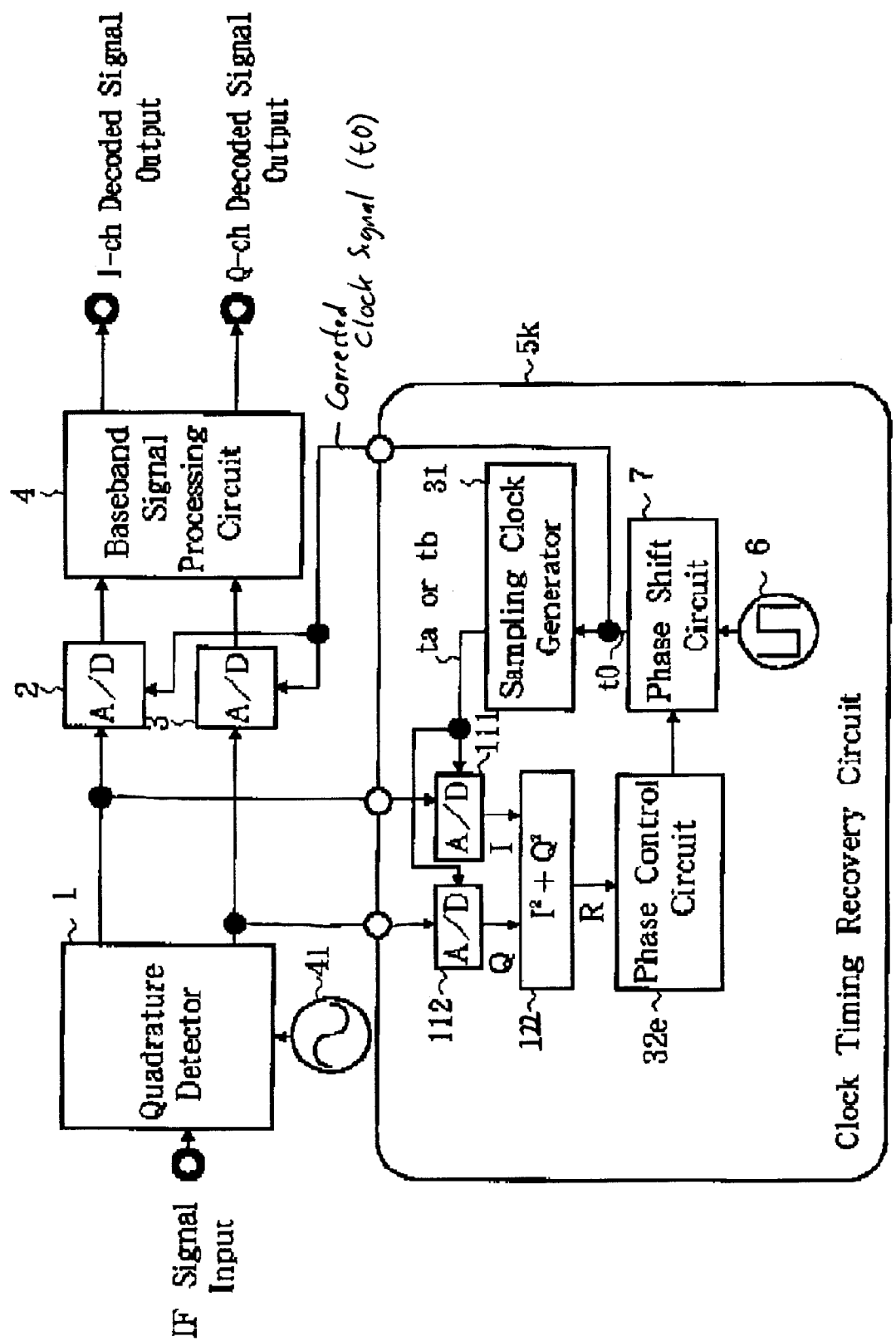
FIG. 37 is a block diagram showing a twelfth embodiment of the present invention.

FIG. 37 is a block diagram of a twelfth embodiment of the present invention, and shows the configuration of a clock timing recovery circuit and of a demodulator in which this is provided. This embodiment differs from the tenth embodiment in that it uses corrected clock signal $t_0$ for the sampling in the main signal lines, and in that it performs, in the clock timing recovery circuit, a sampling which is separate from the main signal lines.

The demodulator comprises a quadrature detector 1, an oscillator 41, analog-to-digital converters 2 and 3, a baseband signal processing circuit 4, and a clock timing recovery circuit 5k. Clock timing recovery circuit 5k comprises, in similar manner to the tenth embodiment, a system clock generator 6, a phase shift circuit 7, a sampling clock generator 31, a squares adding circuit 122, and a phase control circuit 32e. It additionally comprises analog-to-digital converters 111 and 112. Corrected clock signal $t_0$ output by phase shift circuit 7 is supplied to sampling clock generator 31 and is also output as the sampling clock signal for the main signal lines. Sampling clock generator 31 alternately supplies to analog-to-digital converters 111 and 112 a clock signal which leads the timing of corrected clock signal $t_0$ by δt and a clock signal which lags behind the timing of corrected clock signal $t_0$ by δt. Analog-to-digital converters 111 and 112 use these clock signals to sample, in a system separate from the main signal lines, the baseband signal in the in-phase and quadrature channels output from quadrature detector 1. Apart from this, the operation of this twelfth embodiment is the same as that of the tenth embodiment.

Although this twelfth embodiment has a larger circuit scale than the tenth and eleventh embodiments, an improved bit error rate can be obtained because the influence of δt can be excluded from the decoded signals.

The explanation given here has assumed that QPSK or π/4 shift QPSK or another phase modulation scheme was used for the modulation, and that a quasi-coherent detection scheme such as baseband differential detection was used for the demodulation. However, this embodiment can also support a $2^{2n}$ QAM (n=1, 2, . . . ) modulation scheme if a binary clock timing recovery signal is inserted at the transmitting side so that a sine wave is obtained after the quadrature detection.

Figure 38:
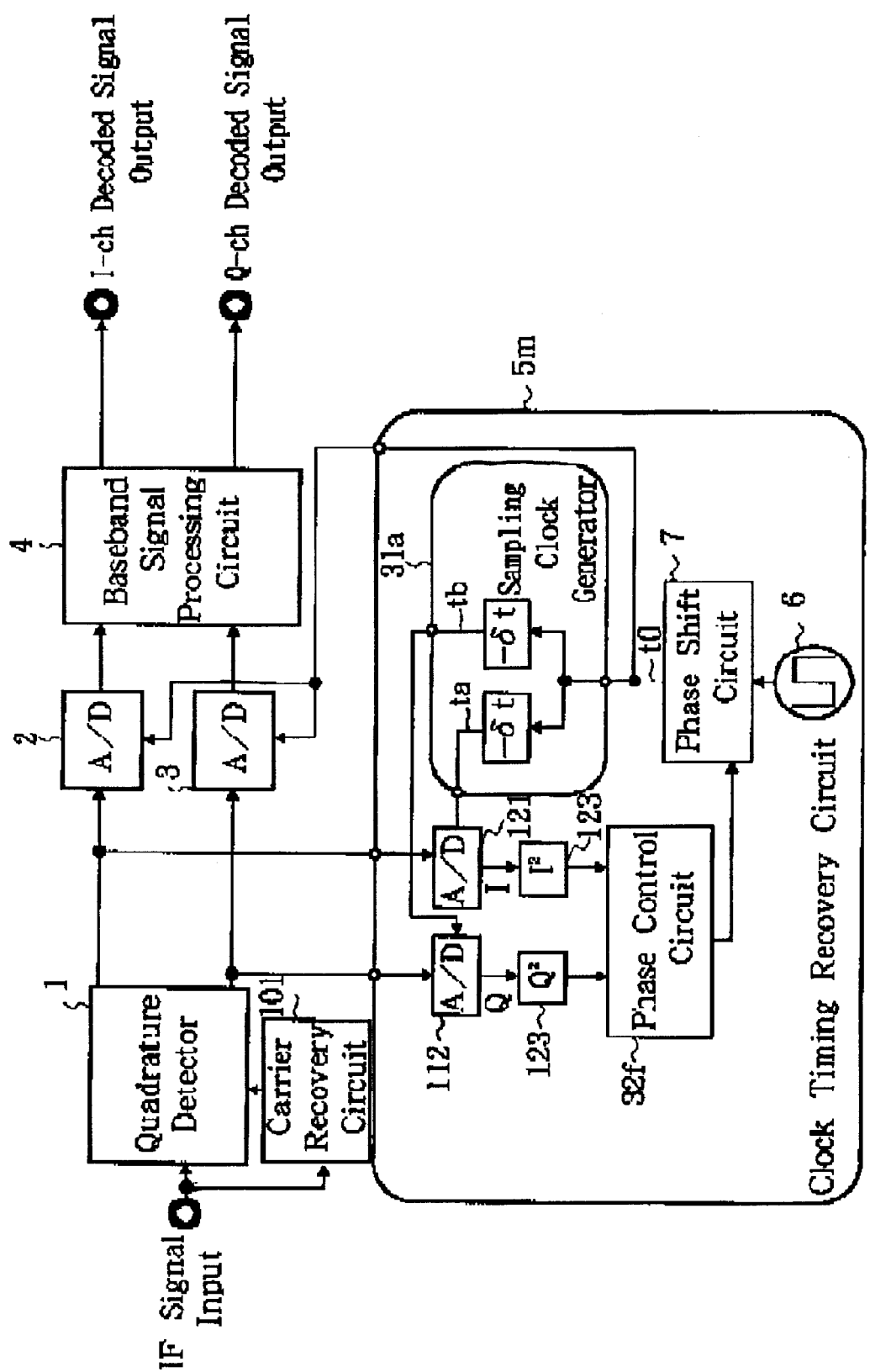
FIG. 38 is a block diagram showing a thirteenth embodiment of the present invention.

FIG. 38 is a block diagram of a thirteenth embodiment of the present invention, and shows the configuration of a clock timing recovery circuit and of a demodulator in which it is provided. This embodiment implements the present invention in a clock timing recovery circuit of a demodulator which uses a $2^{2n}$ QAM (n=1, 2, . . . ) modulation scheme for the modulation and coherent detection for the demodulation. In this embodiment, however, it is assumed that a binary clock timing recovery signal has been inserted at the transmitting side so that a sine wave is obtained after the quadrature detection.

The constitution of this embodiment is similar to that of the eleventh embodiment, but it differs from the eleventh embodiment in that, like the twelfth embodiment, it has analog-to-digital converters additional to those of the main signal lines, and in that it supplies corrected clock signal $t_0$ to the analog-to-digital converters of the main signal lines.

The demodulator in this thirteenth embodiment comprises a quadrature detector 1, carrier recovery circuit 101, analog-to-digital converters 2 and 3, a baseband signal processing circuit 4, and a clock timing recovery circuit 5m. Clock timing recovery circuit 5m comprises a system clock generator 6, a phase shift circuit 7, sampling clock generator 31a, squaring circuits 123 and 124, and phase control circuit 32f. It additionally comprises analog-to-digital converters 111 and 112. Corrected clock signal $t_0$ output by phase shift circuit 7 is supplied to sampling clock generator 31a and is also output as the sampling clock for the main signal lines. Sampling clock generator 31a supplies, to analog-to-digital converters 111 and 112 respectively, clock signal $t_a$ which leads the timing of corrected clock signal $t_0$ by δt, and clock signal $t_b$ which lags behind the timing of corrected clock signal $t_0$ by δt. Analog-to-digital converters 111 and 112 use these clock signals to sample the baseband signals in the in-phase and quadrature channels output from quadrature detector 1, this being done in a separate system from the main signal lines.

Figure 39:
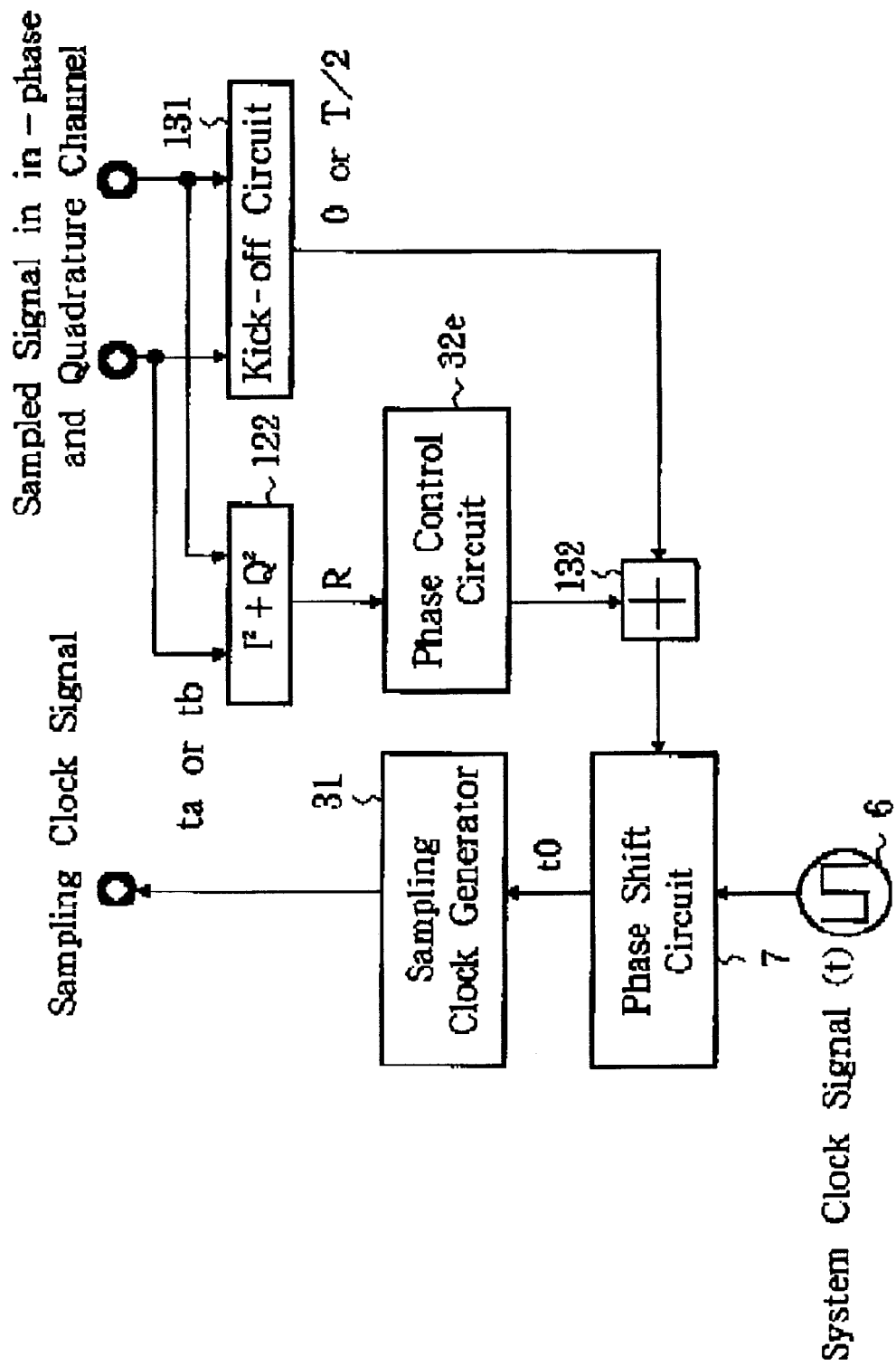
FIG. 39 is a block diagram showing an example in which a circuit for coping with the pseudostable state has been provided in the clock timing recovery circuit of the tenth embodiment.

FIG. 39 is a block diagram of another example of the configuration of clock timing recovery circuit 5i used in the tenth embodiment, and shows an example of a configuration designed to deal with the pseudostable state shown in FIG. 32. This clock timing recovery circuit shifts the timing of corrected clock signal $t_0$ by a half period when it has been detected from the baseband signal that the timing of the system clock signal and the clock timing of the received signal are out by a half period.

This clock timing recovery circuit comprises a system clock generator 6, a phase shift circuit 7, a sampling clock generator 31, a squares adding circuit 122 and a phase control circuit 32e, and additionally comprises a kick-off circuit 131 and an adder 132. Kick-off circuit 131 detects a pseudostable state from the sampled signals in the in-phase and quadrature channels, and in this case only, outputs a value of T/2 (where T is the symbol period). Adder 132 adds the output of kick-off circuit 131 and the output of phase control circuit 32e, and outputs the result to phase shift circuit 7.

Figure 40:
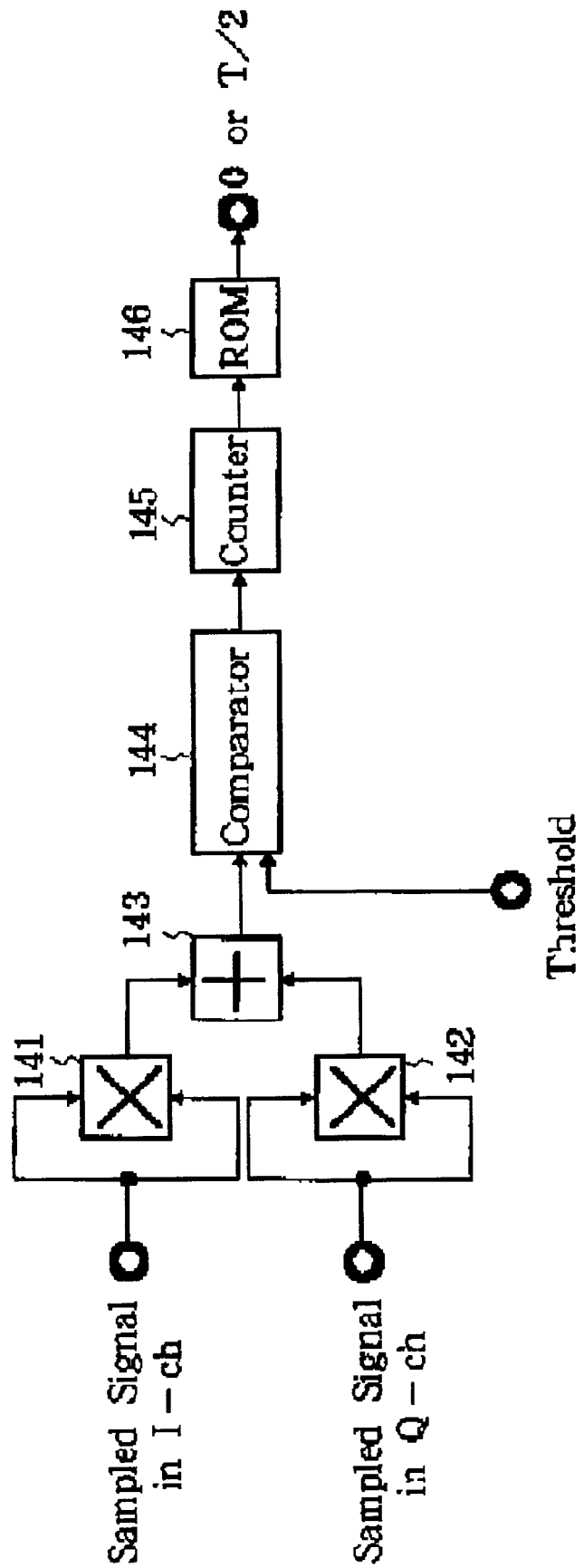
FIG. 40 is a block diagram showing an example of a kick-off circuit.

FIG. 40 is a block diagram showing an example of a specific configuration for a kick-off circuit. This kick-off circuit comprises multipliers 141 and 142, adder 143, comparator 144, counter 145 and ROM 146. Multipliers 141 and 142 respectively square the sampled signals in the in-phase and quadrature channels. Adder 143 adds the outputs of multipliers 141 and 142. Comparator 144 compares the output value of adder 143 with a threshold, and if the output of adder 143 is smaller, outputs a "1", and otherwise outputs a "0". Counter 145 counts the outputs of comparator 144 and outputs a "1" when this reaches or exceeds a given value. ROM 146 outputs T/2 when the output of counter 145 is "1", and otherwise outputs "0".

Figure 41:
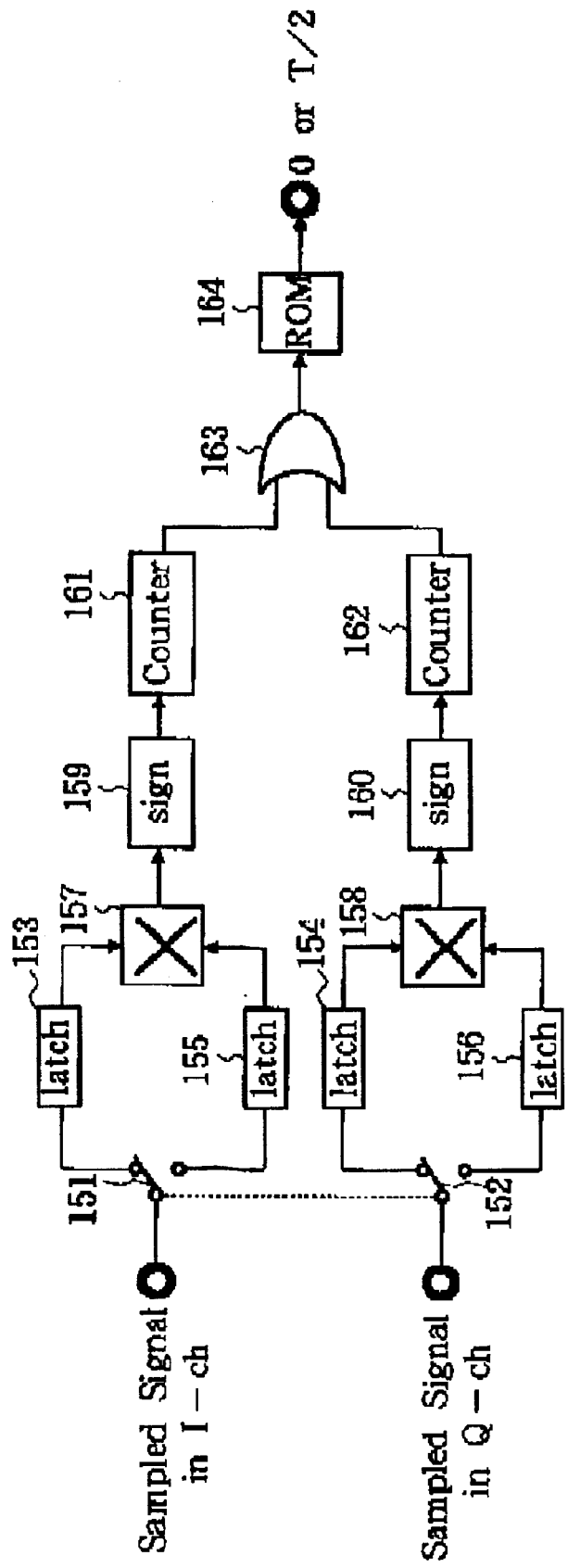
FIG. 41 is a block diagram showing another example of a kick-off circuit.

FIG. 41 is a block diagram showing another example of the configuration of a kick-off circuit, and FIG. 42(a)–(h) show the signal waveforms in the pseudostable state corresponding to that of FIG. 30(b)–(j).

The kick-off circuit shown in FIG. 41 utilizes the fact that the sign of the baseband signal when a pseudostable state has arisen becomes constant, as shown in FIG. 42(a). Switch 151, latches 153 and 155, multiplier 157, sign detector 159 and counter 161 are provided for the in-phase channel, and switch 152, latches 154 and 156,-multiplier 158, sign detector 160 and counter 162 are provided for the quadrature channel. OR circuit 163 and ROM 164 are also provided. Switch 151 switches the sampled signal in the in-phase channel to the two latches 153 and 155 at each symbol, while switch 152 likewise switches the sampled signal in the quadrature channel to the two latches 154 and 156. Multiplier 157 multiplies the outputs of latches 153 and 155, while multiplier 158 multiplies the outputs of latches 154 and 156. Sign detectors 159 and 160 obtain the signs of the outputs of multipliers 157 and 158 respectively. Counters 161 and 162 respectively count the outputs of sign detectors 159 and 160, and output a "1" when these reach or exceed a given value. OR circuit 163 obtains the logical sum of counters 161 and 162. ROM 164 outputs T/2 when the output of OR circuit 163 is "1" and otherwise outputs 0.

The explanations given with reference to FIG. 39 to FIG. 42 relate to examples of configurations for avoiding a pseudostable state in the clock timing recovery circuit of the tenth embodiment. If required, a pseudostable state can be avoided in similar manner in the other embodiments as well by making some modifications to these configurations. Namely, when it has been detected from the baseband signal that the timing of the system clock signal and the clock timing of the received signal diverge by a half period, the pseudostable state of the clock timing recovery circuit can be avoided by shifting the clock timing by a half period. Clock timing can also be established rapidly when the clock timing recovery circuit is in the vicinity of the pseudostable state, by moving it from this state.

As has been explained above, unlike a tank-limiter clock recovery circuit using IF signal operation, with a clock timing recovery circuit according to this invention the clock signal is not lost when the level of the IF signal decreases. Furthermore, because there is no need for oversampling, such as employed in a clock recovery circuit using a binary quantised digital phase-locked loop, and because a processing speed of the order of the symbol rate is sufficient, a clock timing recovery circuit according to this invention can readily cope with high data transmission rates. Moreover, because processing speed can be restricted to the order of the symbol rate, low power consumption is a possibility. Furthermore, because almost all the constitutional elements of a clock timing recovery circuit according to the present invention can be constructed from digital circuits, it is not necessary to adjust parameters once they have been set, thereby making possible a non-adjusting circuit.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A clock timing recovery circuit comprising:
   clock generating means for generating a system clock signal which repeats with a fixed period;
   phase shift means for outputting a first clock signal, phase-shifted with respect to the system clock signal, as a clock timing for sampling a baseband signal obtained by detection of a received signal, the baseband signal containing a recovery signal for clock timing recovery; and
   control means for controlling the amount of phase shift of the phase shift means, wherein
   said control means includes:
      first means for causing the phase shift means to output the first clock signal for sampling the recovery signal, whereof a phase of the first clock signal n-th leading edge point or trailing edge point (n=1, 2, 3, . . . ) is phase shifted by n×Δt from an origin defined by a chosen leading edge point or trailing edge point of the system clock signal, where Δt is a predefined amount of phase shift;
      second means for estimating, from a sampled signal obtained by sampling the recovery signal, a phase difference between a phase of the system clock signal and a minimum bit error clock timing at which a bit error rate becomes a minimum, and which, on the basis of the estimated phase difference, said second means causes the phase shift means to output a corresponding clock timing for sampling the baseband signal that follows the recovery signal; and
      a control switch for selectively switching control of the phase shift means from between the first means and the second means.

2. A clock timing recovery circuit according to claim 1, further comprising:
   sampling clock generating means for generating a second clock signal having leading or trailing edge points which lead leading or trailing edge points of the first clock signal by a predefined timing difference δt, and for generating a third clock signal having leading or trailing edge points which lag behind the leading or trailing edge points of the first clock by the same timing difference δt; and means for selecting either the first clock signal, which is output from the phase shift means, as a sampling clock signal for sampling the recovery signal, or for selecting an output of the sampling clock signal generating means as the sampling clock for sampling the baseband signal that follows the recovery signal, wherein said second means includes arithmetic means for calculating an amount of phase shift of the phase shift means by comparing decision errors obtained from the sampled signal at leading or trailing edge points that lead by δt, with decision errors obtained from a sampled signal at leading or trailing edge points that lag by δt.

3. A clock timing recovery circuit comprising:

clock generating means for generating a system clock signal which repeats with a fixed period;

phase shift means for outputting a first clock signal, phase shifted with respect to the system clock signal, as a clock timing for sampling a baseband signal obtained by detection of a received signal; and control means for controlling an amount of phase shift of the phase shift means; and sampling clock generating means for generating a second clock signal having leading or trailing edge points which lead leading or trailing edge points of the first clock signal by a predefined timing difference δt, and for generating a third clock signal having leading or trailing edge points which lag behind leading or trailing edge points of the first clock by the same timing difference δt, wherein the control means includes means for calculating an amount of phase shift of the phase shift means by using information relating to a phase error of the clock timing, the information being obtained respectively from sampled signals obtained by sampling the baseband signal using the second and the third clock signals as respective sampling clock signals.

4. A clock timing recovery circuit according to claim 3, wherein the information relating to the phase error is a decision error of a phase component of the sampled signals obtained by the sampling.

5. A clock timing recovery circuit according to claim 3, wherein the baseband signal is a signal obtained by coherent detection, and the information relating to the phase error comprises decision errors of signal points of the sampled signals obtained by the sampling.

6. A clock timing recovery circuit according to claim 3, wherein the baseband signal contains a clock timing recovery signal, and the information relating to the phase error comprises amplitudes of the sampled signals obtained by sampling the clock timing recovery signal.

7. A clock timing recovery circuit according to claim 6, further comprising:

means for shifting a timing of the first clock signal by a half period when a timing of the system clock signal and a clock timing of the baseband signal deviate by a half period.

8. A clock timing recovery circuit according to claim 3, wherein:

the sampling clock generating means includes means for alternately selecting the second clock signal or the third-clock signal and for outputting these as one clock signal; and the control means compares the information relating to a phase error obtained alternately with respect to the second clock signal and the third clock signal.

9. A clock timing recovery circuit according to claim 3 wherein:

the sampling clock generating means outputs the second clock signal and the third clock signal separately; and the control means compares the phase error related information obtained separately with respect to the second clock signal and the third clock signal.

10. A clock timing recovery circuit according to claim 9, wherein:

the baseband signal includes an in-phase channel signal and a quadrature channel signal;

the second clock signal is output as a sampling clock signal for one of the in-phase channel signal and the quadrature channel signal, and the third clock signal is output as a sampling clock signal for the other channel; and the calculating means includes means for comparing the phase error related information obtained respectively from the in-phase channel and the quadrature channel.

11. A clock timing recovery circuit according to claim 3, wherein the second and the third clock signals generated by the sampling clock generating means are output to main signal lines as sampling clock signals for decoding digital data from the baseband signal.

12. A clock timing recovery circuit according to claim 3, wherein the first clock signal is output to main signal lines as a sampling clock signal for decoding a transmitted signal from the baseband signal, the clock timing recovery circuit further comprising;

sampling means for using the second clock signal and the third clock signal to sample the baseband signal in separate lines from main signal lines; and means for obtaining phase error related information from the output of this sampling means.

13. A clock timing recovery circuit comprising:

clock generating means for generating a system clock signal which repeats with a fixed period;

phase shift means for outputting a first clock signal, phase-shifted with respect to the system clock signal, as a clock timing for sampling a baseband signal obtained by detection of a received signal;

control means for controlling an amount of phase shift of the phase shift means, the baseband signal containing a recovery signal for clock timing recovery;

sampling clock generating means for generating a second clock with leading or trailing edge points which lead leading or trailing edge points of the first clock signal by a predefined timing difference δt, and a third clock signal with leading or trailing edge points which lag behind the leading or trailing edge points of the first clock signal by the same timing difference δt, wherein said control means includes:

first means for calculating an amount of phase shift of the phase shift means by comparing amplitudes of sampled signals respectively obtained by sampling the recovery signal using the second and the third clock signals respectively as sampling clock signals; and second means for calculating the amount of phase shift of the phase shift means by comparing decision errors obtained from the sampled signals responsive to the baseband signal following the recovery signal being sampled using the second and the third clock signals respectively as sampling clock signals.

14. A clock timing recovery circuit comprising:

clock generating means for generating a system clock signal which repeats with a fixed period;

phase shift means for outputting a first clock signal, phase-shifted with respect to the system clock signal, as a clock timing for sampling a baseband signal obtained by detection of a received signal;

control means for controlling an amount of phase shift of the phase shift means on the basis of decision errors obtained from sampled signals obtained by sampling the baseband signal and sampling clock generating means for generating and outputting as a sampling clock signal for main signal lines a second clock signal which alternately has a leading edge or trailing edge point which leads a leading edge or trailing edge point of the first clock signal by a predefined timing difference δt, and a leading edge or trailing edge point which lags behind a leading edge or trailing edge point of the first clock signal by the same timing difference δt, wherein the control means includes arithmetic means for comparing decision errors obtained from sampled signals at the leading edge or trailing edge point that leads by δt, with decision errors obtained from sampled signals at the leading edge or trailing edge point that lags by δt, and on this basis the arithmetic means calculates the amount of phase shift of the phase shift means.

15. A clock timing recovery circuit comprising:

clock generating means for generating a system clock signal which repeats with a fixed period;

phase shift means for outputting a first clock signal, phase-shifted with respect to the system clock signal, as a clock timing for sampling, in main signal lines, a baseband signal obtained by detection of a received signal;

control means for controlling an amount of phase shift of the phase shift means on the basis of decision errors obtained from sampled signals obtained by sampling the baseband signal;

sampling clock generating means for generating a second clock signal which alternately has a leading edge or trailing edge point which leads a leading edge or trailing edge point of the first clock signal by a predefined timing difference δt, and a leading edge or trailing edge point which lags behind a leading edge or trailing edge point of the first clock signal by the same timing difference δt; and sampling means for using the second clock signal to sample the baseband signal in separate lines from the main signal lines, wherein the control means includes arithmetic means for comparing decision errors obtained from sampled signals at the leading edge or trailing edge point that leads by δt, with decision errors obtained from sampled signals at the leading edge or trailing edge point that lags by δt, and on this basis the arithmetic means calculates the amount of phase shift of the phase shift means.

16. A clock timing recovery circuit comprising:

clock generating means for generating a system clock signal which repeats with a fixed period;

phase shift means for outputting a first clock signal, phase-shifted with respect to the system clock signal, as a clock timing for sampling a baseband signal obtained by detection of a received signal;

control means for controlling an amount of phase shift of the phase shift means on the basis of one of decision errors of phase components of sampled signals obtained by sampling the baseband signal, and decision errors of signal points of the sampled signals obtained by sampling the baseband signal; and sampling clock generating means for generating and for outputting, as a sampling clock signal for main signal lines, a second clock signal which alternately has a leading edge or trailing edge point which leads a leading edge or trailing edge point of the first clock signal by a predefined timing difference δt, and a leading edge or trailing edge point which lags behind a leading edge or trailing edge point of the first clock signal by the same timing difference δt, wherein the control means includes arithmetic means for comparing decision errors of phase components obtained from sampled signals at a leading edge or trailing edge point that leads by δt, with decision errors of the phase components obtained from sampled signals at the leading edge or trailing edge point that lags by δt, and on this basis calculates the amount of phase shift of the phase shift means.

17. A clock timing recovery circuit comprising:

clock generating means for generating a system clock signal which repeats with a fixed period;

phase shift means for outputting a first clock signal, phase-shifted with respect to the system clock signal, as a clock timing for sampling a baseband signal obtained by coherent detection; and control means for controlling an amount of phase shift of the phase shift means on the basis of decision errors of signal points of sampled signals obtained by sampling the baseband signal; and sampling clock generating means for generating a second clock signal with leading or trailing edge points which lead the leading or trailing edge points of the first clock signal by a predefined timing difference δt, and a third clock signal with leading or trailing edge points which lag behind the leading or trailing points of the first clock signal by the same timing difference δt, and which outputs the second clock signal as the sampling clock signal for one of an in-phase channel and a quadrature channel in main signal lines, and outputs the third clock signal as the sampling clock signal for the other channel, wherein the control means includes arithmetic means for comparing decision errors respectively obtained from the sampled signals in the in-phase and quadrature channels, and on this basis calculates the amount of phase shift of the phase shift means.

18. A clock timing recovery circuit comprising:

clock generating means for generating a system clock signal which repeats with a fixed period;

phase shift means for outputting a first clock signal, phase-shifted with respect to the system clock signal, as a clock timing for sampling, in main signal lines, a baseband signal obtained by quasi-coherent or coherent detection;

control means for controlling an amount of phase shift of the phase shift means on the basis of one of decision errors of phase components of sampled signals obtained by sampling the baseband signal and decision errors of signal points of the sampled signals;

sampling clock generating means for generating a second clock signal which alternately has a leading edge or trailing edge point which leads a leading edge or trailing edge point of the first clock signal by a predefined timing difference δt, and a leading edge or trailing edge point which lags behind a leading edge or trailing edge point of the first clock signal by the same timing difference δt; and sampling means for using the second clock signal to sample the baseband signal in separate lines from the main signal lines, wherein the control means includes arithmetic means for comparing decision errors obtained from the sampled signals at a leading edge or trailing edge point that leads by δt, with decision errors obtained from the sampled signals at the leading edge or trailing edge point that lags by δt, and on this basis the arithmetic means calculates the amount of phase shift of the phase shift means.

19. A clock timing recovery circuit comprising:

clock generating means for generating a system clock signal which repeats with a fixed period;

phase shift means for outputting a first clock signal, phase-shifted with respect to the system clock signal, as a clock timing for sampling, in main signal lines, a baseband signal obtained by coherent detection;

control means for controlling an amount of phase shift of the phase shift means on the basis of decision errors of signal points of sampled signals obtained by sampling the baseband signal;

sampling clock generating means for generating a second clock signal with leading or trailing edge points which lead leading or trailing edge points of the first clock signal by a predefined timing difference δt, and a third clock signal with leading or hailing edge points which lag behind the leading or trailing edge points of the first clock signal by the same timing difference δt; and sampling means for using the second clock signal to sample, in separate lines from the main signal lines, the baseband signal in one of an in-phase channel and a quadrature channel, and which uses the third clock signal to sample the baseband signal in the other of the in-phase and the quadrature channel, wherein the control means includes arithmetic means for using decision errors obtained from the sampled signals of the in-phase and quadrature channels, and on this basis calculates the amount of phase shift of the phase shift means.

20. A clock timing recovery circuit comprising:

clock generating means for generating a system clock signal which repeats with a fixed period;

phase shift means first outputting a first clock signal, phase-shifted with respect to the system clock signal, as a clock timing for sampling a baseband signal obtained by detection of a received signal;

control means for controlling an amount of phase shift of the phase shift means on the basis of an amplitude of sampled signals obtained by sampling a clock timing recovery signal contained in the baseband signal; and sampling clock signal generating means for generating and for outputting as a sampling clock signal for main signal lines, a second clock signal which alternately has a leading edge or trailing edge point which leads a leading edge or trailing edge point of the first clock signal by a predefined timing difference δt, and a leading edge or trailing edge point which lags behind a leading edge or trailing edge point of the first clock signal by the same timing difference δt, wherein the control means includes arithmetic means for comparing, with respect to the sampled signals obtained by sampling using the sampling clock signal, the amplitude of the sampled signal at the leading edge or trailing edge point that leads by δt, and the amplitude of the sampled signal at the leading edge or trailing edge point that lags by δt, and on the basis of a result of this comparison, calculates the amount of phase shift of the phase shift means.

21. A clock timing recovery circuit comprising:

clock generating means for generating a system clock signal which repeats with a fixed period;

phase shift means for outputting a first clock signal, phase-shifted with respect to the system clock signal, as a clock timing for sampling a baseband signal obtained by detection of a received signal;

control means for controlling an amount of phase shift of the phase shift means on the basis of an amplitude of sampled signals obtained by sampling a clock timing recovery signal contained in the baseband signal; and sampling clock generating means for generating a second clock signal with leading or trailing edge points which lead leading or trailing edge points of the first clock signal by a predefined timing difference δt, and a third clock signal with leading or trailing edge points which lag behind the leading or trailing edge points of the first clock by the same timing difference δt, and for outputting the second clock signal as a sampling clock signal for one of an in-phase channel and a quadrature channel in main signal lines, and for outputting the third clock signal as the sampling clock signal for the other of the in-phase or quadrature channel, wherein the control means includes arithmetic means for comparing the amplitudes of the sampled signals in the in-phase and quadrature channels, and on the basis of a result of this comparison, calculates the amount of phase shift of the phase shift means.

22. A clock timing recovery circuit comprising:

clock generating means for generating a system clock signal which repeats with a fixed period;

phase shift means for outputting a first clock signal, phase-shifted with respect to the system clock signal, as a clock timing for sampling, in main signal lines, a baseband signal obtained by detection of a received signal;

control means for controlling an amount of phase shift of the phase shift means on the basis of an amplitude of sampled signals obtained by sampling a clock timing recovery signal contained in the baseband signal;

sampling clock generating means for generating a second clock signal which alternately has a leading edge or trailing edge point which leads a leading edge or trailing edge point of the first clock signal by a predefined timing difference δt, and a leading edge or trailing edge point which lags behind a leading edge or trailing edge point of the first clock signal by the same timing difference δt; and samplings means for using the second clock signal to sample the baseband signal in separate lines from the main signal lines, wherein the control means includes arithmetic means for comparing, with respect to the sampled signals obtained by the sampling means, the amplitude of the sampled signal at a leading edge point or trailing edge point which leads by δt, and the amplitude of the sampled signal at a leading edge point or trailing edge point which lags by δt, and on the basis of a result of the comparison, the arithmetic means calculates the amount of phase shift of the phase shift means.

23. A clock timing recovery circuit comprising:

clock generating means for generating a system clock signal which repeats with a fixed period;

phase shift means for outputting a first clock signal, phase-shifted with respect to the system clock signal, as a clock timing for sampling, in main signal lines, a baseband signal obtained by detection of a received signal;

control means for controlling an amount of phase shift of the phase shift means on the basis of an amplitude of sampled signals obtained by sampling a clock timing recovery signal contained in the baseband signal;

sampling clock generating means for generating a second clock signal with leading or trailing edge points which lead leading or trailing edge points of the first clock signal by a predefined timing difference δt, and a third clock signal with leading or trailing edge points which lag behind the leading or trailing edge points of the first clock signal by the same timing difference δt; and sampling means for using the second clock signal to sample, in separate lines from the main signal lines, the baseband signal in one of an in-phase channel and a quadrature channel, and for using the third clock signal to sample the baseband signal in the other of the in-phase and quadrature channel, wherein the control means includes arithmetic means for comparing the amplitudes of the sampled signals in the in-phase and quadrature channels, and on the basis of a result of the comparison, the arithmetic means calculates the amount of phase shift of the phase shift means.

24. A clock timing recovery method for recovering, from a recovery signal for clock timing recovery contained in a baseband signal obtained by detection of a received signal, a clock timing for sampling the baseband signal that follows the recovery signal, said method comprising:

forming, as a sampling clock signal, a clock signal whereof a phase of its n-th leading edge point or trailing point (n=1, 2, 3, . . . ) from an origin, where one leading edge point or trailing edge point of a system clock signal which repeats with a fixed period is taken as the origin, is shifted by n×Δt relative to a phase of a system clock signal where Δt is a predefined amount of phase shift;

sampling the recovery signal using the sampling clock signal;

estimating, from sampled signals obtained by the sampling step, a phase difference between a phase of the system clock signal and a clock timing at which a bit error rate is a minimum; and recovering a clock timing for sampling the baseband signal that follows the recovery signal, by causing the phase of the system clock signal to shift by an estimated amount of phase difference.

25. A clock timing recovery method for recovering clock timing on the basis of decision errors of sampled signals obtained by sampling a baseband signal, said method comprising:

generating, from a first clock signal obtained by phase shifting a system clock signal which repeats with a fixed period, a second clock signal with leading or trailing edge points which lead leading or trailing edge points of the first clock signal by a predefined timing difference δt, and a third clock signal with leading or trailing edge points which lag behind the leading or trailing edge points of the first clock signal by the same timing difference δt, the second and the third clock signals serving as sampling clock signals for main signal lines;

obtaining decision errors from the sampled signals obtained by using the sampling clock signals to sample the baseband signal;

calculating an amount of phase shift to be applied to the first clock signal on the basis of a result of comparing the decision errors obtained from the sampled signals at the leading edge or trailing edge point of the second clock signal, with the decision errors obtained from the sampled signals at the leading edge or trailing edge point of the third clock signal; and shifting a phase of the system clock signal on the basis of the amount of phase shift.

26. A clock timing recovery method for recovering clock timing on the basis of decision errors of sampled signals obtained by sampling a baseband signal, said method comprising:

outputting, as a sampling clock signal for main signal lines, a first clock signal obtained by phase shifting a system clock signal which repeats with a fixed period, and forming a second clock signal with leading or trailing edge points which lead leading or trailing edge points of the first clock signal by a predefined timing difference δt, and a third clock signal with leading or trailing edge points which lag behind the leading or trailing edge points of the first clock signal by the same timing difference δt;

obtaining decision errors from the sampled signals obtained using the second and third clock signals to sample the baseband signal separately from the main signal lines;

calculating an amount of phase shift to be applied to the first clock signal on the basis of a result of comparing the decision errors obtained from the sampled signals at the leading edge or trailing edge point of the second clock signal, with the decision errors obtained from the sampled signals at the leading edge or trailing edge point of the third clock signal; and shifting a phase of the system clock signal on the basis of the amount of phase shift.

27. A clock timing recovery method for recovering, from a recovery signal for clock timing recovery contained in a baseband signal obtained by detection of a received signal, a clock timing required for decoding the baseband signal, said method comprising:

forming, from a first clock signal obtained by phase shifting a system clock signal which repeats with a fixed period, a second clock signal with leading or trailing edge points which lead leading or trailing edge points of the first clock signal by a predefined timing difference δt, and a third clock signal with leading or trailing edge points which lag behind the leading or trailing edge points of the first clock signal by the same timing difference δt, the second and the third clock signals serving as sampling clock signals for main signal lines;

sampling the recovery signal using the sampling clock signals;

comparing, with respect to sampled signals obtained by the sampling step, an amplitude of the sampled signal at the leading edge point or trailing edge point of the second clock signal, with the amplitude of the sampled signal at the leading edge point or trailing edge point of the third clock signal;

calculating an amount of phase shift to be applied to the first clock signal on the basis of a result of the comparing step; and recovering the clock timing by shifting a phase of the system clock signal on the basis of the amount of phase shift.

28. A clock timing recovery method for recovering, from a recovery signal for clock timing recovery contained in a baseband signal obtained by detection of a received signal, a clock timing required for decoding the baseband signal, said method comprising:

outputting, as a sampling clock for main signal lines, a first clock signal obtained by phase shifting a system clock signal which repeats with a fixed period, and forming a second clock signal with leading or trailing edge points which lead leading or trailing edge points of the first clock signal by a predefined timing difference $\delta t$, and a third clock signal with leading or trailing edge points which lag behind the leading or trailing edge points of the first clock signal by the same timing difference $\delta t$;

sampling the recovery signal using the second and the third clock signals, in separate lines from main signal lines;

comparing, with respect of sampled signals obtained by the sampling step, an amplitude of the sampled signal at a leading edge point or a trailing edge point of the second clock signal, with an amplitude of the sampled signal at the leading edge point or trailing edge point of the third clock signal;

calculating an amount of phase shift to be applied to the first clock signal on the basis of results of the comparing step; and recovering the clock timing by shifting a phase of the system clock signal on the basis of the amount of phase shift.

* * * * *